US007734999B2

(12) United States Patent
Leung et al.

(10) Patent No.: US 7,734,999 B2
(45) Date of Patent: Jun. 8, 2010

(54) SYSTEM AND METHOD FOR PROVIDING FORMS ON A USER INTERFACE

(75) Inventors: Raymond Leung, Calgary (CA); Clayton Russell, Calgary (CA); Jim Josephs, Calgary (CA); Rob Tholl, Calagary (CA)

(73) Assignee: Emergis Inc., Longueuil (CA)

( * ) Notice: Subject to any disclaimer, the term of this patent is extended or adjusted under 35 U.S.C. 154(b) by 831 days.

(21) Appl. No.: 11/025,898

(22) Filed: Jan. 3, 2005

(65) Prior Publication Data

US 2006/0150107 A1 Jul. 6, 2006

(51) Int. Cl.
*G06F 17/00* (2006.01)

(52) U.S. Cl. ....................................... 715/222; 715/223

(58) Field of Classification Search ................. 715/505, 715/506, 507, 508, 221, 222, 223, 224, 225
See application file for complete search history.

(56) References Cited

U.S. PATENT DOCUMENTS

| | | | | |
|---|---|---|---|---|
| 6,088,700 | A * | 7/2000 | Larsen et al. | 707/10 |
| 6,192,381 | B1 * | 2/2001 | Stiegemeier et al. | 715/210 |
| 6,571,214 | B2 * | 5/2003 | Newman et al. | 705/2 |
| 6,704,906 | B1 * | 3/2004 | Yankovich et al. | 715/222 |
| 7,030,890 | B1 * | 4/2006 | Jouet et al. | 345/619 |
| 7,272,784 | B2 * | 9/2007 | Honda | 715/223 |
| 2002/0035451 | A1 * | 3/2002 | Rothermel | 703/1 |
| 2002/0082984 | A1 * | 6/2002 | Zappier | 705/38 |
| 2003/0036942 | A1 * | 2/2003 | Wescott | 705/9 |
| 2004/0111727 | A1 * | 6/2004 | Schwarzbauer et al. | 719/310 |
| 2004/0268229 | A1 * | 12/2004 | Paoli et al. | 715/508 |
| 2005/0015715 | A1 * | 1/2005 | Honda | 715/508 |
| 2005/0039173 | A1 * | 2/2005 | Tondreau et al. | 717/136 |
| 2005/0071752 | A1 * | 3/2005 | Marlatt | 715/506 |
| 2005/0108625 | A1 * | 5/2005 | Bhogal et al. | 715/505 |
| 2005/0138031 | A1 * | 6/2005 | Wefers | 707/9 |
| 2005/0210263 | A1 * | 9/2005 | Levas et al. | 713/182 |

(Continued)

OTHER PUBLICATIONS

Giur et al., Role Templates for Content-Based Access Control, ACM Nov. 1997, pp. 153-159.*

(Continued)

*Primary Examiner*—Cong-Lac Huynh
(74) *Attorney, Agent, or Firm*—Grant Tisdall; Gowling Lafleur Henderson LLP

(57) ABSTRACT

A system and method for configuring a user formset for display on a user interface of a client computer, the client computer coupled by a network to a formset server, the user formset for providing interaction with a network transaction, the user formset described in a structured definition language. The system and method comprise: requesting the user formset from the server according to at least one formset generation criterion; selecting a first overlay for application to a master formset, the first overlay including first components based on a role of the user; applying the first overlay to the content of the master formset for generating a role based version of the master formset; selecting a second overlay for application to the role based version, the second overlay including second components based on settings particular for the user functioning in the role; and applying the second overlay to the content of the role based version for generating the user formset; wherein the user formset is subsequently rendered on the user interface of the client computer.

40 Claims, 8 Drawing Sheets

U.S. PATENT DOCUMENTS

| | | | | |
|---|---|---|---|---|
| 2006/0107197 | A1* | 5/2006 | Friend et al. | 715/505 |
| 2006/0123331 | A1* | 6/2006 | Hightower et al. | 715/505 |
| 2006/0179058 | A1* | 8/2006 | Bram et al. | 707/9 |
| 2006/0271480 | A1* | 11/2006 | Allin et al. | 705/40 |
| 2007/0055923 | A1* | 3/2007 | Calow et al. | 715/505 |
| 2007/0078886 | A1* | 4/2007 | Rivette et al. | 707/102 |
| 2007/0124278 | A1* | 5/2007 | Lewis et al. | 707/2 |
| 2007/0143305 | A1* | 6/2007 | van Wyk et al. | 707/10 |
| 2007/0198910 | A1* | 8/2007 | Jensen et al. | 715/505 |
| 2008/0046350 | A1* | 2/2008 | Allin et al. | 705/35 |
| 2008/0288379 | A1* | 11/2008 | Allin et al. | 705/34 |

OTHER PUBLICATIONS

Ray et al., Using UML to Visualize Role-Based Access Control Constraints, ACM 2004, pp. 115-124.*

Wang, Team-and-Role-Based Organizational Context and Access Control for Cooperative Hypermedia Environments, ACM 1999, pp. 37-46.*

Goel et al., Derived Access Control Specification for XML, ACM 2003, pp. 1-14.*

Belokosztolszki et al., Role-Based Access Control for Publish/ Subsribe Middleware Architectures, ACM 2003, pp. 1-8.*

Bourges-Waldegg et al., Combination of RSS Newsfeeds and Forms for Driving Web-based Workflow, Google May 2, 2005. pp. 1-9.*

* cited by examiner

SYSTEM AND METHOD FOR PROVIDING FORMS ON A USER INTERFACE

BACKGROUND OF THE INVENTION

Current forms implemented on a graphical user interface of a user computer have to be coded for operation by a variety of different users. The current implementation of the form variety is to have these different role-specific formsets all be coded by hand and named appropriately. One disadvantage for hard coded forms is maintenance, as any changes in one of the Formsets requires that all the other similar Formsets be examined and also changed if necessary.

It is an object of the present invention to provide a claims processing system to obviate or mitigate some of the above-presented disadvantages.

SUMMARY OF THE INVENTION

The current implementation of the form variety is to have different role-specific formsets all be coded by hand and named appropriately. One disadvantage for hard coded forms is maintenance, as any changes in one of the Formsets requires that all the other similar Formsets be examined and also changed if necessary. Contrary to current formset setup there is provided a method and system for configuring a user formset for display on a user interface of a client computer, the client computer coupled by a network to a formset server, the user formset for providing interaction with a network transaction, the user formset described in a structured definition language, the method comprising the steps of: requesting the user formset from the server according to at least one formset generation criterion; selecting a first overlay for application to a master formset, the first overlay including first components based on a role of the user; applying the first overlay to the content of the master formset for generating a role based version of the master formset; selecting a second overlay for application to the role based version, the second overlay including second components based on settings particular for the user functioning in the role; and applying the second overlay to the content of the role based version for generating the user formset; wherein the user formset is subsequently rendered on the user interface of the client computer.

According to the present invention there is provided a method for configuring a customized formset for display on a user interface of a client computer, the client computer coupled by a network to a formset server, the customized formset described in a structured definition language, the method comprising the steps of: selecting a customize overlay by the formset server for application to a role based formset, the customize overlay including components based on a predefined configuration of the customized formset particular for the user functioning in the role as defined by the role based formset; and applying the components of the customize overlay to the content of the role based formset for generating the customized formset; wherein the customized formset is subsequently rendered on the user interface of the client computer.

According to a further aspect of the present invention there is provided a system for configuring a customized formset for display on a user interface of a client computer, the client computer coupled by a network to a formset server, the customized formset described in a structured definition language, the system comprising: a server application for selecting a customize overlay by the formset server for application to a role based formset, the customize overlay including components based on a predefined configuration of the customized formset particular for the user functioning in the role as defined by the role based formset; and a utility for applying the components of the customize overlay to the content of the role based formset for generating the customized formset; wherein the customized formset is subsequently rendered on the user interface of the client computer.

A further feature is a table for storing objects representing at least one of the customize overlay components, the table coupled to the formset server.

A further feature is a workflow manipulator for embedding in a transaction using metadata the manipulation of the formset workflow, the transaction associated with the formset and exchanged between the client application and the server application.

BRIEF DESCRIPTION OF THE DRAWINGS

These and other features will become more apparent in the following detailed description in which reference is made to the appended drawings wherein:

FIG. 9 is an example operation of the system of FIG. 1.

DETAILED DESCRIPTION OF THE PREFERRED EMBODIMENTS

Forms Processing System 10

Figure 1:
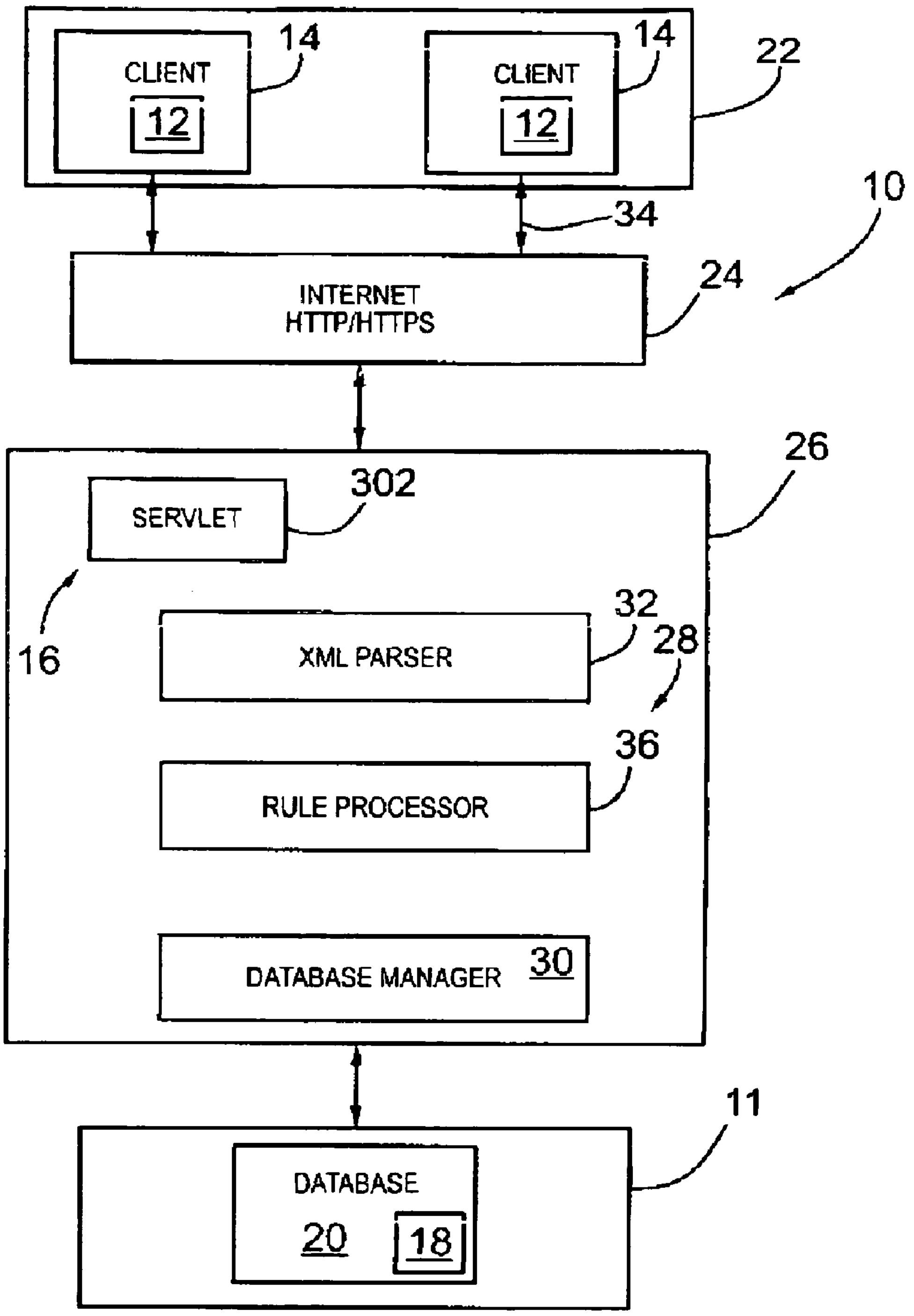
FIG. 1 is a block diagram of a forms processing system.

Referring to FIG. 1, the system 10 provides an interactive interface environment to modem and/or legacy systems tier or layer 11 through the use of client formsets 12 (i.e. a plurality of forms presented as multiple screens that are interconnected by defined workflow) provided on a client 14 from a formset server 16. The system 10 can be defined as a generalised forms processing system that configures a presentation layer 22 and the associated business rules as data rather than as hard coded forms. The client formsets 12 are dynamically configurable (i.e. customisable) based on user setting/type and priorities in relation to a master formset(s) 18 stored on a database 20 and/or the form server 16. The clients 14 can be resident in the presentation tier/layer 22 connected through a network 24 (such as a LAN and/or WAN—Internet) to a middle tier/layer 26. The system 10, as a frame work, is designed to serve up application formsets 12 on the client 14 based on a role assigned to the user of the client 14. The backend database 20 has the single development master formset 18 that can be used by the formset server 16 to facilitate the creatation of multiple versions of the production formsets 12 base on the single development master formset 18. Each of the generated production formsets 12 are assigned to a role (via static overlays 400—see FIG. 3) and served up to the users of the client 14 in that role, such that the formset 12 look and functionality is changed based on the type/role of user, as well as individual settings (via dynamic overlays 402—see FIG. 3) as further described below. It is recognised that the formset 12 includes a number of formatted data fields, presentation format, as well as associated actions for data input/output of the fields as well as intra-screen and inter-screen navigation. Further, it is recognised that the master formset 18 can contain the total generically described (i.e. not specifically named for individual roles) workflow of the user formsets 12 as well as can refer to other master formsets 18, as desired. For example, the master formsets 18 can contain generic definitions of actions and events that are further specified by role/category specific definitions when the contents of the master formsets 18 are operated on by the static overlays 400, as further described below.

Referring again to FIG. 1, the system 10 can be modelled as a 3 tier formset application organized into three parts, each of which is distributed to a different place(s) in the network 10. The three parts are: a client 14 workstation or presentation interface in the presentation tier 11; the business logic of the client formset 12 generation and processing in the middle or application tier 26; and the database 20 containing data content of the formset 12 as well as programming related to managing the database 20 in the database tier 11. The application user's workstation computer 201 (see FIG. 2) of the client 14 can contain programming that provides the graphical user interface (GUI) 202 and application-specific entry forms or interactive windows of the client formset 12, whereby some data that is local or unique for the workstation user is also kept on a local data storage 210.) The business logic of the client formset 12 (i.e. presentation and behaviour) is located on the server 16 or other shared computer connected to the formset 12 of the client 14. The business logic of the server 16 acts as the server for client requests/transactions 34 from workstations 201 (user system/events related to operation of the formsets 12 as well as their generation), determines what data is needed (and where it is located) in relation to the events, and acts as a client in relation to programming 28 of the database 20 that might be shared on the tiers 11, 26. The third tier 11 can include the database 20 and a database management engine 30 to manage read and write access to the database 20. For example, the formsets 12 can be implemented in any Windows™, Linux™, Unix™ based operating system and the database 20 can be a SQL based system. Communication protocols between the tiers 11,22,26 can be such as but not limited to XML, HTTP(S), and JDBC. Communication between the components and objects in the tiers 11,22,26 can be through interfaces such as but not limited to XML data transactions, SOAP, etc. Further, the business logic of the tier 26 can communicate with the database 20 using business objects whose default implementations communicate with the database 20 using JDBC or other- SQL Databases, IDL-based CORBA and RM/IIOP systems, Legacy Databases, J2EE, SAP RFCs, and COM/DCOM components, as desired.

Workstation 201

Figure 2:
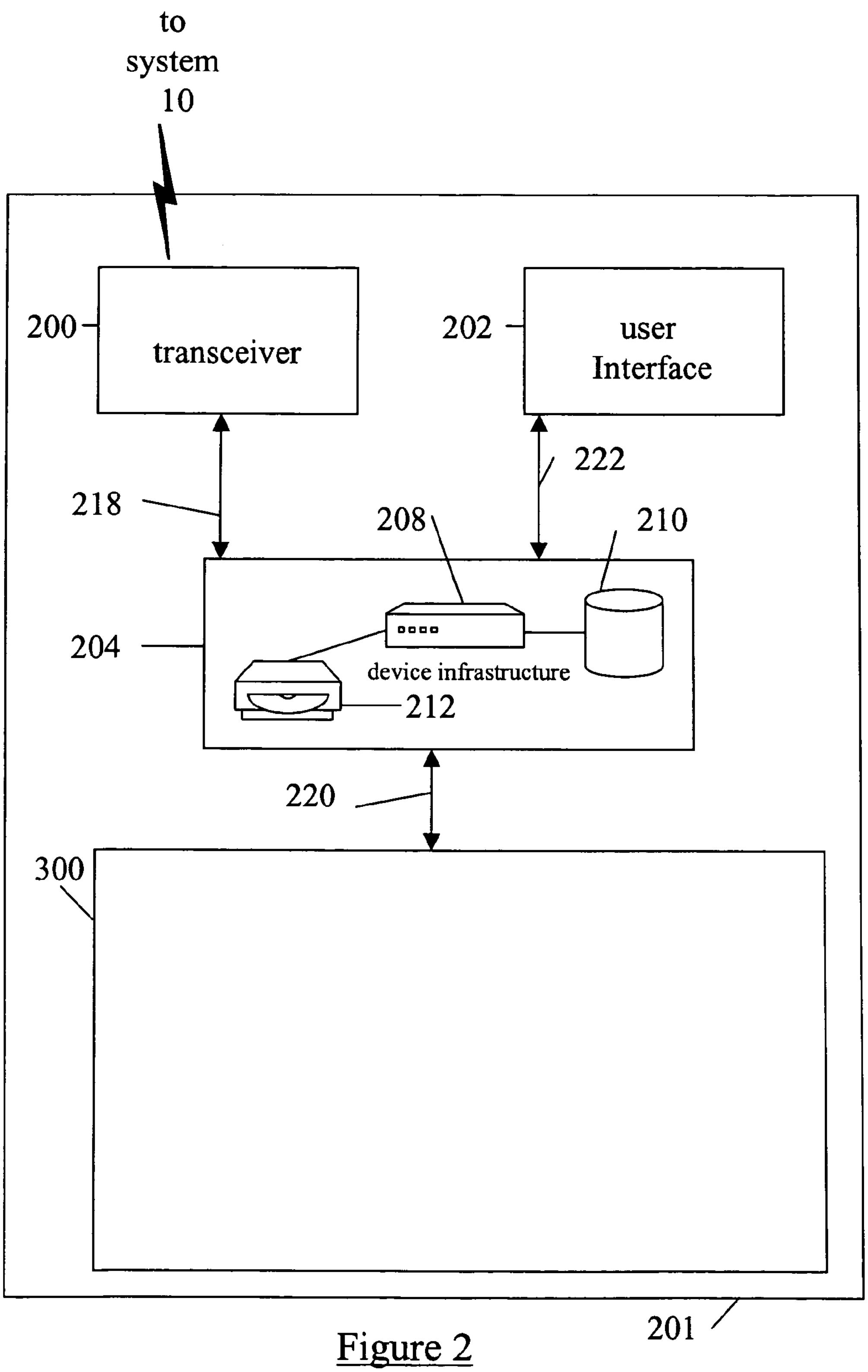
FIG. 2 is a block diagram of a formset server of FIG. 1.

Referring to FIG. 2, the clients 14 can be represented by workstation computers 201 including such as but not limited to mobile telephones, PDAs, or dual-mode communication devices and desktop computers. The computers 201 include a network connection interface 200, such as a wireless transceiver or a wired network interface card or a modem, coupled via connection 218 to a device infrastructure 204. The connection interface 200 is connectable during operation of the computer 201 to the network 24, such as to a wireless network by wireless links (e.g., RF, IR, etc.), which enables the computer 201 to communicate with each other and with external systems (such as the server 16) via the network 24 and to have requests/response messages/transactions 34 between the formset(s) 12 and the database 20.

Referring again to FIG. 2, the computers 201 also have a user interface 202, coupled to the device infrastructure 204 by connection 222, to interact with a user (not shown). The user interface 202 includes one or more user input devices such as but not limited to a QWERTY keyboard, a keypad, a track wheel, a stylus, a mouse, a microphone and the user output device such as an LCD screen display and/or a speaker. If the screen is touch sensitive, then the display can also be used as the user input device as controlled by the device infrastructure 204. The user interface 202 is employed by the user of the computers 201 to coordinate the requests/response messages/transactions 34 over the network 24 (see FIG. 1) as employed by formsets 12, further described below.

Referring again to FIG. 2, operation of the computer 201 is enabled by the device infrastructure 204. The device infrastructure 204 includes a computer processor 208 and the associated memory module 210. The computer processor 208 manipulates the operation of the network interface 200, the user interface 202 and the formset 12 content, format, and behaviour by executing related instructions, which are provided by an operating system and a client application 300 (see FIG. 3) located in the memory module 210. The client application 300 communicates with a server application 302 located on the server 16, as further described below. The client application 300 can be represented as an applet that runs inside of a Virtual Machine (e.g. Java Virtual Machine such as Sun JVM™) provided by the infrastructure 204. For the example, the JVM applet would be applicable for running on a number of computer 201 platforms. Further, it is recognized that the device infrastructure 204 can include a computer readable storage medium 212 coupled to the processor 208 for providing instructions to the processor and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination. The client application 300 can be transmitted via the network 24 and loaded into the memory module 210 of a device infrastructure 204. Alternatively, the client application 300 may be loaded via a serial connection, a USB connection, or a short-range wireless communication system such as IR, 802.11(x) Bluetooth™ (not shown). Once loaded onto the computer 201, the client application 300 can be executed by the processor 208 in the device infrastructure 204 for operating the formsets 12.

Formset Manipulation

Figure 3:
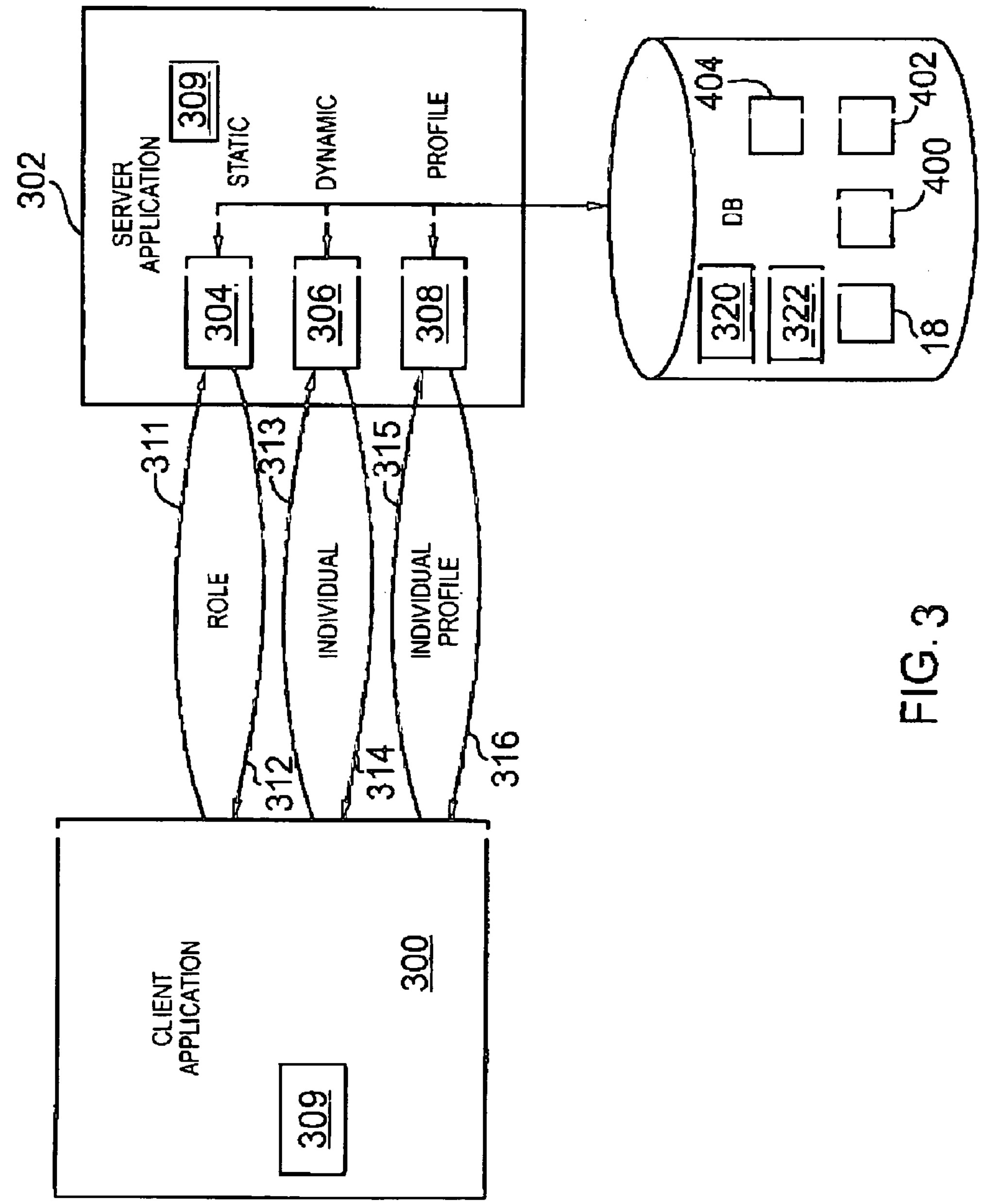
FIG. 3 shows further detail of the form system of FIG. 2.

Referring to FIG. 3, the client application 300 can be a Java applet (or other application) that runs in connection with a browser presented on the UI 202 (see FIG. 2). The application 300 operates to dynamically render configurable client formsets 12 (e.g. an editable collection of UI presented electronic forms) on the browser that communicate with the server application 302, in connection to user and system events in relation to the content of the formset 12. The workflow (e.g. actions and events) as well as layout of the formsets 12 can be defined in the same XML file representing the formset 12, as rendered on the UI 202 of the client 14. The formsets 12 provide for the layout on the UI 202 and the data transferred to and from the middle tier 26 components 36,30 in XML (for example) transactions 34. The server application 302 includes a collection of Java libraries (see FIG. 1) and an XML parser that constructs and parses the XML documents exchanged between the client application 300 and the business objects of the database 20. It is recognised that structured definition languages other than XML can be used, as desired, in order to construct the data definitions in the document of the transaction 34 passed between the client 300 and server 302 applications. The server application 302 cooperates to move the data associated with the objects to and from the database 20, in a manner controlled by the XML transactions 34 configured via the formset 12 used by the client application 300.

The presentation layer 22 includes the Java applet as the client application 300 that runs in, for example, the browser (e.g. Internet Explorer™) that hosts the Virtual Machine (e.g. Sun Java™ Virtual Machine) on compatible workstation computers 201. The client application 300 can cooperate in the dynamic rendering of the formset 12, described in XML, and stored centrally on the server 16 and/or database 20) as the master formset 18. The dynamic nature of the formsets 12,18 is described as data. This separated form generation environment can allow developers to be responsible for the content of the master formsets 18 (containing more generic definitions of content, presentation, and workflow), and a business analyst to define the overlays 400, 402 to facilitate modification, changing, or hiding what an individual user of the client 14 sees, or what data elements the users can access via the user formsets 12. It is recognised that the overlays 400,402 are used to modify the XML definitions in the master formset 18 corresponding to application data extracted from the database (storage 210 and/or database 20).

Once the user formsets 12 have been rendered on the UI 202 of the client 14, the user can enter or modify data on the formset 12 via the UI 202 (see FIG. 2) and submit the modified data to the server 16 as the XML transaction 34. The entire transaction 34 constitutes a business function that is composed into an XML document and sent via Secure Socket Layer (SSL) to the host server 16 running the server application 302. The server application 302 processes the transaction 34 and returns another XML document to the client application 300 for presentation in the UI 202 via the formset 12. Multiple client applications 300 can be running in multiple browser windows of the UI 202 with inter-application 300 communication that enables complex workflow and sharing of data between formsets 12. The client application 300 is intelligent enough to interpret the response XML document and display it on the current formset 12, switch to another formset 12 to display the document contents, and/or perform various other operations. The client application 300 is installed on the local client 12 with the master copy stored on the central server 16. Each time a connection to the server 16 is made by the client 14, the client application 300 can perform a version check, and be updated automatically (no user-intervention required) if required.

The server application 302 is part of the Middle layer 26 can be a Java servlet that accepts XML transactions 34. These transactions 34 can include such as but not limited to a submitted transaction, a request to a view, and a business object or a request for a database style record-set (query). At a high level the server application 302 can have three functions: the server application 302 maps the XML to an internal Java business object via the parser 32 (see Appendix C), the server application 302 processes the business object against a business rules processor 36 and maps the business object to the database 20 via the database manager 30. There can be many advantages to using Java servlets as the server application 302 in the middle layer 26, such as: servets are scalable, fast, portable, reliable and extremely powerful. Scalable means the application 302 can be deployed 302 on single centralized server 16 or distributed amongst any number of servers 16. It is recognised that the formsets 12 can be served up from a central server 16, such that the installation/distribution of changes to formset(s) 12 content is centralised in one location rather than having multiple installations. Servlets are fast because the process is already running and initialized, and each new transaction 34 runs in a previously pooled thread. Portability means that the Java servlet can be deployed with any major web server (of the back end tier 11) running on almost any flavour of Unix or Windows, or any Java Servlet Container for example. The servlets are considered reliable because of safety mechanisms inherent in the Java Virtual Machine running on the client 14. The servlets are powerful because all standard Java API's are available, meaning that you can do virtually anything from connecting to the database 20 to sending an email or opening a serial connection to another network connected to the network 10.

By default, the middleware server application 302 can take care of two out of the three functions automatically. The server application 302 with the parser module 32 can automatically parse the XML into the business object and save it to the database 20. Most applications can require business rules be applied to the data/business object before it is saved to the database 20. For this step the server application 302 can access to or include the extendable Rules Processing Engine 36. The rules processor engine 36 can be a Java class that implements a ‘hooks’ or ‘callback’ interface. Once written, the class is mapped to the transaction 34 via a properties file. Further, reading business objects and running database queries can be implemented using templates in connection with the appropriate properties file—see Figure A and corresponding Transaction Examples section below. The incoming transaction 34 need only request a specific template and supply it the appropriate information so that the parser module 32 and associated rules processor 36 can find the object(s). These templates can be simply XML documents that represent either the business object and/or the database query, an example of which is given in Appendix A.

Further, workflow of individual forms of the formset 12 and/or between formsets 12 can be embedded in the transaction 34 through the use of metadata, e.g. defined transaction classes (e.g. class=2, class=3, etc . . . ), such that the transaction class can be used to direct the application 300 to display appropriate forms, content, and/or format in response to the received transaction class identifier of the transaction 34 from the server application 302. For example, the transaction 34 sent to the application 302 would contain the metadata used to control the workflow as well as any data entered by the user, whereby the transaction 34 result sent back to the application 300 (by the application 302) would contain the metadata in the form of the defined transaction class to instruct the application 300 to switch to another form of the formset 12 for display on the UI 202. A workflow manipulator 309 can be used by the applications 300,302 for preparing and processing the transaction 34 in regard to the metadata insertion and interpretation for formset 12 display.

An example of the formsets 12 is as follows. The formsets 12 can provide application screens on the UI 202 for entering manual insurance claims. This manual claim entry is done by the user of the client 14. These entry screens can allow the entry of expected claim data for the claim transactions 34, can generate the claim transaction 34 as an XML (or other structured definition language) document and send it to the server 16, can receive a response (e.g. XML) from the server 16 and display the response; and can adjust overrides, if desired, and repeat until the desired result is achieved. The screens and queues of the formsets 12 can provide information about pending claim transaction 34 processing to the user of the client 14. For example, different claim types (e.g. dental, drug, etc . . . ) are used to submit claim, transactions 34 through the formset 12 for the different lines of business of the payers of the insured claimed services. For example, the screens of the formset 12 associated with the claim transaction 34 can help provide information (send and/or receive) a medical claim submitted by a doctor, using the client 14, for suturing John Doe's knee, a dental claim submitted by a dentist, using the client 14, for performing a root canal on Bob Smith, and/or a drug claim submitted by a pharmacist, using the client 14, prescribed by a doctor for dispensing an antibiotic to Jane Doe. It is recognised that the claim transaction 34 can contain claims associated with one or more lines of business.

Further, the formsets 12 can be used to supply maintenance screens for maintaining information (such as company and department and other business object maintenance) needed for an adjudication system (not shown) that processes the transactions 34. The adjudication system could be represented as the server application 302. Some of the maintenance screens, such as recipient and subscriber enrolment, may be accessible to a plurality of users having different authorisation clearances, either configured on one or many clients 12. Other maintenance screen versions of the formset 12, such as those maintaining workflow queues of the adjudication system, may only be accessible to a payer's staff rather than the claim recipients filling out the claim data forms of the formset 12, hence demonstrating the dynamic configurability of the formset 12 based on degree of user authorisations. These versions of the formset 12 are configured through the use of the overlays 400, 402 as further described below.

Figure 4:
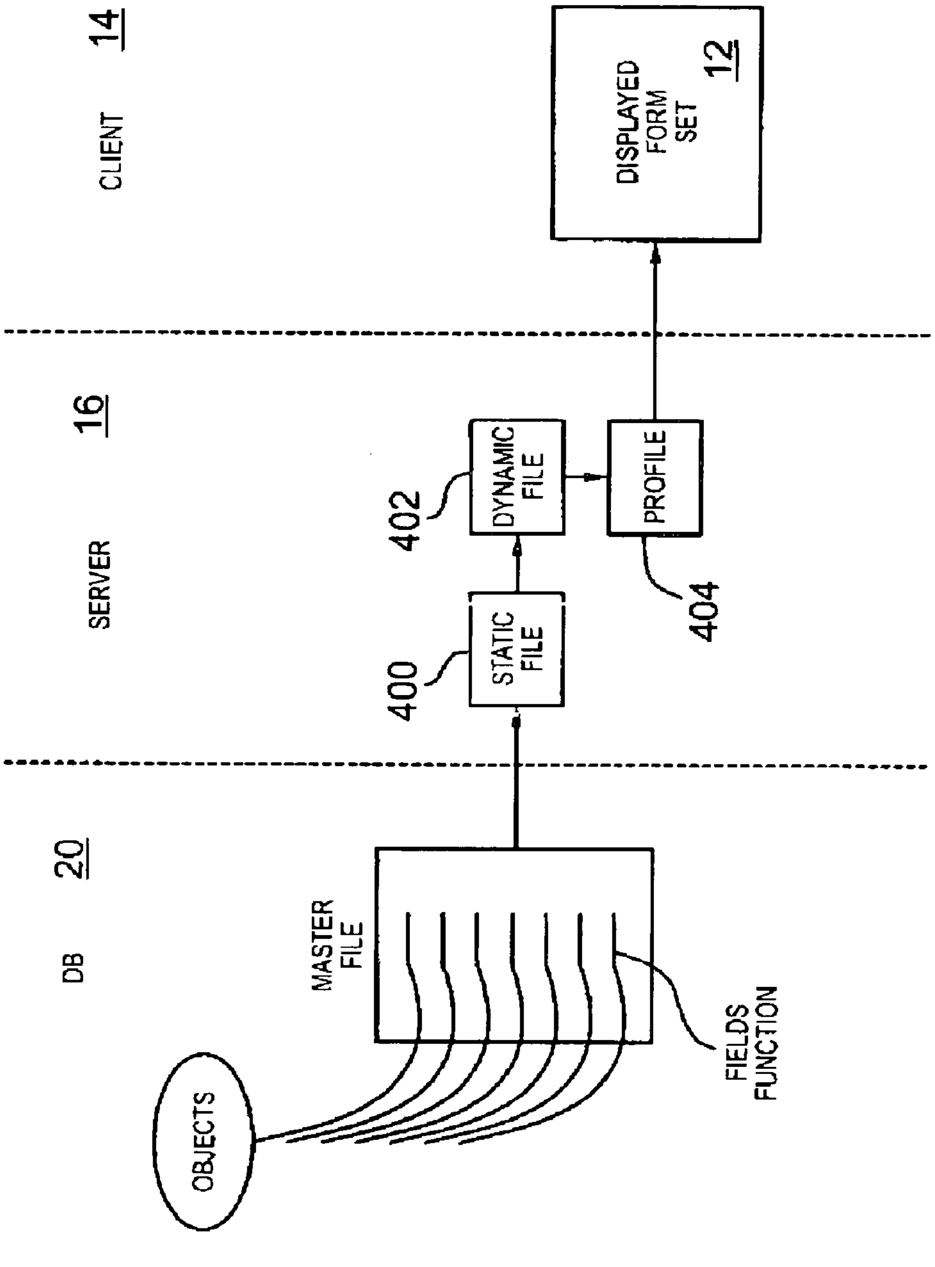
FIG. 4 is a block diagram of overlays for the formset of FIG. 1.

Referring to FIG. 4, the database 20 contains the master formset 18, an example of which is found in Appendix B. The server application 302 of the form server 16 can be employed by the system 10 (see FIG. 1) to apply the static overlay/filter 400 to the master formset 18, such that the generic definitions are converted into role/category specific definitions for presentation to the client 14 as role/category defined formsets 12. It is also recognised that the static overlays could be applied in pre-production of the formsets 12, such that the server 16 has a plurality of role/category specific versions 400 (i.e. role/category defined formsets 12 implicitly containing the static overlay content) of the master formset 18 resident in server 16 memory. In this case, the server 16 does not have access to the master formset 18 for application of the static overlays, rather the server 16 is provided with the multiple role/category versions 400 of the master formset 18 which would be represented in FIG. 4 as role/category formset file versions 400 (i.e. the referenced file 400 does not contain only the static overlay contents, but as well contains the contents of the master formset 18 after the static overlays have been applied). The role of the server 16 for application or non-application of the static overlays 400 can be based on use and resource constraints of the server 16, as desired. In any event, it is recognised that the server 16 and associated server application 302 can, in response to a formset 12 request by the client application 300, either in response provide the preprocessed static overlay formset version 400 (i.e. role/category defined formset 12) of the master formset 18 to the client application 300 or can first apply the static overlay 400 to the master formset 18 (resident in the server 16 and/or database 20) and then send the role/category defined formset 12 to the client application 300. Once received, the role/category defined formset 12 is rendered to the UI 202 by the client application 300. The static overlay 400 feature provides for changes to the master formset 18 such as but not limited to; Remove, Modify, and/or Add predefined elements (content/format) and behaviour (functionality) to the role/category defined formset 12 that will be served up to the user. The static overlays 400 can be either additive or restrictive in nature and can be used to add, modify, or delete objects and their related functionality available in the master formset 18.

The Server 16 can also be used to apply a dynamic overlay/filter 402, and/or profiles 404 to the role/category specific formsets 12 in order to dynamically create the customized client formsets 12 displayed on the client 14. In this case, the server application 302 is used to process the role/category defined formsets 12 to include the content of the dynamic overlays 402 and/or the profiles 404 before sending the formsets 12 with both role/category definitions as well as individual customized definitions and default data (e.g. profiles 404) for rendering by the client application 300 on the UI 202. Otherwise, the server 16 can be used to supply the dynamic overlay 402 and/or the profiles 404 to the client application 300, along with the role/category defined formsets 12, for subsequent processing by the client application 300 to dynamically create the customized client formsets 12 displayed on the client 14. The dynamic overlays 402 provide for changes to the role/category defined formsets 12 in what the user sees and what the user can change, based on an application specific way of grouping the users of the formset 12. The dynamic overlay 402 feature provides for changes such as but not limited to; Hide, protect, and Mask certain parts of the customized formset 12 version that is. served up to the user of the client 14. The dynamic overlay 402 feature is specifically restrictive in nature and preferably does not add objects and their related functionality to the formset 12. Further, the server application 302 can also apply profiles 406 also related to the user characteristics (or groups of users having the same characteristics) to provide default/saved values into the fields of the formset 12. It is recognised that the default values could be obtained from the database 20 and/or the local storage 210 for any specified user data values.

Static Overlays

Referring to FIGS. 3 and 4, the static overlay 400 feature is designed to act on any components in the Formset 12, so as to affect the degree of access (e.g. full, partial, none) to the associated objects of the database 20 coupled to the formset 18, as well as to control the presentation of the formset 12 components (data content and/ or presentation format) on the UI 202 and/or their functionality. The mechanism to deliver the modified Formset 12 to the user is based on a formset access criteria (e.g. user Category/type assigned to the Formset 12 and/or the Role-with related individual authorisation the User is assigned) as supplied by the client application 300 when requesting the formset 12 from the server 16. For example, when the client application 300 loads on the client 14, a parameter (e.g. role/category) is set indicating the Formset 12 the client application 300 should display, as well as the current User of the formset 12. One of the first things the client application 300 does, once initialised (e.g. through user login to the client 14), is to request this user respective Formset 12 from the server application 302 by passing in the access criteria of the User type/role performing the request. The user of the particular formset 12 is validated via the access criteria against the server's 16 knowledge (and/or database 20) of which user is attached to the current session of the client application 300, and the Formset 18 is either converted to the role defined formset 12 by application of the static overlay 400 or the pre-processed role defined formset 400 (i.e. implicitly containing the contents of the static overlay) is accessed as resident on the server 16, as further defined below. Once either accessed or generated by the server 16, this role defined Formset 12 file is then returned to the requesting client application 300, which uses the Formset 12 file to render the formset data content (e.g. fields), presentation format (e.g. branding), and functionality (e.g. available actions) on the UI 202.

Using the concept of the master Formset 18 and the static overlay 400 mechanism, the master Formset 18 can hold all the general Formset 18 information, and the overlay Formset 12 fragments can contain the role specific additions, modifications, and removals in respect to the formset 18. The general Formset 18 can be maintained manually by an administrator of the system 10, while the role specific formsets 12 are then rendered and used by the client application 300. A static overlay utility/module 306 of the server application 302 can read in the master formset 18 and generate all the role specific affected components as a step in the building of the formset 12 for presentation on the UI 202 of the client 14, as given by example below. The client application 300 goes through a number of steps when loading on the client 14, mainly in communicating with the server 16 in order to get the various pieces of static overlay 400 information the client application 300 requires for presentation and operation of the respective user formset 12. In general, there are two main steps in FIG. 3, namely the web browser first requests 311 the role defined formset 12 based on the role of the user (e.g. administrator vs. a technician), and then loads 312 the role defined formset 12 from the server application 302. For example, the message from the client application 300 to the server application 302 is a mixture of HTTP Get requests with an HTTP response containing the XML Message. The user formatted formset 12 is encoded in the XML and can use a txforms.dtd DTD file for interpretation of the contained definitions and associated file content.

Figure 5:
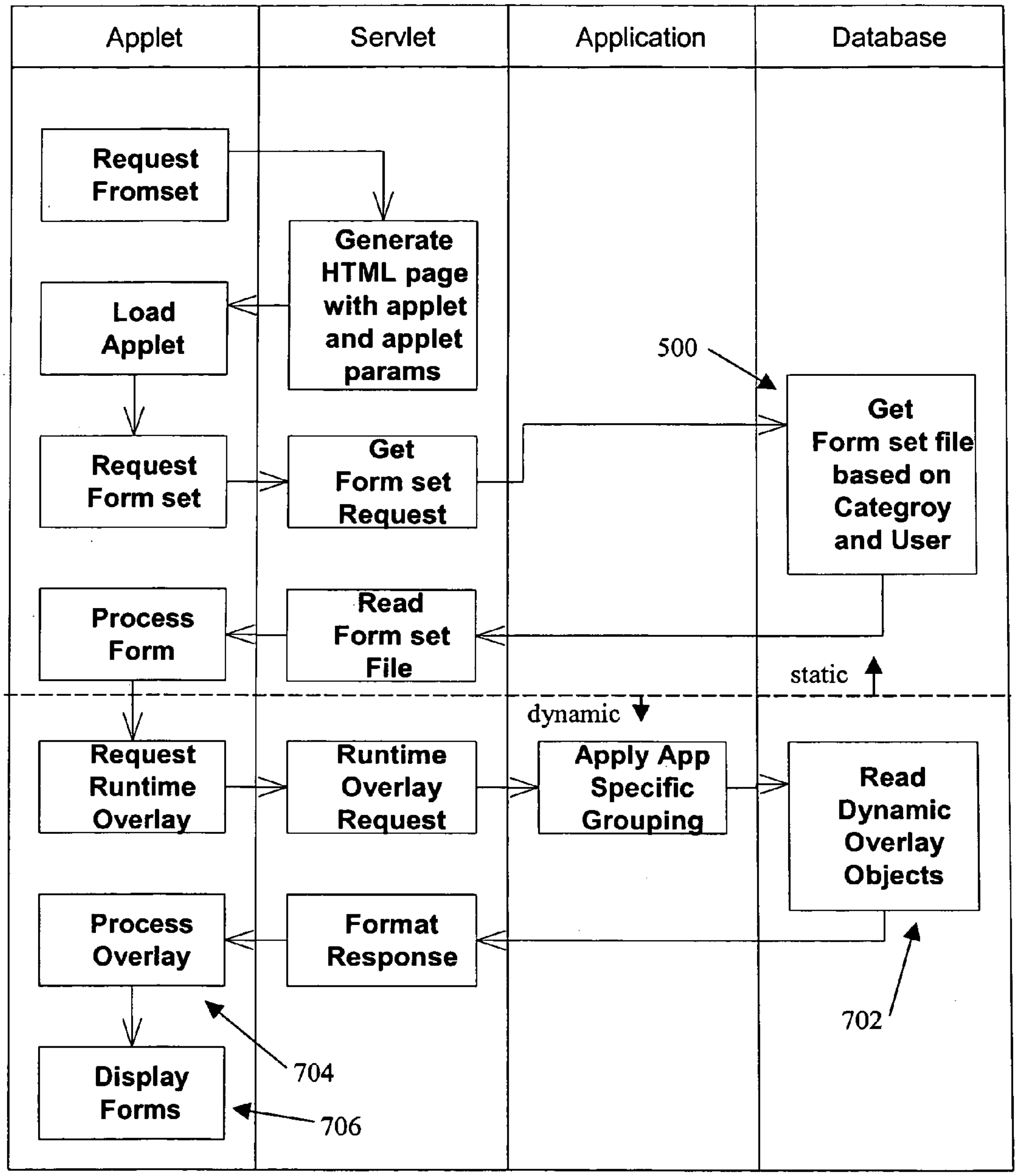
FIG. 5 is an example application of static overlays of FIG. 4.

Referring to FIGS. 3 and 5, the static overlay Java utility 304 can be invoked 500 to build the role defined formset 12 file by having static overlay 400 files applied thereto, or the overlay utility 304 of the server application 302 can be used to retrieve the preprocessed role defined formset 400 (having the implicit contents of the respective static overlay applied during pre-production) selected from a plurality of available preprocessed role defined formsets 400. This utility 304 can use the access/generation criteria to select appropriate control files 320 (either stored in the database 20 or the storage of the server 16), which identifies either the master formset 18 file and related static overlays 400 or the preprocessed role defined formsets 400 and identifies a resultant formset 12 file for use in an expected XML format by the client application 300.

As an example, an ebill.ca Alberta billing formset 12 will be used to demonstrate the use of static overlays 400. The master billing formset 18 is given in Appendix B as source_abClaim.xml. There are two static overlays 400 examples, one for standard web billing (abClaim.properties and abClaim.overlay.xml), and another for billing from Microsoft Outlook™ (abClaim_outlook.properties and abClaim_outlook.overlay.xml).

Examining the standard web billing static overlay 400 first, the two control files 320 are:

```
abClaim.properties
  ; Sun Sax Parser
  sax__parser = com.sun.xml.parser.ValidatingParser
  ; IBM Sax Parser
  ;sax__parser = com.ibm.xml.parsers.SAXParser
  dtd__file__dir=file:/$PROJECTS__HOME/ware/tranzform/formset
  overlay__file__name=$PROJECTS__HOME/ca/ebill/ab/formset/overlay/abClaim.overlay.xml
  source__file__name=$PROJECTS__HOME/ca/ebill/ab/formset/source/source__abClaim.xml
  destination__file__name=$PROJECTS__HOME/ca/ebill/ab/formset/abClaim.xml
  ignore__tx__forms=Outlook
and
abClaim.overlay.xml
  <?xml version="1.0" encoding="ISO-8859-1"?>
  <!DOCTYPE TxFormSet SYSTEM "overlay.dtd">
  <TxFormSet>
    <TxField Name="hidden.use__patient" SegmentId="patient" Id="hidden.use__patient" Type="String" Size="1"
  Required="No" Default="Y">
      <Label>hidden field - do not use</Label>
      <Desc></Desc>
    </TxField>
    <TxSegment Name="SegUsePatientFlag" Id="patient" Required="No">
      <TxRefs Type="TxField" Refs="hidden.use__patient"/>
    </TxSegment>
    <TxActionData Name="DataPatientLookup" Status="Pending" Type="Find" TxnClass="find__patient"
  ExcludeOptSegments="No" ExcludeOptFields="No">
      <TxRefs Type="TxSegment" Refs="SegPatientLookup SegPatientLookup2__1 SegPatientLookup2__2
  SegPatientLookup2__3 SegPatientLookup2__4 SegPatientLookup2__5 SegPatientLookup2__6 SegPatientLookup2__7
  SegPatientLookup2__8 SegPatientLookup2__9 SegPatientLookup2__10 SegPatientLookup2__11 SegPatientLookup2__12
  SegPatientLookup2__13 SegPatientLookup2__14 SegPatientLookup2__15 SegPatientLookup2__16 SegPatientLookup2__17
  SegPatientLookup2__18 SegPatientLookup2__19 SegUsePatientFlag"/>
    </TxActionData>
  </TxFormSet>
```

As can be seen, the properties control file 320 merely sets the source formset 18 file, the overlay 400 file, and where to put the resulting formset 12 file. As well, the properties control file 320 tells the static overlay utility 304 to ignore the Microsoft Outlook forms and not include those in the resulting formset file 12. The static overlay 400 will add a field called 'hidden.use_patient'. The static overlay 400 creates a formset 12 component called 'SegUsePatientFlag' that contains this new field. And, finally, the static overlay 400 adds this new component to the already existing 'DataPatient-Lookup' data set that will be sent when a button is pressed invoking actions tied to this data set by the formset 12 operation on the client 14. Note that the way to determine that the components in the static overlay 400 exist or not is to search the master XML formset 18.

Looking at the Microsoft Outlook billing static overlay, there are two control 320 files again.

```
abClaim outlook.properties
   ; Sun Sax Parser
   sax__parser = com.sun.xml.parser.ValidatingParser
   ; IBM Sax Parser
   ;sax__parser = com.ibm.xml.parsers.SAXParser
   dtd__file__dir=file:/$PROJECTS__HOME/ware/tranzform/formset
   overlay__file__name=$ PROJECTS__HOME/ca/ebill/ab/formset/abClaim__outlook.overlay.xml
   source__file__name=$PROJECTS__HOME/ca/ebill/ab/formset/source/source__abClaim.xml
   destination__file__name=$PROJECTS__HOME/ca/ebill/ab/formset/abClaim__outlook.xml
   ignore__tx__forms=
and
abClaim outlook.overlay.xml
   <?xml version="1.0" encoding="ISO-8859-1"?>
   <!DOCTYPE TxFormSet SYSTEM "overlay.dtd">
   <TxFormSet>
      <TxForm Name="Outlook" FormClass="Outlook" TxnClasses="message" Version="1.0" ForceUppercase="Yes"
   ReadOnly="No" UserSelectable="Yes" TopPage="PageOutlookBillingOptions">
         <Label>Outlook Transactions</Label>
         <TxRefs Type="TxPage" Refs="PageOutlookBilling PageOutlookAppointment PageOutlookPatient"></TxRefs>
         <TxRefs Type="TxStatusPage" Refs="PendingStatus"></TxRefs>
      </TxForm>
   </TxFormSet>
```

Figure 6:
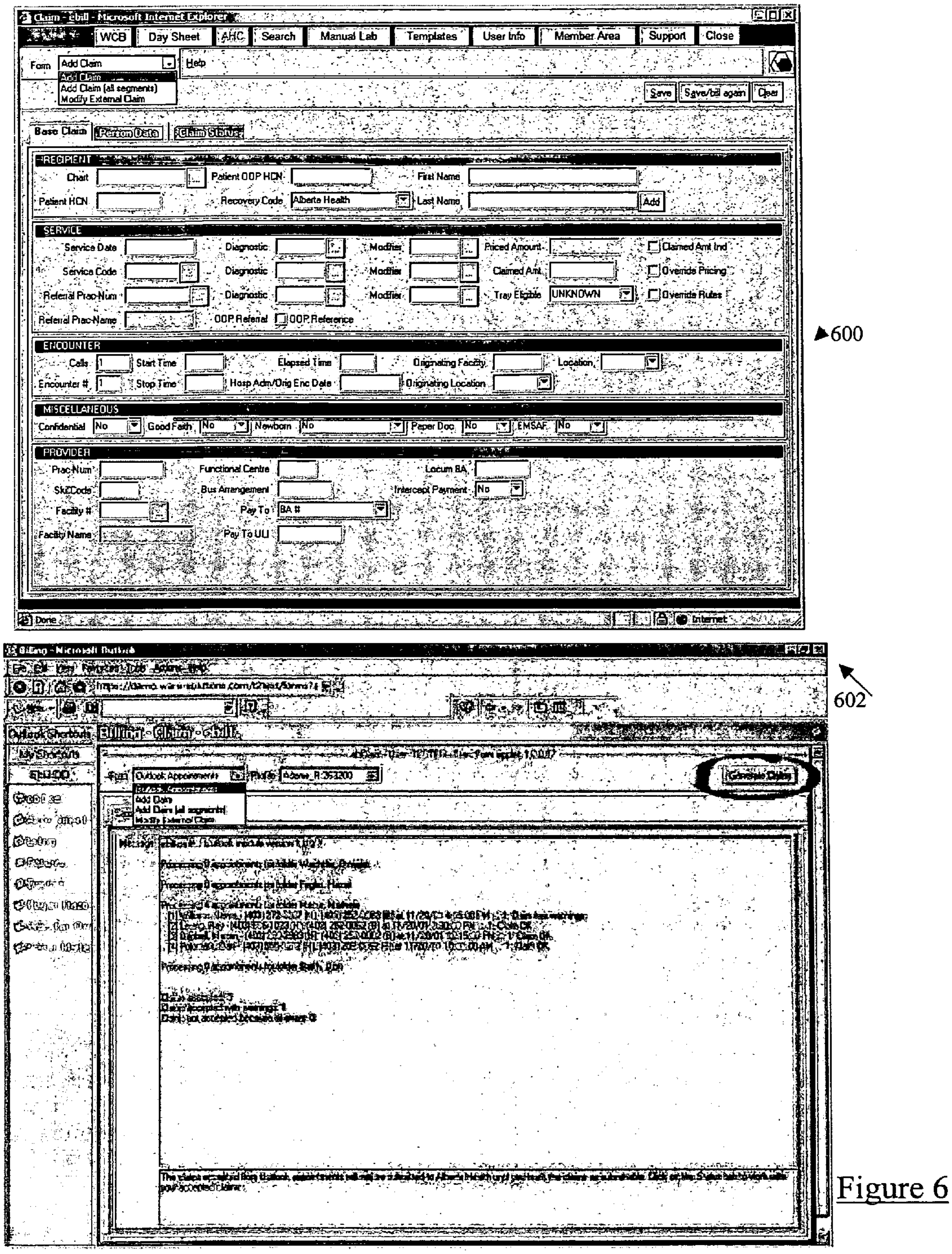
FIG. 6 are example screens resulting from the static overlays of FIG. 5.

As the control file 320 shows, the abClaim_outlook.xml has no components deleted, but does replace the top level formset 18 so that it only contains the Microsoft Outlook form. The other components are still included in the resulting formset 12 XML file but are not referenced and cannot be used by the user of the client 14. As the two screen captures 600, 602 clearly show in FIG. 6, the master formset 18 has been generated into two totally different role defined formsets 12, one screen set 600 for normal AB billing, and the other screen set 602 for billing from within Microsoft Outlook.

Dynamic Overlays

The purpose of Dynamic Overlays 402 (see FIG. 4) is basically to provide changes to the formset 12, in what the individual user (or groups of users) see(s) and what they can change, based on an application specific way of grouping the users based on individual permissions and settings (e.g. Bob as a technician as compared to Charles) or as grouping the users based on grouped permissions and settings (e.g. technicians in department A as compared to technicians in department B). In the first case the technicians are the role/category while Bob and Charles are the individuals. In the second case the technicians are the category/role while the departments are the "individuals". Dynamic Overlays 402 can be applicable in the case where all the formsets 12 are served up from the centralized server 16. So many users under the same role will get the same formset 12 definitions. Therefore, application of the dynamic overlays 402 can give a level of customization down to the 'clinic' level for example. For example, all 'billing clerks' will get the same formset 12—all billing clerks in Alberta—all our customers. However, Dr. Jims clinic may have a specific need that says that Billing Clerk Joanne can NOT perform a specific function (for training purposes for example). Dynamic overlays 402 applied to the formset 12 provides ALL billing clerks in the province (in multiple customers/clinics) to have the base Billing Clerk form, but JoAnne in Dr. Jims Clinic to have an additional customization to restrict her, as specified in the dynamic overlay 402 for production of the customized formset 12 for Joanne. It is noted that the Master formset 18 contains all functionality available to all versions of the formsets 12, such that the static overlays 400 can apply 'Role' based customizations to the master formset 18, i.e. produce a set of role based formsets 12 applicable in general to all users acting in that role. The Dynamic Overlays 402 provide Customer and/or User based customizations of the role based formsets 12.

This Dynamic Overlays 402 provides for the server application 302 to; Hide, protect and/or Mask certain parts of the formset 12 that is served up to the user of the client 14. Otherwise, the overlays 402 can be submitted to the client 14 along with the role defined formset 12 for generation of the customized user formset 12 as rendered on the Ui 202. The Dynamic Overlays 402 are specifically restrictive in nature and are not used to add or otherwise link new objects of the database 20 to the formset 12, rather the Dynamic Overlays 402 act to tailor the category/roles of the formset 12 to certain individual content/functionality. For example, Dynamic Overlays 402 can be designed to act only on certain components contained in the role defined formset 12. Those components can be such as but not limited to Form, Action, Field, Status Page and Status Page Field. The properties that Dynamic Overlays 402 can apply to these components are as follows, such as but not limited to;

hiding a form-object is a matter of not having it displayed (for example we can restrict this attribute to be applied only to Forms and Status Pages), protecting makes a field or group of fields Read-Only where if applied to the Formset 12 globally then all fields on the formset 12 are read-only, and masking is where we substitute each character in the data for a '*' character, much like most password fields such that the formset 12 contains the data however the actual value is masked so that the user cannot read it via the UI 202 (used for privacy concerns for example).

The client application 300 (see FIG. 3) goes through a number of steps when loading, mainly it communicates the formset 12 request (including access/generation criteria) with the server 16 in order to get the various pieces of information it requires for displaying the formset 12 for use by the user to generating and interacting with the transaction 34. The client application 300 requests 313 the dynamic overlys 402 based on the individual settings of the user (e.g. Clayton vs. Rob), and then loads 314 the category and user specific formset 12 after the dynamic overlay 400 has been applied by the server application 302, or collects only the overlay 402 to apply to the already requested role defined formset 12 (steps 311 and 312 as described above). Referring to FIG. 5, there are three main steps, wherein the server application 300 first accesses 702 the dynamic overlay 402. A dynamic utility 306 then constructs using an overlay generation algorithm 307 the runtime/dynamic Overlay 402 files using database tables 322. The overlay 402 can then applied 704 to the role defined formset 12 and the formset 12 becomes altered until it is closed and then sent 706 as the resultant file to the client 14 for display on the UI 202 as the customized formset 12. It is recognized that the message from the client application 300 to the server application 302 can be a mixture of HTTP Get requests with an HTTP response containing the XML Message. Both the role defined formset 12 and the runtime overlay 402 can be encoded in XML and use the same DTD file (txforms.dtd), similar to the static overlay 400 as described above.

Referring to FIG. 3, the dynamic overlay utility 306 can be used by the server application 302 to generate and apply the dynamic overlay 402 to the role defined formset 12, or the utility can be used to generate the overlay 402 and send the role defined formset 12 and the generated overlay 402 to the client application 300 for subsequent application and rendering to the UI 202. The runtime overlay 402 information can be stored in database 20 tables 322. The algorithm used by the utility/module 306 for runtime overlay 402 can group users and apply the overlay 402 based on application specific rules for effecting the formset 12 content/functionality as per the generation criteria. Appendix C provides for a code example of how the dynamic overlay 402 can be generated from table 322 data in the database 20 prior to application to the formset 18. From the code in Appendix C, one can infer the underlying SQL used to extract the information from the database 20. Use of the control files 320 in combination with the tables 322 can give added flexibility to application of the dynamic overlays 402, as the administrator of the system 10 has the option of modifying the content of the dynamic overlays 402 through table 322 content changes, control file 320 content changes, or a combination thereof. Further, the administrator could use different tables 322 (with varying content) that would be compatible with the same control files 320 to generate via the overlay generation algorithm 307 of different 10 dynamic overlays 402, if desired.

Example Underlying Tables of Database 20

Tranzform_Overlay_Disable_Object: Purpose of this table 322 is to identify all objects of the database 20 that the formset 12 wants protected. By default these objects will be hidden/protected/masked at runtime of the formset 12 on the UI 202.

| | |
|---|---|
| OBJ_ID | Database Primary Key |
| CATEGORY | Category of formset that the client has currently loaded. |
| OVERLAY_FORM | Uniquely identifies the name of the form for which the over-ridden object resides. This is required because we allow object re-use in the client. |
| OVERLAY_OBJ_TYPE | This identifies the control type, allowable values are: FORM, ACTION, FIELD, STATUS_PAGE AND STATUS_FIELD. |
| OVERLAY_OBJ_NAME | Identifies the unique internal name of the object that is affected. |
| OVERLAY_OBJ_ATTR | This is the attribute that we are going to enforce on the object. Allowable values are: MASKED, READONLY, HIDDEN |

Tranzform_Overlay_Disable_Object: Purpose of this table 322 is to override (ie. Enable) the disabled objects from the previous table TranzformOverlay_Disable_Object.

| | |
|---|---|
| WHO_TYPE | Application specific way of indicating what type of value is in the WHO field. Generically this would be ROLE to indicate the who value is a Role, or USER to indicate the who value is a user ID. |
| WHO | Application specific Identification of Person or group of people. Generically this would be Role or User ID, however an application can use alternate ways of identifying users. |
| OBJ_ID | Refers to object to disable, Tranzform_Overlay_Disable_Object |

Figure 7:
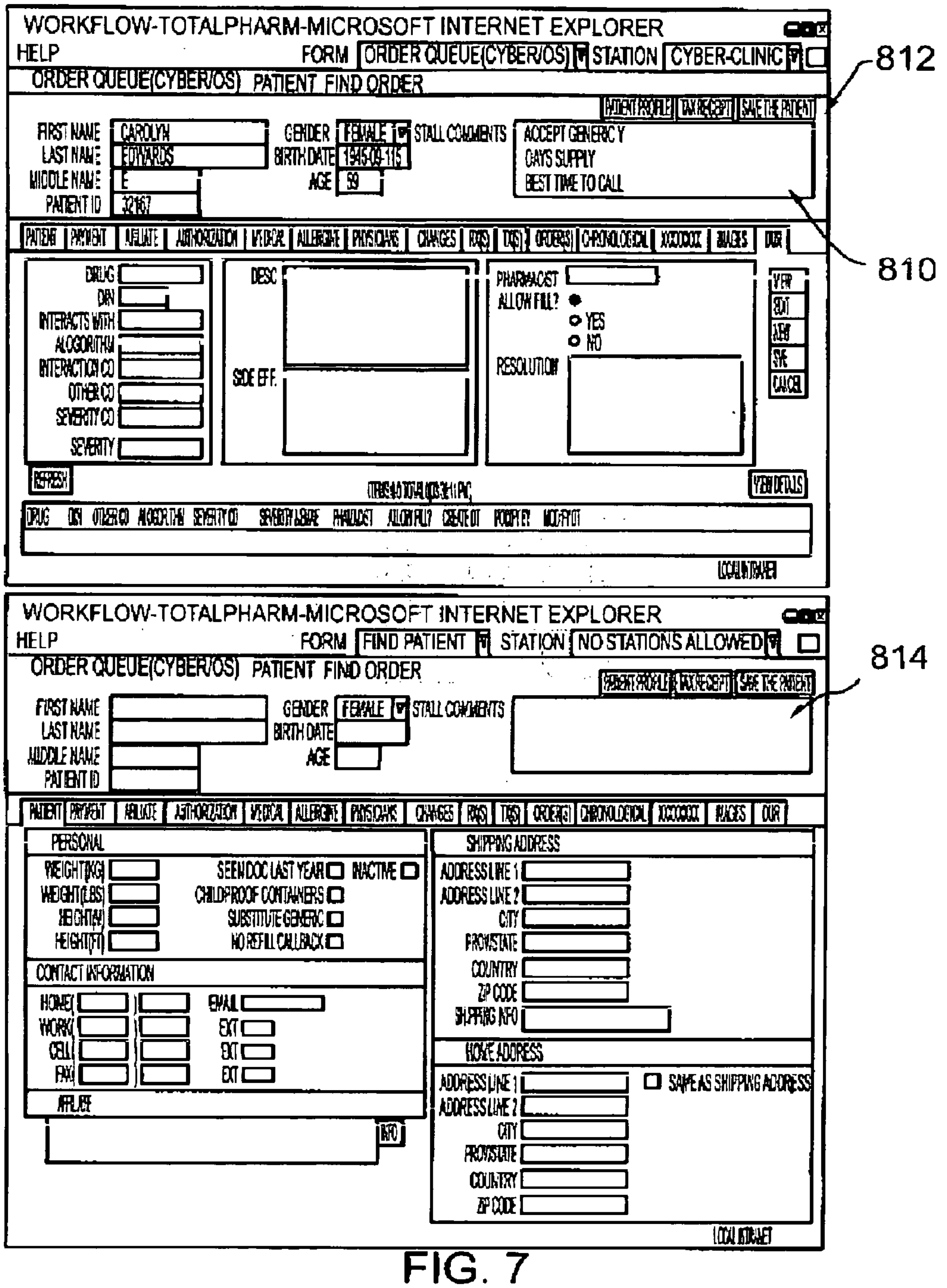
FIG. 7 is an example application of dynamic overlays of FIG. 4.

The following Example Data Entries for TRANZFORM_OVERLAY DISABLE_OBJECT, table 322 in the database 20 shows that object 21 is a protected resource 810 (see FIG. 7), whereby this resource 810 is the last tab on the right called 'DUR'.

| ID | form | type | obj | attr |
|---|---|---|---|---|
| 16 | FormHelpdesk | Form | FormHelpdesk | Hidden |
| 17 | FormHelpdesk_edit | Form | FormHelpdesk_edit | Hidden |
| 9 | FormPatientRefillQueue | Form | FormPatientRefillQueue | Hidden |
| 12 | FormPatientScannedDoc | Form | FormPatientScannedDoc | Hidden |
| 1 | FormRxorder | Form | FormRxorder | Hidden |
| 4 | FormRxorderBilling | Form | FormRxorderBilling | Hidden |
| 13 | FormRxorderComplete | Form | FormRxorderComplete | Hidden |
| 3 | FormRxorderDocAuth | Form | FormRxorderDocAuth | Hidden |
| 2 | FormRxorderOutsourcing | Form | FormRxorderOutsourcing | Hidden |
| 18 | FormRxorderPurchaseOrder | Form | FormRxorderPurchaseOrder | Hidden |
| 14 | FormRxorderReadOnly | Form | FormRxorderReadOnly | Hidden |
| 7 | FormRxorderRxEntry | Form | FormRxorderRxEntry | Hidden |
| 19 | FormRxorderShipping | Form | FormRxorderShipping | Hidden |
| 20 | FormRxorderShippingManifest | Form | FormRxorderShippingManifest | Hidden |
| 10 | FormScannedQ | Form | FormScannedQ | Hidden |

-continued

| ID | form | type | obj | attr |
|---|---|---|---|---|
| 8 | FormScannedQAuthRx | Form | FormScannedQAuthRx | Hidden |
| 11 | FormScannedQPatientInfo | Form | FormScannedQPatientInfo | Hidden |
| 5 | FormSearchOrder | Form | FormSearchOrder | Hidden |
| 6 | FormSearchPatient | Form | FormSearchPatient | Hidden |
| 15 | FormWork | Form | FormWork | Hidden |
| 21 | FormPatientLink | StatusPage | StatusPatientDurResult | Hidden |

The following Example Data Entries for TRANZFORM_OVERLAY_OVERRIDE_OBJECT table 322 in the database 20 shows that the Pharmacist role has override access to this resource 810, but the Technical role does not.

| WHO_TYPE | WHO | OBJ_ID |
|---|---|---|
| ROLE | Affiliate | 16 |
| ROLE | Data Entry | 6 |
| ROLE | Data Entry | 14 |
| ROLE | Outsource Pharmacy | 14 |
| ROLE | Pharmacist | 6 |
| ROLE | Pharmacist | 13 |
| ROLE | Pharmacist | 14 |
| ROLE | Pharmacist | 21 |
| ROLE | Physician | 14 |
| ROLE | Physician | 21 |
| ROLE | Technician | 6 |
| ROLE | Technician | 13 |
| ROLE | Technician | 14 |
| STATION | 0.0 | 11 |
| STATION | 0.5 | 5 |
| STATION | 0.5 | 10 |
| STATION | 0.5 | 11 |
| STATION | 0.5 | 12 |
| STATION | 1.0 | 1 |
| STATION | 1.0 | 2 |
| STATION | 1.0 | 5 |
| STATION | 1.0 | 15 |
| STATION | 1.0 | 17 |
| STATION | 2.0 | 15 |
| STATION | 2.0 | 16 |
| STATION | 2.0 | 17 |
| STATION | 2.5 | 9 |
| STATION | 2.5 | 15 |
| STATION | 3.0 | 1 |
| STATION | 3.0 | 5 |

-continued

| WHO_TYPE | WHO | OBJ_ID |
|---|---|---|
| STATION | 3.0 | 15 |
| STATION | 4.0 | 2 |
| STATION | 4.0 | 5 |
| STATION | 4.0 | 15 |
| STATION | 5.0 | 2 |
| STATION | 5.0 | 5 |
| STATION | 6.0 | 5 |
| STATION | 6.0 | 7 |
| STATION | 7.0 | 3 |
| STATION | 7.5 | 8 |
| STATION | 8.0 | 4 |
| STATION | 8.0 | 5 |
| STATION | 8.0 | 15 |
| STATION | 8.0 | 18 |
| STATION | 9.0 | 18 |
| STATION | 99.9 | 19 |
| STATION | 99.9 | 20 |

Referring again to FIG. 7, the screen shot 812 is that of someone logged in as a Pharmacist, and the screen shot 814 is of someone logged in as a Technician. As you can see, the protected resource 'DUR' tab 810 is shown for the pharmacist and hidden for the Technician.

Accordingly, the utility 306 can generate the dynamic overlay 402 from the above table 322 data resident in the database 20. For example, the following is the raw XML comprising the dynamic overlay 402 file, as generated by the utility 306 using the tables 322, for application to the role defined formset 12 to result in the Pharmacist screen 812 of the customized formset 12. It should be noted that there is no entry for 'StatusPatientDurResult', meaning that this pharmacist user has access to this resource.

```
<?xml version="1.0" encoding="ISO-8859-1"?>
<!DOCTYPE TxFormSetOverlay SYSTEM "/totalpharm/txforms.dtd">
<TxFormSetOverlay>
    <TxFormOverlay Name="FormHelpdesk" Overlay="Hidden"/>
    <TxFormOverlay Name="FormHelpdesk_edit" Overlay="Hidden"/>
    <TxFormOverlay Name="FormPatientRefillQueue" Overlay="Hidden"/>
    <TxFormOverlay Name="FormPatientScannedDoc" Overlay="Hidden"/>
    <TxFormOverlay Name="FormRxorder" Overlay="Hidden"/>
    <TxFormOverlay Name="FormRxorderBilling" Overlay="Hidden"/>
    <TxFormOverlay Name="FormRxorderComplete" Overlay="Hidden"/>
    <TxFormOverlay Name="FormRxorderOutsourcing" Overlay="Hidden"/>
    <TxFormOverlay Name="FormRxorderPurchaseOrder" Overlay="Hidden"/>
    <TxFormOverlay Name="FormRxorderRxEntry" Overlay="Hidden"/>
    <TxFormOverlay Name="FormRxorderShipping" Overlay="Hidden"/>
    <TxFormOverlay Name="FormRxorderShippingManifest" Overlay="Hidden"/>
    <TxFormOverlay Name="FormScannedQ" Overlay="Hidden"/>
    <TxFormOverlay Name="FormScannedQAuthRx" Overlay="Hidden"/>
    <TxFormOverlay Name="FormScannedQPatientInfo" Overlay="Hidden"/>
    <TxFormOverlay Name="FormSearchOrder" Overlay="Hidden"/>
    <TxFormOverlay Name="FormSearchPatient" Overlay="Hidden"/>
    <TxFormOverlay Name="FormWork" Overlay="Hidden"/>
        </TxFormSetOverlay>
```

Similarly, the following is the raw XML comprising the dynamic overlay 402 file as generated by the utility 306 for the role 'Technician. It should be noted that there is an entry for 'StatusPatientDurResult' and the overlay 402 property is to hide this resource from the display of the customized formset 12 on the UI 202.

```
<?xml version="1.0" encoding="ISO-8859-1"?>
<!DOCTYPE TxFormSetOverlay SYSTEM "/totalpharm/txforms.dtd">
<TxFormSetOverlay>
    <TxFormOverlay Name="FormHelpdesk" Overlay="Hidden"/>
    <TxFormOverlay Name="FormHelpdesk_edit" Overlay="Hidden"/>
    <TxFormOverlay Name="FormPatientLink">
    <TxStatusPageOverlay Name="StatusPatientDurResult" Overlay="Hidden"/>
      </TxFormOverlay>
    <TxFormOverlay Name="FormPatientRefillQueue" Overlay="Hidden"/>
    <TxFormOverlay Name="FormPatientScannedDoc" Overlay="Hidden"/>
    <TxFormOverlay Name="FormRxorder" Overlay="Hidden"/>
    <TxFormOverlay Name="FormRxorderBilling" Overlay="Hidden"/>
    <TxFormOverlay Name="FormRxorderDocAuth" Overlay="Hidden"/>
    <TxFormOverlay Name="FormRxorderOutsourcing" Overlay="Hidden"/>
    <TxFormOverlay Name="FormRxorderPurchaseOrder" Overlay="Hidden"/>
    <TxFormOverlay Name="FormRxorderRxEntry" Overlay="Hidden"/>
    <TxFormOverlay Name="FormRxorderShipping" Overlay="Hidden"/>
    <TxFormOverlay Name="FormRxorderShippingManifest" Overlay="Hidden"/>
    <TxFormOverlay Name="FormScannedQ" Overlay="Hidden"/>
    <TxFormOverlay Name="FormScannedQAuthRx" Overlay="Hidden"/>
    <TxFormOverlay Name="FormScannedQPatientInfo" Overlay="Hidden"/>
    <TxFormOverlay Name="FormSearchOrder" Overlay="Hidden"/>
    <TxFormOverlay Name="FormWork" Overlay="Hidden"/>
</TxFormSetOverlay>
```

It is recognised in the above described example of overlays 400,402 is limited to hide forms and status pages. However it is recognised that, for example, field masking and protection could also be implemented similarly.

Profiles 404

Referring to FIGS. 3 and 4, the client application 300 can request 315 the formset 12 based on the individual data settings of the user (e.g. Clayton vs. Rob), and then load 315 the data pre-populated user specific formset 12 after the profiles 404 has been applied by the server application 302. The pre-populated data settings are inserted into the various fields of the formset 12, for example data such as but not limited; to user identification data (e.g. name, role, etc . . . ), application data saved from an earlier session, and status/information of pending transactions 34 processed by a transaction processing system (not shown) since the previous display of the formset 12 (e.g. new user login). For example, the profiles 404 can be stored in the database 20 in the tables 322 and collected via control files 320 by the server application 302. It is recognised that the server application 302 can apply the profiles 404 stored at the server storage and/or database 20, the client application 300 can apply the profiles 404 located in local storage 210 (see FIG. 2), or a combination thereof.

Operation of the System 10

Figure 8:
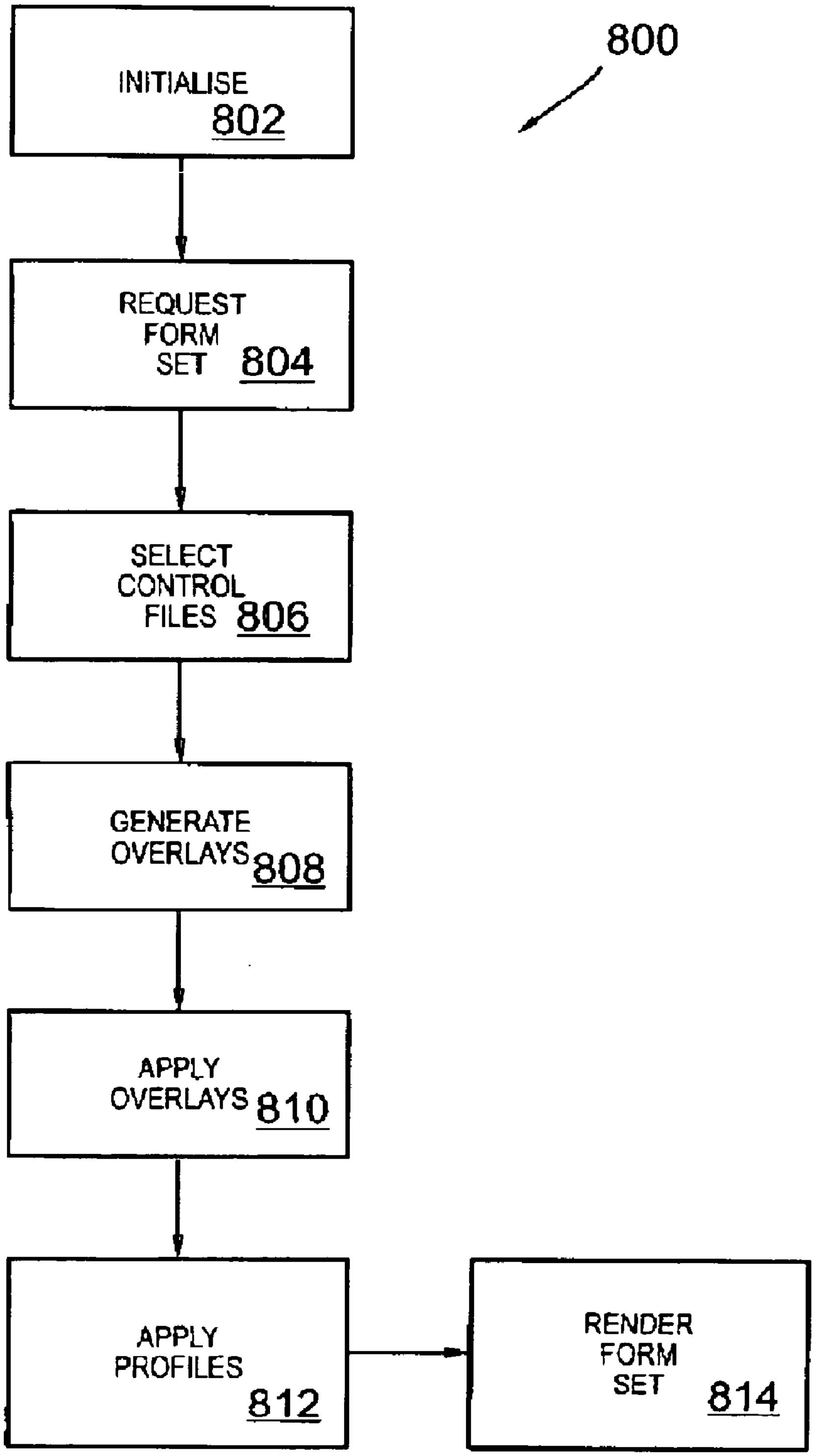
FIG. 8 are example screens resulting from the dynamic overlays of FIG. 7.

Referring to FIG. 8, operation 800 of the system 10 is shown. The client application 300 is initialized 802 on the client 14, such as via user login. At step 804 the user requests the role defined formset 12 from the server 16, including the passing of the access/generation criteria indicating category/role and user identification (individual/group). It is recognised that the request can be done as one request for all overlays 400, 402 and profiles 404, as a series of individual requests 311,313,315 as shown in FIG. 3, or some other request sequence as desired. The server application 302 then selects 806 the control files 320 and associated table 322 according to the access/generation criteria. The server application 302 then either generates or accesses 808 the overlays 400,402 according to the control files 320, as well as the profiles 404, and then applies 810 the overlays 400,402 and then applies 812 the profiles 404 to the master formset 18. The completed formset 12 is then rendered 814 to the UI 202 of the client 14. It is recognised that the overlays 400 can be applied to the master formset 18 by the server application 302 explicitly, or the server can have resident preprocessed role defined formsets 12 for selection based on the formset 12 request of the client application 300. Further, it is recognised that the server application 302 can either generate and then apply the dynamic overlays 402 to the role defined formset 12 prior to sending to the client application 302, or the server application 302 can supply both the role defined formset 12 and the overlay 402 for subsequent processing by the client application to result in the customized formset 12 for display on the UI 202.

Transaction Examples

The system 10 can support transaction 34 types, such as but not limited to:

read—reads a single matching record based on a primary key hit from the database 20 table (or one-to-one joined tables);

find—reads multiple records based on criteria passed in the submitted transaction 34; and change—insert a single new record or update a single existing record based on the primary key and the data from the arriving transaction 34.

The read template, example below as a raw template, builds a query to find the single matching record (or it returns an error) based on the primary key of the table from the database 20.

```
<TxDataField Name="encnum"><Value></Value></TxDataField>
    <TxDataField Name="diagcode1"><Value></Value></TxDataField>
    <TxDataField Name="diagcode2"><Value></Value></TxDataField>
    <TxDataField Name="diagcode3"><Value></Value></TxDataField>
    <TxDataField Name="calls"><Value></Value></TxDataField>
    <TxDataField Name="modifier1"><Value></Value></TxDataField>
    <TxDataField Name="modifier2"><Value></Value></TxDataField>
    <TxDataField Name="modifier3"><Value></Value></TxDataField>
    <TxDataField Name="facilitynum"><Value></Value></TxDataField>
    <TxDataField Name="funcctr"><Value></Value></TxDataField>
    <TxDataField Name="loccode"><Value></Value></TxDataField>
    <TxDataField Name="origfacility"><Value></Value></TxDataField>
    <TxDataField Name="origloc"><Value></Value></TxDataField>
    <TxDataField Name="busarrnum"><Value></Value></TxDataField>
    <TxDataField Name="paytocode"><Value></Value></TxDataField>
    <TxDataField Name="paytouli"><Value></Value></TxDataField>
    <TxDataField Name="locumban"><Value></Value></TxDataField>
    <TxDataField Name="referraluli"><Value></Value></TxDataField>
    <TxDataField Name="ooprefind"><Value></Value></TxDataField>
    <TxDataField Name="recoverycode"><Value></Value></TxDataField>
    <TxDataField Name="chartnum"><Value></Value></TxDataField>
    <TxDataField Name="claimamt"><Value></Value></TxDataField>
    <TxDataField Name="claimamtind"><Value></Value></TxDataField>
    <TxDataField Name="trayeligible"><Value></Value></TxDataField>
    <TxDataField Name="intercept"><Value></Value></TxDataField>
    <TxDataField Name="confind"><Value></Value></TxDataField>
    <TxDataField Name="goodfaithind"><Value></Value></TxDataField>
    <TxDataField Name="newborncode"><Value></Value></TxDataField>
    <TxDataField Name="emsafind"><Value></Value></TxDataField>
    <TxDataField Name="paperdocind"><Value></Value></TxDataField>
    <TxDataField Name="hosporigdate"><Value></Value></TxDataField>
    <TxDataField Name="toothcode"><Value></Value></TxDataField>
    <TxDataField Name="toothsurf1"><Value></Value></TxDataField>
    <TxDataField Name="toothsurf2"><Value></Value></TxDataField>
    <TxDataField Name="toothsurf3"><Value></Value></TxDataField>
    <TxDataField Name="toothsurf4"><Value></Value></TxDataField>
    <TxDataField Name="toothsurf5"><Value></Value></TxDataField>
  </TxDataSegment>
  <TxDataSegment Name="ab__cpd1">
    <TxDataField Name="eb__claim__id" Returned="No" JoinTxDataSegment="ab__ebill"
JoinTxDataField="eb__claim__id"><Value></Value></TxDataField>
    <TxDataField Name="segseq" SortOrder="Asc"><Value></Value></TxDataField>
    <TxDataField Name="persontype"><Value></Value></TxDataField>
    <TxDataField Name="surname"><Value></Value></TxDataField>
    <TxDataField Name="middlename"><Value></Value></TxDataField>
    <TxDataField Name="firstname"><Value></Value></TxDataField>
    <TxDataField Name="birthdate"><Value></Value></TxDataField>
    <TxDataField Name="gender"><Value></Value></TxDataField>
    <TxDataField Name="address1"><Value></Value></TxDataField>
    <TxDataField Name="address2"><Value></Value></TxDataField>
    <TxDataField Name="address3"><Value></Value></TxDataField>
    <TxDataField Name="city"><Value></Value></TxDataField>
    <TxDataField Name="postalcode"><Value></Value></TxDataField>
    <TxDataField Name="provstate"><Value></Value></TxDataField>
    <TxDataField Name="country"><Value></Value></TxDataField>
    <TxDataField Name="parentuli"><Value></Value></TxDataField>
    <TxDataField Name="parentregnum"><Value></Value></TxDataField>
  </TxDataSegment>
  <TxDataSegment Name="ab__cst1">
    <TxDataField Name="eb__claim__id" Returned="No" JoinTxDataSegment="ab__ebill"
JoinTxDataField="eb__claim__id"><Value></Value></TxDataField>
    <TxDataField Name="text"><Value></Value></TxDataField>
  </TxDataSegment>
 </TxDataSegment>
</Transaction>
```

It should be noted how the join fields can reference each other to perform a one-to-one join across tables (like the eb_claim_id field in the ab_cib1, ab_cpd1, and ab_cst1 segments). If any of the fields in the read template have a value specified (like the action field in the ab_ebill segment), the specified value becomes part of the where criteria to form a filter. This template is invoked based on the transaction 34 class name submitted from the client application 300 matching the <transaction-class>.template.xml.

The find template builds a query to find multiple matching records (zero to many) based on the criteria submitted as fields on the transaction 34 the client application 300 submitted.

```
- <xsl:transform xmlns:xsl="http://www.w3.org/1999/XSL/
Transform" version="1.0">
```

-continued

```
<xsl:output omit-xml-declaration=“yes” />
- <xsl:template match=“/”>
  <p />
  <hr />
  <h1>Claim Summary</h1>
- <table border=“1” cellspacing=“0” cellpadding=“2” width=“100%”>
- <tr>
- <td>
  <b>Claim Number</b>
  </td>
- <td>
  <b>Claimed</b>
  </td>
- <td>
  <b>Priced</b>
  </td>
- <td>
  <b>Submit Dt</b>
  </td>
- <td>
  <b>Action</b>
  </td>
- <!--      <td><b>Prefix</b></td>
  -->
- <!--      <td><b>Source</b></td>
  -->
- <td>
  <b>BA</b>
  </td>
- <!--      <td><b>Provider__Name</b></td>
  -->
- <!--      <td><b>Provider</b></td>
  -->
- <td>
  <b>Recipient</b>
  </td>
- <td>
  <b>Service Code</b>
- </td>
- <td>
  <b>Service Dt</b>
  </td>
- <td>
  <b>State</b>
  </td>
- <!--      <td><b>Org</b></td>
  -->
  </tr>
- <xsl:for-each select=“//TxDataSegment”>
- <tr>
- <xsl:for-each select=“TxDataField”>
- <xsl:choose>
- <xsl:when test=“@Name = ‘claimed__amount’”>
- <td>
  $
  <xsl:value-of select=“Value” />
  </td>
  </xsl:when>
- <xsl:when test=“@Name = ‘priced__amount’”>
- <td>
  $
  <xsl:value-of select=“Value” />
  </td>
  </xsl:when>
- <xsl:when test=“@Name = ‘claim__state’”>
- <td>
- <xsl:choose>
  <xsl:when test=“Value=“G””>Generated</xsl:when>
  <xsl:when test=“Value=“C””>Processing</xsl:when>
  <xsl:when test=“Value=“A””>Assessed</xsl:when>
- <xsl:otherwise>
  <xsl:value-of select=“Value” />
- <xsl:if test=“Value=””>
  <xsl:text />
  </xsl:if>
  </xsl:otherwise>
  </xsl:choose>
  </td>
  </xsl:when>
```

-continued

```
- <xsl:when test=“@Name = ‘action__code’”>
- <td>
- <xsl:choose>
  <xsl:when test=“Value=“A””>Add</xsl:when>
  <xsl:when test=“Value=“C””>Change</xsl:when>
  <xsl:when test=“Value=“P””>Pending</xsl:when>
  <xsl:when test=“Value=“D””>Delete</xsl:when>
- <xsl:otherwise>
  <xsl:value-of select=“Value” />
- <xsl:if test=“Value=””>
  <xsl:text />
  </xsl:if>
  </xsl:otherwise>
  </xsl:choose>
  </td>
  </xsl:when>
  <xsl:when test=“@Name = ‘eb__account__id’” />
  <xsl:when test=“@Name = ‘eb__user__id’” />
  <xsl:when test=“@Name = ‘eb__claim__id’” />
  <xsl:when test=“@Name = ‘eb__submission__id’” />
  <xsl:when test=“@Name = ‘eb__claim__seq__num’” />
  <xsl:when test=“@Name = ‘claim__seg__seq’” />
  <xsl:when test=“@Name = ‘segment__seq__number’” />
  <xsl:when test=“@Name = ‘eb__assess__id’” />
  <xsl:when test=“@Name = ‘provideruli’” />
  <xsl:when test=“@Name = ‘recipientregnum’” />
  <xsl:when test=“@Name = ‘claim__source’” />
  <xsl:when test=“@Name = ‘sub__system__id1’” />
  <xsl:when test=“@Name = ‘sub__system__id2’” />
  <xsl:when test=“@Name = ‘provider__name’” />
  <xsl:when test=“@Name = ‘provider’” />
  <xsl:when test=“@Name = ‘eb__org__id’” />
  <xsl:when test=“@Name = ‘claim__seq__number’” />
- <!-- , , , , , , , , , , , , , , , , , , , , claim__seq__number
  -->
- <xsl:otherwise>
- <!--         <td><xsl:value-of select=“Value”/><xsl:if test=
“Value=””><xsl:text> </xsl:text></xsl:if></td>
  -->
- <xsl:choose>
- <xsl:when test=“Value = ” and count(Value)=1”>
  <td>-</td>
  </xsl:when>
- <xsl:otherwise>
- <td>
  <xsl:value-of select=“Value” />
  </td>
  </xsl:otherwise>
  </xsl:choose>
  </xsl:otherwise>
  </xsl:choose>
  </xsl:for-each>
  </tr>
  </xsl:for-each>
  </table>
  <p />
  <hr />
  <h2>Field Definitions</h2>
  <p />
- <table>
- <tr>
  <th>State</th>
  <th>Description</th>
  </tr>
- <tr>
  <td>Generated</td>
  <td>Ebill.ca has generated the claim and sent it to Alberta Health
  for processing.</td>
  </tr>
- <tr>
  <td>Assessed</td>
  <td>AHC has finished processing this claim and Ebill.ca
  has the assessment results available</td>
  </tr>
- <tr>
  <td>Processing</td>
  <td>Ebill.ca is currently generating this claim, but has not yet
  sent it to AHC</td>
  </tr>
```

-continued

```
</table>
</xsl:template>
</xsl:transform>
```

Again, the find template invoked is based on the transaction 34 class name submitted matching the <transaction-class>.find.properties file—see Appendix A. The database query is broken out into a list of select fields, the names to call those select fields in the XML response returned, the tables to select from, the order by clause, and then a list of where criteria. Each where criteria has it's own two entries in the find properties file, the first being 'dependancy' which is the field in the arriving transaction that this criteria is dependent upon and the second being 'where' which is the actual criteria to append to the where clause. If the dependency is blank then the criteria is always applied. If the dependency is non-blank, it will only be applied if the field named is supplied in the arriving transaction. Note that the various database 20 query portions can have database 20 type specific versions, which will be invoked appropriately depending on the database 20 communicating with (such as the 1 where criteria which does date arithmetic in a database specific manner). Paging can be automatically supported (ie break the response into pages of 100 records each).

As an aside, an example XSLT based reporting of the system 10 supports can do a find as described above and then processes the resulting XML response through a XSL transform named <transaction-class>.find.xsl in a second step which converts the XML into HTML, PDF, excel, or word mime types.

The change transaction 34 does not use a server 16 side description and may only affect a single record. It defaults to a NRP (node rules processor) base class that assumes the data segments in the arriving transaction 34 map to table names and the data fields in the arriving transaction map to columns/fields within that table. This default NRP can also perform optimistic concurrency checking (when an update arrives, check that the existing record [if any] has not been modified). Individual fields and/or segments can be marked as non-database values in which case they are not persisted to the relation database 20 tables. An application specific extension of this base NRP class can be configured for different transaction 34 classes to implement business logic based on hooks imbedded in the base NRP class.

The NRP is chosen is based on the transaction 34 type and transaction class of the arriving transaction 34 through a global mapping properties file, such as but not limited to:

```
; **** all find trxns ****
Transaction.Find.RulesProcessor = ca.ebill.base.xml__db.FindNRP
 ; **** by default, map everything to an invalid NRP ****
Transaction.Change.RulesProcessor = ware.tranzform.client.xml__db.InvalidNRP
Transaction.Read.RulesProcessor = ware.tranzform.client.xml__db.InvalidNRP
; **** AB Pending Claims ****
Transaction.Change.ab__ebill.RulesProcessor = ca.ebill.ab.xml__db.AbNRP
Transaction.Change.outlook__ab__ebill.RulesProcessor = ca.ebill.ab.xml__db.AbNRP
Transaction.Read.ab__ebill.RulesProcessor = ca.ebill.ab.xml__db.AbNRP
Transaction.Read.ab__ebill__c.RulesProcessor = ca.ebill.ab.xml__db.AbNRP
Transaction.Read.ab__ebill__a.RulesProcessor = ca.ebill.ab.xml__db.AbNRP
```

The above is a fragment from the <application>.xml.parser.properties file—see Appendix A. This shows all the Find transaction types being mapped to the generic java class ca.ebill.base.xml_db.FindNRP. The Change and Read transaction 34 types are then mapped to specialized NRPs that contain the business logic for the specific transaction 34 classes, with the demonstration above of the different change and read ab_ebill claim transaction 34 classes all being mapped to the same ca.ebill.ab.xml_db.AbNRP java class that implements the NRP interface and extends the generic NRP base class. The generic NRP base class has hooks that call overrideable methods when certain events happen, such as when a table node is read from the arriving XML transaction 34, or the transaction 34 root node is read from the arriving XML transaction 34. The extending application specific NRP class (AbNRP in this case) can then override that method and perform business logic, such as edit checking fields, ensuring if the location is hospital there has to be a hospital admit date set, and other application specific business logic.

Appendix A: Example Java to Object Template Propery Files
<transaction-class>.find.properties

```
sql.select.mysql_innodb= claim_number, claim_source, claimed_amount, priced_amount, load_datetime,
action_code, sub_system_id1, sub_system_id2, EB_CLAIMS.ba_number,
concat(ORG_PROVIDER.first_name,' ',ORG_PROVIDER.last_name), provider, recipient, service_code,
service_date, claim_state, EB_CLAIMS.eb_account_id, EB_CLAIMS.eb_org_id, eb_user_id, eb_claim_id,
eb_claim_seq_num, segment_seq_number
sql.select.sqlserver=   claim_number, claim_source, claimed_amount, priced_amount, load_datetime,
action_code, sub_system_id1, sub_system_id2, EB_CLAIMS.ba_number, ORG_PROVIDER.first_name+'
'+ORG_PROVIDER.last_name, provider, recipient, service_code, service_date, claim_state,
EB_CLAIMS.eb_account_id, EB_CLAIMS.eb_org_id, eb_user_id, eb_claim_id, eb_claim_seq_num,
segment_seq_number
sql.return_select= claim_number, claim_source, claimed_amount, priced_amount, load_datetime,
action_code, sub_system_id1, sub_system_id2, ba_number, provider_name, provider, recipient,
service_code, service_date, claim_state, eb_account_id, eb_org_id, eb_user_id, eb_claim_id,
eb_claim_seq_num, segment_seq_number, claim_seq_number
sql.from=EB_CLAIMS left join ORG_PROVIDER on EB_CLAIMS.provider =
ORG_PROVIDER.provider_id_num and EB_CLAIMS.eb_org_id = ORG_PROVIDER.eb_org_id
sql.where= n,a, b,m, l,  c, d, e, f, g, h, i, j, k, ownership
sql.orderby=EB_CLAIMS.load_datetime desc, EB_CLAIMS.eb_claim_id

a.dependancy=eb_account_id
a.where=EB_CLAIMS.eb_account_id = $eb_account_id$

b.dependancy=eb_org_id
b.where=EB_CLAIMS.eb_org_id = $eb_org_id$

c.dependancy=eb_user_id
c.where=eb_user_id = $eb_user_id$

d.dependancy= action_code
d.where action_code = '$action_code$'

e.dependancy= sub_system_id1
e.where sub_system_id1 = '$sub_system_id1$'

f.dependancy= sub_system_id2
f.where sub_system_id2 = '$sub_system_id2$'

g.dependancy= claim_number
g.where claim_number = '$claim_number$'

h.dependancy= provider
h.where provider = '$provider$'

i.dependancy= recipient
i.where recipient = '$recipient$'

j.dependancy= ba_number
j.where EB_CLAIMS.ba_number = $ba_number$

k.dependancy= claim_state
k.where claim_state = '$claim_state$'
```

```
l.dependancy= service_date
l.where.mysql_innodb service_date < $@DATE@service_date$ and service_date >
date_sub($@DATE@service_date$,INTERVAL 7 DAY)
l.where.sqlserver   service_date < $@DATE@service_date$ and service_date > dateadd(day, -7,
$@DATE@service_date$)

m.dependancy= start_rpt_period, end_rpt_period
m.where load_datetime >= $@DATE@start_rpt_period$ and load_datetime <=
$@DATE@end_rpt_period$

n.dependancy=eb_submission_id
n.where=eb_submission_id = $eb_submission_id$

ownership.dependancy=owner_in_list
ownership.where= EB_CLAIMS.owner in ($@RAW@owner_in_list$)


; File        : ebill.xml.parser.properties

; Description  : this file defines all properties used by the XML to Database utilities.

;============================================================================
;file format:
;============================================================================
; key                                         value description
;---------------------------------------------------------------------------
; sax_parser                                   3rd party Sax parser to use when parsing XML documents

; <top level tag>.<transaction type>.<action>.XmlTrxnClass     Transaction class to use for this specified
transaction type.
; <top level tag>.<transaction type>.<action>.RulesProcessor    Rules processor class to use for this
specified transaction type.
; <top level tag>                              Is the top node in the XML document.
; <transaction type>                             If the top level has different types, this is it
; <action>                                    Specific action to perform on this transaction type.
;============================================================================
; Sun Sax Parser
sax_parser = com.sun.xml.parser.ValidatingParser
; IBM Sax Parser
;sax_parser = com.ibm.xml.parsers.SAXParser

;; ----------------------------------
;;       data access logging section
;; ----------------------------------
; logging class to use
;;access_logger.class =ware.util.xml_db.accessLog.impl.JLogAccessLogger
access_logger.class =ware.util.xml_db.accessLog.impl.TranzformAuditTrailAccessLogger
access_logger.params= java.lang.String
access_logger.args  = @dbpoolname@

; objects to log when accessed
access_log_list=patientRead, patientFind, patientChange
patientRead.log.object = patient
patientRead.log.type = Read
patientRead.log.field.list = patient_id, eb_org_id
```

```
patientFind.log.object = patient
patientFind.log.type = Find
patientFind.log.field.list = *
patientChange.log.object = patient
patientChange.log.type = Change
patientChange.log.field.list = *
;; -----------------------------------

; dtd file for transaction responses
Transaction.DTD = /[zone]/xmlDbTxn.dtd
default.DTD     = /[zone]/xmlDbTxn.dtd
Txn.alias       = Transaction

; type = 'Save' trxnClass = '*'
Transaction.Change.XmlTrxnClass = ware.util.xml_db.transaction.XmlBaseTrxn
; type = 'Read' trxnClass = '*'
Transaction.Read.XmlTrxnClass = ware.util.xml_db.transaction.XmlTemplateTrxn
; type = 'Find' trxnClass = '*'
Transaction.Find.XmlTrxnClass = ware.util.xml_db.transaction.XmlFindTrxn
; **** all find trxns ****
Transaction.Find.RulesProcessor = ca.ebill.base.xml_db.FindNRP

; **** by default, map everything to an invalid NRP ****
Transaction.Change.RulesProcessor = ware.tranzform.client.xml_db.InvalidNRP
Transaction.Read.RulesProcessor = ware.tranzform.client.xml_db.InvalidNRP

; **** AB Pending Claims ****
Transaction.Change.ab_ebill.RulesProcessor = ca.ebill.ab.xml_db.AbNRP
Transaction.Change.outlook_ab_ebill.RulesProcessor = ca.ebill.ab.xml_db.AbNRP
Transaction.Read.ab_ebill.RulesProcessor = ca.ebill.ab.xml_db.AbNRP
Transaction.Read.ab_ebill_c.RulesProcessor = ca.ebill.ab.xml_db.AbNRP
Transaction.Read.ab_ebill_a.RulesProcessor = ca.ebill.ab.xml_db.AbNRP

; **** AB Submit/Delete ****
Transaction.Change.AbEbillSubmit.RulesProcessor = ca.ebill.ab.xml_db.AbEbillSubmitNRP
Transaction.Change.AbEbillDelete.RulesProcessor = ca.ebill.ab.xml_db.AbEbillDeleteNRP

; **** CashClaim ****
Transaction.Change.CashClaim.RulesProcessor = ca.ebill.ab.xml_db.AbNRP
Transaction.Change.cash_claim.RulesProcessor = ca.ebill.ab.xml_db.AbNRP

; **** accounting groups NRP ****
Transaction.Change.accounting_groups.RulesProcessor = ca.ebill.ab.xml_db.AccountingGroupNRP
Transaction.Find.accounting_groups.RulesProcessor = ca.ebill.ab.xml_db.AccountingGroupNRP
Transaction.Read.view_accounting_group.RulesProcessor = ca.ebill.ab.xml_db.AccountingGroupNRP
Transaction.Change.add_accounting_groups_access.RulesProcessor =
ca.ebill.ab.xml_db.AccountingGroupNRP
Transaction.Change.remove_accounting_groups_access.RulesProcessor =
ca.ebill.ab.xml_db.AccountingGroupNRP
Transaction.Change.add_provider_membership.RulesProcessor =
ca.ebill.ab.xml_db.AccountingGroupNRP
Transaction.Change.remove_provider_membership.RulesProcessor =
ca.ebill.ab.xml_db.AccountingGroupNRP
```

```
; **** ProviderNRP ****
Transaction.Change.org_provider.RulesProcessor = ca.ebill.base.xml_db.OrgProviderNRP
Transaction.Read.org_provider.RulesProcessor = ca.ebill.base.xml_db.OrgProviderNRP

; **** Addon Features ****
Transaction.Change.purchase_useraddon.RulesProcessor = ca.ebill.base.xml_db.AdminNRP
Transaction.Change.unpurchase_useraddon.RulesProcessor = ca.ebill.base.xml_db.AdminNRP
Transaction.Change.additional_features.RulesProcessor =
ware.tranzform.client.xml_db.AdditionalFeaturesNRP

; **** user info profile and sharing****
Transaction.Read.user_info.RulesProcessor = ca.ebill.base.xml_db.UserInfoNRP
Transaction.Read.eb_group_user.RulesProcessor = ca.ebill.base.xml_db.UserInfoNRP
Transaction.Change.eb_group_user.RulesProcessor = ca.ebill.base.xml_db.UserInfoNRP
Transaction.Change.assign_user_sharing.RulesProcessor = ca.ebill.base.xml_db.UserInfoNRP

; **** admin NRP ****
Transaction.Read.person.RulesProcessor = ca.ebill.base.xml_db.AdminNRP
Transaction.Read.company.RulesProcessor = ca.ebill.base.xml_db.AdminNRP
Transaction.Read.eb_account.RulesProcessor = ca.ebill.base.xml_db.AdminNRP
Transaction.Read.eb_org.RulesProcessor = ca.ebill.base.xml_db.AdminNRP
Transaction.Read.eb_system.RulesProcessor = ca.ebill.base.xml_db.AdminNRP
Transaction.Read.user_profile.RulesProcessor = ca.ebill.base.xml_db.AdminNRP
Transaction.Read.profile.RulesProcessor = ca.ebill.base.xml_db.AdminNRP
Transaction.Read.profile_field.RulesProcessor = ca.ebill.base.xml_db.AdminNRP
Transaction.Read.ba_number.RulesProcessor = ca.ebill.base.xml_db.AdminNRP
Transaction.Read.user_system.RulesProcessor = ca.ebill.base.xml_db.AdminNRP
Transaction.Read.eb_user.RulesProcessor = ca.ebill.base.xml_db.AdminNRP
Transaction.Read.tranzform_category.RulesProcessor = ca.ebill.base.xml_db.AdminNRP
Transaction.Read.tranzform_user_formset.RulesProcessor = ca.ebill.base.xml_db.AdminNRP
Transaction.Read.tranzform_formset.RulesProcessor = ca.ebill.base.xml_db.AdminNRP
Transaction.Read.tranzform_profile.RulesProcessor = ca.ebill.base.xml_db.AdminNRP
Transaction.Change.person.RulesProcessor = ca.ebill.base.xml_db.AdminNRP
Transaction.Change.company.RulesProcessor = ca.ebill.base.xml_db.AdminNRP
Transaction.Change.eb_account.RulesProcessor = ca.ebill.base.xml_db.AdminNRP
Transaction.Change.eb_org.RulesProcessor = ca.ebill.base.xml_db.AdminNRP
Transaction.Change.eb_system.RulesProcessor = ca.ebill.base.xml_db.AdminNRP
Transaction.Change.ba_system.RulesProcessor = ca.ebill.base.xml_db.AdminNRP
Transaction.Change.user_system.RulesProcessor = ca.ebill.base.xml_db.AdminNRP
Transaction.Change.eb_user.RulesProcessor = ca.ebill.base.xml_db.AdminNRP
Transaction.Change.profile.RulesProcessor = ca.ebill.base.xml_db.AdminNRP
Transaction.Change.assign_profile.RulesProcessor = ca.ebill.base.xml_db.AdminNRP
Transaction.Change.user_profile.RulesProcessor = ca.ebill.base.xml_db.AdminNRP
Transaction.Change.profile_field.RulesProcessor = ca.ebill.base.xml_db.AdminNRP
Transaction.Change.ba_number.RulesProcessor = ca.ebill.base.xml_db.AdminNRP
Transaction.Change.tranzform_category.RulesProcessor = ca.ebill.base.xml_db.AdminNRP
Transaction.Change.tranzform_user_formset.RulesProcessor = ca.ebill.base.xml_db.AdminNRP
Transaction.Change.tranzform_formset.RulesProcessor = ca.ebill.base.xml_db.AdminNRP
Transaction.Change.tranzform_profile.RulesProcessor = ca.ebill.base.xml_db.AdminNRP
Transaction.Change.provider.RulesProcessor = ca.ebill.base.xml_db.AdminNRP
Transaction.Read.provider.RulesProcessor = ca.ebill.base.xml_db.AdminNRP

; **** patient NRP ****
Transaction.Change.new_patient.RulesProcessor = ca.ebill.ehr.xml_db.PatientNRP
Transaction.Change.patient.RulesProcessor = ca.ebill.ehr.xml_db.PatientNRP
```

```
Transaction.Change.extrapatient.RulesProcessor = ca.ebill.ehr.xml_db.PatientNRP
Transaction.Read.extrapatient.RulesProcessor = ca.ebill.ehr.xml_db.PatientNRP
Transaction.Change.tpb.RulesProcessor = ca.ebill.ehr.xml_db.PatientNRP
Transaction.Read.tpb.RulesProcessor = ca.ebill.ehr.xml_db.PatientNRP
Transaction.Read.patient.RulesProcessor = ca.ebill.ehr.xml_db.PatientNRP
Transaction.Read.printpatientreport.RulesProcessor = ca.ebill.ehr.xml_db.PatientNRP
Transaction.Change.pmh.RulesProcessor = ca.ebill.ehr.xml_db.PatientNRP
Transaction.Change.allergy.RulesProcessor = ca.ebill.ehr.xml_db.PatientNRP
Transaction.Read.cpp.RulesProcessor = ca.ebill.ehr.xml_db.PatientNRP
Transaction.Change.document.RulesProcessor = ca.ebill.ehr.xml_db.PatientNRP
Transaction.Change.patient_employer.RulesProcessor = ca.ebill.ehr.xml_db.PatientNRP
; **** OutlookSyncPatientNRP ****
Transaction.Change.outlook_patient.RulesProcessor = ca.ebill.ab.xml_db.OutlookSyncPatientNRP
Transaction.Read.outlook_patient.RulesProcessor = ca.ebill.ab.xml_db.OutlookSyncPatientNRP
; **** appointment NRP ****
Transaction.Change.appointment.RulesProcessor = ca.ebill.ehr.xml_db.AppointmentNRP
Transaction.Change.outlook_appointment.RulesProcessor = ca.ebill.ehr.xml_db.AppointmentNRP
Transaction.Change.remove_appointment.RulesProcessor = ca.ebill.ehr.xml_db.AppointmentNRP
Transaction.Change.mark_as_billed.RulesProcessor = ca.ebill.ehr.xml_db.AppointmentNRP

; **** appointment NRP ****
Transaction.Change.directbilling.RulesProcessor = ca.ebill.ab.xml_db.DirectBillingNRP
; **** prescription NRP ****
Transaction.Read.prescription.RulesProcessor = ca.ebill.ehr.xml_db.PrescriptionNRP
Transaction.Read.new_prescription.RulesProcessor = ca.ebill.ehr.xml_db.PrescriptionNRP
Transaction.Change.prescription_saved.RulesProcessor = ca.ebill.ehr.xml_db.PrescriptionNRP
Transaction.Change.prescription.RulesProcessor = ca.ebill.ehr.xml_db.PrescriptionNRP
Transaction.Change.new_prescription.RulesProcessor = ca.ebill.ehr.xml_db.PrescriptionNRP
Transaction.Change.refill_prescription.RulesProcessor = ca.ebill.ehr.xml_db.PrescriptionNRP
Transaction.Change.delete_favorite.RulesProcessor = ca.ebill.ehr.xml_db.PrescriptionNRP
Transaction.Change.delete_adr.RulesProcessor = ca.ebill.ehr.xml_db.PrescriptionNRP
Transaction.Change.adr.RulesProcessor = ca.ebill.ehr.xml_db.PrescriptionNRP
Transaction.Read.adr.RulesProcessor = ca.ebill.ehr.xml_db.PrescriptionNRP
Transaction.Read.PrintRx.RulesProcessor = ca.ebill.ehr.xml_db.PrescriptionNRP
; **** PrintableFormsNRP ****
Transaction.Change.tranzform_printable_form.RulesProcessor =
ca.ebill.base.xml_db.EbillPrintableFormsNRP
Transaction.Read.tranzform_printable_form.RulesProcessor =
ca.ebill.base.xml_db.EbillPrintableFormsNRP
Transaction.Read.printable_form_consultletter.RulesProcessor =
ca.ebill.base.xml_db.EbillPrintableFormsNRP
; **** LabNRP ****
Transaction.Change.lab.RulesProcessor = ca.ebill.ehr.xml_db.LabNRP
Transaction.Read.lab.RulesProcessor = ca.ebill.ehr.xml_db.LabNRP
Transaction.Change.lab_result.RulesProcessor = ca.ebill.ehr.xml_db.LabNRP
Transaction.Read.lab_result.RulesProcessor = ca.ebill.ehr.xml_db.LabNRP
Transaction.Change.lab_markasread.RulesProcessor = ca.ebill.ehr.xml_db.LabNRP
Transaction.Change.lab_markasreadforpatient.RulesProcessor = ca.ebill.ehr.xml_db.LabNRP
Transaction.Change.lab_toggleshared.RulesProcessor = ca.ebill.ehr.xml_db.LabNRP
Transaction.Change.lab_togglesharedforpatient.RulesProcessor = ca.ebill.ehr.xml_db.LabNRP
Transaction.Read.PrintLab.RulesProcessor = ca.ebill.ehr.xml_db.LabNRP
Transaction.Read.PrintLabCumulative.RulesProcessor = ca.ebill.ehr.xml_db.LabNRP
Transaction.Change.manuallab.RulesProcessor = ca.ebill.ehr.xml_db.LabNRP
Transaction.Read.manuallab.RulesProcessor = ca.ebill.ehr.xml_db.LabNRP
; **** Billing and appointments go as one to this NRP from Digital Dashboard
```

```
Transaction.Change.outlook_daysheet.RulesProcessor = ca.ebill.ab.xml_db.BillingAppointmentNRP

; **** saveToBilling NRP ****
Transaction.Change.save_to_billing.RulesProcessor = ca.ebill.ehr.xml_db.SaveToBillingNRP

; **** Template NRP
Transaction.Read.template.RulesProcessor = ca.ebill.ehr.xml_db.TemplateNRP
Transaction.Change.template.RulesProcessor = ca.ebill.ehr.xml_db.TemplateNRP
Transaction.Read.template.RulesProcessor = ca.ebill.ehr.xml_db.TemplateNRP
Transaction.Change.quickplan.RulesProcessor = ca.ebill.ehr.xml_db.TemplateNRP
; **** encounter NRP ****
Transaction.Read.problem.RulesProcessor = ca.ebill.ab.xml_db.EncounterRoutingNRP
Transaction.Change.problem.RulesProcessor = ca.ebill.ab.xml_db.EncounterRoutingNRP
Transaction.Change.use_quickplan.RulesProcessor = ca.ebill.ab.xml_db.EncounterRoutingNRP
Transaction.Read.followup.RulesProcessor = ca.ebill.ab.xml_db.EncounterRoutingNRP
Transaction.Change.followup.RulesProcessor = ca.ebill.ab.xml_db.EncounterRoutingNRP
Transaction.Change.create_skeleton_claim.RulesProcessor = ca.ebill.ab.xml_db.EncounterRoutingNRP
Transaction.Change.draft_problem.RulesProcessor = ca.ebill.ab.xml_db.EncounterRoutingNRP
Transaction.Read.consultletter.RulesProcessor = ca.ebill.ab.xml_db.EncounterRoutingNRP
Transaction.Read.wcb.RulesProcessor = ca.ebill.ab.xml_db.EncounterRoutingNRP

; **** UsePatient NRP ****
Transaction.Read.patient_hidden.RulesProcessor = ca.ebill.ab.xml_db.UsePatientNRP

; **** AssignedTaskNRP ****
Transaction.Change.assigned_task.RulesProcessor = ca.ebill.ehr.xml_db.AssignedTaskNRP
Transaction.Change.mark_completed.RulesProcessor = ca.ebill.ehr.xml_db.AssignedTaskNRP

; **** PatientReportNRP ****
Transaction.Change.patient_report.RulesProcessor = ca.ebill.ehr.xml_db.PatientReportNRP
Transaction.Read.patient_report.RulesProcessor = ca.ebill.ehr.xml_db.PatientReportNRP

; **** WcbNRP ****
Transaction.Change.abwcb_case.RulesProcessor = ca.ebill.ab.xml_db.WcbNRP
Transaction.Read.abwcb_case.RulesProcessor = ca.ebill.ab.xml_db.WcbNRP
Transaction.Change.new_abwcb_transaction.RulesProcessor = ca.ebill.ab.xml_db.WcbNRP
Transaction.Change.delete_abwcb_transaction.RulesProcessor = ca.ebill.ab.xml_db.WcbNRP
Transaction.Change.abwcb_transaction.RulesProcessor = ca.ebill.ab.xml_db.WcbNRP
Transaction.Change.abwcb_transaction_submit.RulesProcessor = ca.ebill.ab.xml_db.WcbNRP
Transaction.Change.abwcb_transaction_submit_pending.RulesProcessor = ca.ebill.ab.xml_db.WcbNRP
Transaction.Read.abwcb_transaction.RulesProcessor = ca.ebill.ab.xml_db.WcbNRP

; **** QuickSelectNRP ****
Transaction.Change.quick_select.RulesProcessor = ca.ebill.ehr.xml_db.QuickSelectNRP
Transaction.Change.quick_select_new.RulesProcessor = ca.ebill.ehr.xml_db.QuickSelectNewNRP
```

Appendix B: Master AB Billing XML Formset

This is the master formset 18 for the ebill.ca Alberta billing formset 12, from the file 'source_abClaim.xml'.

```
<?xml version="1.0" encoding="ISO-8859-1"?>
<!DOCTYPE TxFormSet SYSTEM "txforms.dtd">
<TxFormSet Name="Claim"
        Version="T2"
        TransactionDTD="xmlDbTxn.dtd"
        TransactionEncoding="ISO-8859-1"
        >

<TxList Type="TxField">
  <TxField Name="blank" Id="blank" Type="String" Size="0" DisplaySize="0" Required="No" Editable="No" ForceUppercase="No"
Returned="No" FieldType="Other">
    <Label>Unused</Label>
    <Desc>This space is intentionally left blank</Desc>
  </TxField>
  <TxField Name="getpatientinfoflag" Id="getpatientinfoflag" Type="String" Size="-1" Required="No" Editable="No" FieldType="Other"
Default="">
    <Label></Label>
    <Desc></Desc>
  </TxField>
<!-- These segment ids must match the synchronization actions' transaction classes -->
  <TxField Name="OutlookHelp" Id="Help" Type="Text" Rows="3" Required="No" Editable="No" ForceUppercase="No"
        Default="The claims accepted from Outlook appointments will not be submitted
to Alberta Health until you mark the claims as submittable. Click on the Claim Status tab to work with your accepted claims."
  >
    <Label></Label>
    </TxField>

<!-- Start of Ebill claim fields -->
  <TxField Name="hidden.appointment.appointment_id" Id="appointment_id" Type="String" Size="9" Required="No" Editable="No"
FieldType="Other">
    <Label>Appointment Id</Label>
    <Desc></Desc>
  </TxField>

  <TxField Name="ClaimSourceWeb" Id="claim_source" SegmentId="ab_ebill" Type="String" Default="W">
    <Desc>Claim source web</Desc>
    </TxField>
  <TxField Name="ClaimSourceOutlook" Id="claim_source" SegmentId="ab_ebill" Type="String" Default="N">
    <Desc>Claim source outlook</Desc>
    </TxField>
  <TxField Name="EbillClaimId" Id="eb_claim_id" SegmentId="ab_ebill" Type="Integer" >
    <Desc>Ebill internal claim identifier</Desc>
    </TxField>
  <TxField Name="EbillClaimIdJoin" Id="eb_claim_id" Type="Integer" SegmentId="none" Returned="No"
        JoinSegment="ab_ebill" JoinField="eb_claim_id">
    <Desc>Ebill internal claim identifier</Desc>
    </TxField>
<!-- cpd1 needs a different join segment for cib1 and cst1 segments otherwise multiple cib1 segments will be created on the full add
save action -->
  <TxField Name="EbillClaimIdJoin_cpd1" Id="eb_claim_id" Type="Integer" SegmentId="none" Returned="No"
        JoinSegment="ab_ebill" JoinField="eb_claim_id">
    <Desc>Ebill internal claim identifier</Desc>
    </TxField>
  <TxField Name="EbillClaimIdJoin_cst1" Id="eb_claim_id" Type="Integer" SegmentId="none" Returned="No"
        JoinSegment="ab_ebill" JoinField="eb_claim_id">
    <Desc>Ebill internal claim identifier</Desc>
    </TxField>
  <!-- RBT 2003-06-16 change short and full save to use ClaimStateSave variable tied to the ab_ebill segment
     this means reads will fill this variable and saves will send it.  Back end has to set it to E or P
     properly on the save.
     Likewise with the WarningCountSave variable
     RBT 2003-07-21 set ClaimStateSave to Editable="Yes" from "No"
  -->
```

```
<TxField Name="ClaimStateSave" Id="claim_state" SegmentId="ab_ebill" Type="String" Editable="Yes" Default="P">
 <Label>Status</Label>
 </TxField>
<TxField Name="WarningCountSave" Id="warning_count" SegmentId="ab_ebill" Type="Integer" Size="3" Default="0">
 <Desc></Desc>
</TxField>
<TxField Name="ClaimStatusNew" Id="claim_state" Type="String" Editable="No" Default="N">
 <Label>Status</Label>
 </TxField>
<TxField Name="ClaimStatusPending" Id="claim_state" Type="String" Default="P">
 <Label>Status</Label>
 </TxField>
<TxField Name="ClaimStatusSubmitted" Id="claim_state" Type="String" Editable="No" Default="S">
 <Label>Status</Label>
 </TxField>
<TxField Name="ClaimStatusDeleted" Id="claim_state" Type="String" Default="D">
 <Label>Status</Label>
 </TxField>
<TxField Name="ClaimStateAll" Id="claim_state_pending" Type="String" Editable="No" Default="yes">
 </TxField>
<TxField Name="ClaimStateNonSubmittable" Id="claim_state_other" Type="String" Editable="No" Default="yes">
 </TxField>
<TxField Name="ClaimStatePending" Id="claim_state" Type="String" Editable="No" Default="P">
 </TxField>
<TxField Name="ClaimStateError" Id="claim_state" Type="String" Editable="No" Default="E">
 </TxField>
<TxField Name="ClaimStateNew" Id="claim_state" Type="String" Editable="No" Default="N">
 </TxField>
<TxField Name="ClaimStateDeleted" Id="claim_state" Type="String" Editable="No" Default="D">
 </TxField>
<TxField Name="ClaimStateSubmitted" Id="claim_state" Type="String" Editable="No" Default="S">
 </TxField>
<TxField Name="EbillLogonId" Id="logon_userid" FieldType="Other" Type="String" Default="#USER#">
 <Label>UserId</Label>
 </TxField>
<!-- End of Ebill claim fields -->

<!-- Start of AHC claim fields -->
 <!-- Start of Common segment fields -->
 <TxField Name="Owner" Id="Owner" Type="String" Size="20" Required="No">
  <Label>Chart</Label>
  <Desc>The chart number/name you want to look up</Desc>
  </TxField>

 <TxField Name="SubPrefix" Id="sub_system_id1" Type="String" Size="3" Default="EBI">
  <Label>SubPref</Label>
  <Desc>Submitter Prefix</Desc>
  </TxField>
 <TxField Name="SourceCode" Id="sub_system_id2" Type="String" Editable="No" Size="2">
  <Label>Source</Label>
  <Desc>Submitter source code, assigned by ebill</Desc>
  </TxField>
 <TxField Name="ClaimTag" Id="claim_number" Size="15">
  <Label>Claim Number</Label>
  <Desc>AHC claim number</Desc>
  </TxField>
 <TxField Name="ClaimTagLabel" Id="claim_number" Size="15" Editable="No">
  <Label>Claim Number</Label>
  <Desc>AHC claim number</Desc>
  </TxField>
 <TxField Name="ClaimTagOpt" Id="claim_number" Size="15" Required="No">
  <Label>Claim Number</Label>
  <Desc>AHC claim number</Desc>
  </TxField>
 <TxField Name="ActionAdd" Id="Action" Type="String" Size="1" Default="A">
  <Label>Action</Label>
  <Desc>Claim action code, "A" for Add</Desc>
  </TxField>
 <TxField Name="ActionChange" Id="Action" Type="String" Size="1" Default="C">
```

```
 </TxField>
<TxField Name="ActionChangeLabel" Id="Action" Type="String" Editable="No" Size="10" Default="Change">
 <Label>Action</Label>
 <Desc>Change claim accepted by AHC</Desc>
 </TxField>
<TxField Name="ActionDelete" Id="Action" Type="String" Size="1" Default="D">
 </TxField>
<TxField Name="ActionDeleteLabel" Id="Action" Type="String" Editable="No" Size="10" Default="Delete">
 <Label>Action</Label>
 <Desc>Delete claim accepted by AHC</Desc>
 </TxField>
<TxField Name="ActionReassess" Id="Action" Type="String" Size="1" Default="R">
 </TxField>
<TxField Name="ActionReassessLabel" Id="Action" Type="String" Editable="No" Size="10" Default="Reassess">
 <Label>Action</Label>
 <Desc>Reassess claim accepted by AHC</Desc>
 </TxField>
<TxField Name="Filler6" Id="Filler" Type="String" Editable="No" Size="6">
 <Desc>Unused - leave blank</Desc>
 </TxField>
<TxField Name="EbAccountId" Id="eb_account_id" Type="String" Editable="No" Size="10">
 <Desc></Desc>
</TxField>
<TxField Name="EbOrgId" Id="eb_org_id" Type="String" Editable="No" Size="10">
 <Desc></Desc>
</TxField>
<TxField Name="EbUserId" Id="eb_user_id" Type="String" Editable="No" Size="10">
 <Desc></Desc>
</TxField>
<TxField Name="WarningCount" Id="warning_count" Type="Integer" Size="3">
 <Desc></Desc>
</TxField>
<!-- RBT added these 4 fields -->
<TxField Name="OverrideRules" Id="override_rules" Editable="No" Required="No">
 <Label></Label>
 <Desc>Check the box to ignore errors generated by rules</Desc>
 <TxChoice Type="Check">
  <TxChoiceItem><Value>N</Value><Label>Override Rules</Label></TxChoiceItem>
  <TxChoiceItem><Value>Y</Value><Label></Label></TxChoiceItem>
 </TxChoice>
</TxField>
<TxField Name="OverridePricing" Id="override_pricing" Editable="No" Required="No">
 <Label></Label>
 <Desc>Check the box to ignore errors generated by pricing</Desc>
 <TxChoice Type="Check">
  <TxChoiceItem><Value>N</Value><Label>Override Pricing</Label></TxChoiceItem>
  <TxChoiceItem><Value>Y</Value><Label></Label></TxChoiceItem>
 </TxChoice>
</TxField>
<TxField Name="PricedAmount" Id="priced_amount" Editable="No" Required="No" Type="String" Size="10">
 <Label>Priced Amount</Label>
 <Desc>The priced amount for this service</Desc>
</TxField>
<TxField Name="TrayEligible" Id="trayeligible" Editable="No" Size="10" Required="No">
 <Label>Tray Eligible</Label>
 <Desc>Is this service code eligible for the tray modifier extra price?</Desc>
 <TxChoice>
  <TxChoiceItem><Value>U</Value><Label>Unknown</Label></TxChoiceItem>
  <TxChoiceItem><Value>Y</Value><Label>Yes</Label></TxChoiceItem>
  <TxChoiceItem><Value>N</Value><Label>No</Label></TxChoiceItem>
 </TxChoice>
</TxField>
<!-- End of Common segment fields -->

<!-- Start of cib1 segment fields -->
<TxField Name="ProviderULI" Id="ProviderULI" Type="Integer" Size="9">
 <Label>Prac-Num</Label>
 <Desc>Service Provider Prac Num</Desc>
 </TxField>
```

```
<TxField Name="ProviderULILabel" Id="ProviderULI" Type="Integer" Size="9" Editable="No" Required="No">
  <Label>Prac-Num</Label>
  <Desc>Service Provider Prac Num</Desc>
  </TxField>
 <TxField Name="SkillCode" Id="SkillCode" Type="String" Size="4" Required="No">
  <Desc>Service Provider Skill Code</Desc>
  </TxField>
 <TxField Name="RecipientULI" Id="RecipientULI" Type="Integer" Size="9" Required="No" LookupId="patient_id_num">
  <Label>Patient ULI</Label>
  <Desc>Service Recipient ULI</Desc>
  </TxField>
 <TxField Name="RecipientULILabel" Id="RecipientULI" Type="Integer" Size="9" Required="No" Editable="No">
  <Label>Patient ULI</Label>
  <Desc>Service Recipient ULI</Desc>
  </TxField>
 <TxField Name="RecipientRegNum" Id="RecipientRegNum" Type="String" Size="12" Required="No"
LookupId="oop_patient_num">
  <Label>Patient OOP HCN</Label>
  <Desc>Service Recipient out-of-province healthcare number</Desc>
 </TxField>
 <TxField Name="RecipientRegNumLabel" Id="RecipientRegNum" Type="String" Size="12" Required="No" Editable="No">
  <Label>Patient OOP HCN</Label>
  <Desc>Service Recipient out-of-province healthcare number</Desc>
  </TxField>
 <TxField Name="ServCode" Id="ServCode" Type="String" Size="7" Action="ActionServiceCodeLookup" LookupId="servcode">
  <Label>Service Code</Label>
  <Desc>Health Service Code for service performed</Desc>
  </TxField>
 <TxField Name="ServCodeLabel" Id="ServCode" Type="String" Size="7" Editable="No" Required="No">
  <Label>Service Code</Label>
  <Desc>Health Service Code for service performed</Desc>
  </TxField>
 <!-- RBT 2003-07-14 change service start date to remember the previously entered value
 <TxField Name="ServStartDate" Id="ServStartDate" Type="RelativeDate" Size="10" Default="#NOW#" Format="yyyy/MM/dd">
 -->
 <TxField Name="ServStartDate" Id="ServStartDate" Type="RelativeDate" Size="10" Default="#PREVIOUS#"
Format="yyyy/MM/dd">
  <Label>Service Date</Label>
  <Desc>Start date of service performed, YYYYMMDD, or relative</Desc>
  </TxField>
 <!-- RBT 2003-07-14 change service start date to remember the previously entered value
 <TxField Name="ServStartDateLabel" Id="ServStartDate" Type="Date" Size="10" Editable="No" Required="No" Default="#NOW#"
 -->
 <TxField Name="ServStartDateLabel" Id="ServStartDate" Type="Date" Size="10" Editable="No" Required="No"
Default="#PREVIOUS#"
     Format="yyyy/MM/dd" TxnType="DateTime">
  <Label>Service Date</Label>
  <Desc>Start date of service performed, YYYYMMDD</Desc>
  </TxField>
 <TxField Name="EncNum" Id="EncNum" Type="Integer" Size="1" Default="1" Min="1" Max="5">
  <Label>Encounter #</Label>
  <Desc>Indicates the service was performed on the 1st, 2nd, etc. encounter that day</Desc>
  </TxField>
 <TxField Name="DiagCode1" Id="DiagCode1" Type="String" Size="6" Required="No" Action="ActionDiagCodeLookup1"
LookupId="diag_code">
  <Label>Diagnostic</Label>
  <Desc>ICD-9 diagnostic code for service</Desc>
  </TxField>
 <TxField Name="DiagCode2" Id="DiagCode2" Type="String" Size="6" Required="No" Action="ActionDiagCodeLookup2"
LookupId="diag_code">
  <Label>Diagnostic</Label>
  <Desc>ICD-9 diagnostic code for service</Desc>
  </TxField>
 <TxField Name="DiagCode3" Id="DiagCode3" Type="String" Size="6" Required="No" Action="ActionDiagCodeLookup3"
LookupId="diag_code">
  <Label>Diagnostic</Label>
  <Desc>ICD-9 diagnostic code for service</Desc>
  </TxField>
 <TxField Name="Calls" Id="Calls" Type="Integer" Size="3" Default="1">
```

<Label>Calls</Label>
<Desc>The number of services, units or consecutive hospital visit days</Desc>
</TxField>
<TxField Name="TotalTime" Id="TotalTime" Type="Integer" Size="3" FieldType="Other" Required="No">
<Label>Elapsed Time</Label>
<Desc>Elapsed time for this service in minutes, if applicable. If start/sto times are provided, this time will be calculated.</Desc>
</TxField>
<TxField Name="StartTime" Id="StartTime" Type="Integer" Size="4" FieldType="Other" Required="No">
<Label>Start Time</Label>
<Desc>(HHMM)Time this service started. Must also provide either a stop time or a total elapsed time value. 3 digit values will have a zero prepended.</Desc>
</TxField>
<TxField Name="StopTime" Id="StopTime" Type="Integer" Size="4" FieldType="Other" Required="No">
<Label>Stop Time</Label>
<Desc>(HHMM)Time this service stopped. Must also provide either a start time or a total elapsed time value. 3 digit values will have a zero prepended.</Desc>
</TxField>
<TxField Name="Modifier1" Id="Modifier1" Type="String" Size="6" Required="No" Action="ActionFeeModLookup1" LookupId="modifier_code">
<Label>Modifier</Label>
<Desc>Explicit Fee Modifier for Health Service Code</Desc>
</TxField>
<TxField Name="Modifier2" Id="Modifier2" Type="String" Size="6" Required="No" Action="ActionFeeModLookup2" LookupId="modifier_code">
<Label>Modifier</Label>
<Desc>Explicit Fee Modifier for Health Service Code</Desc>
</TxField>
<TxField Name="Modifier3" Id="Modifier3" Type="String" Size="6" Required="No" Action="ActionFeeModLookup3" LookupId="modifier_code">
<Label>Modifier</Label>
<Desc>Explicit Fee Modifier for Health Service Code</Desc>
</TxField>
<TxField Name="FacilityNum" Id="FacilityNum" Type="Integer" Size="6" Required="No">
<Label>Facility #</Label>
<Desc>Facility where service was performed. Location Code must have a value if this is blank</Desc>
</TxField>
<TxField Name="FuncCtr" Id="FuncCtr" Type="String" Size="4" Required="No">
<Label>Functional Centre</Label>
<Desc>Functional Centre where service was performed</Desc>
</TxField>
<TxField Name="LocCode" Id="LocCode" Type="String" Size="5" Editable="No" Required="No" ForceUppercase="No" >
<Label>Location</Label>
<Desc>Location Code must have a value if Functional Centre is blank</Desc>
<TxChoice>
<TxChoiceItem><Value></Value></TxChoiceItem>
<TxChoiceItem><Value>HOME</Value><Label>Home</Label></TxChoiceItem>
<TxChoiceItem><Value>OTHR</Value><Label>Other</Label></TxChoiceItem>
</TxChoice>
</TxField>
<TxField Name="OrigFacility" Id="OrigFacility" Type="Integer" Size="6" Required="No">
<Label>Originating Facility</Label>
<Desc>Facility where encounter occurred if different than Facility where service was performed.</Desc>
</TxField>
<TxField Name="OrigLoc" Id="OrigLoc" Type="String" Editable="No" Size="5" Required="No" ForceUppercase="No">
<Label>Originating Location</Label>
<Desc>Location where encounter occurred if different than Location where service was performed.</Desc>
<TxChoice>
<TxChoiceItem><Value></Value></TxChoiceItem>
<TxChoiceItem><Value>HOME</Value><Label>Home</Label></TxChoiceItem>
<TxChoiceItem><Value>OTHR</Value><Label>Other</Label></TxChoiceItem>
</TxChoice>
</TxField>
<TxField Name="BusArrNum" Id="BusArrNum" Type="Integer" Size="7">
<Label>Bus Arrangement</Label>
<Desc>Alberta Health Business Arrangement number</Desc>
</TxField>
<TxField Name="BusArrNumLabel" Id="BusArrNum" Type="Integer" Size="7" Editable="No">
<Label>Bus Arrangement</Label>
<Desc>Alberta Health Business Arrangement number</Desc>

```
 </TxField>
<TxField Name="PayToCode" Id="PayToCode" Type="String" Editable="No" Required="No" Size="15" ForceUppercase="No">
 <Label>Pay To</Label>
 <Desc>Indicates to what person or organization the payment is to be made.</Desc>
 <TxChoice>
  <TxChoiceItem><Value>BAPY</Value><Label>BA #</Label></TxChoiceItem>
  <TxChoiceItem><Value>RECP</Value><Label>Recipient</Label></TxChoiceItem>
  <TxChoiceItem><Value>PRVD</Value><Label>Provider</Label></TxChoiceItem>
  <TxChoiceItem><Value>CONT</Value><Label>Contract Holder</Label></TxChoiceItem>
  <TxChoiceItem><Value>OTHR</Value><Label>Other</Label></TxChoiceItem>
 </TxChoice>
 </TxField>
<TxField Name="PayToCodeLabel" Id="PayToCode" Type="String" Size="15" Editable="No" Required="No">
 <Label>Pay To</Label>
 <Desc>Indicates to what person or organization the payment is to be made.</Desc>
 <TxChoice Selectable="No">
  <TxChoiceItem><Value>BAPY</Value><Label>BA #</Label></TxChoiceItem>
  <TxChoiceItem><Value>RECP</Value><Label>Recipient</Label></TxChoiceItem>
  <TxChoiceItem><Value>PRVD</Value><Label>Provider</Label></TxChoiceItem>
  <TxChoiceItem><Value>CONT</Value><Label>Contract Holder</Label></TxChoiceItem>
  <TxChoiceItem><Value>OTHR</Value><Label>Other</Label></TxChoiceItem>
 </TxChoice>
 </TxField>
<TxField Name="PayToULI" Id="PayToULI" Type="Integer" Size="9" Required="No">
 <Label>Pay To ULI</Label>
 <Desc>Payment Recipient ULI if Pay To Code is "OTHER"</Desc>
 </TxField>
<TxField Name="LocumBAN" Id="LocumBAN" Type="Integer" Size="7" Required="No">
 <Label>Locum BA</Label>
 <Desc>Alberta Health Business Arrangement number for Locum</Desc>
 </TxField>
<TxField Name="ReferralULI" Id="ReferralULI" Type="Integer" Size="9" Required="No" Action="ActionReferralUliLookup"
LookupId="provider_id_num">
 <Label>Referral Prac-Num</Label>
 <Desc>The referring Service Provider's ULI</Desc>
 </TxField>
<TxField Name="OOPRefInd" Id="OOPRefInd" Type="String" Size="3" Editable="No" Required="No" ForceUppercase="No">
 <Label>OOP Reference</Label>
 <Desc>Indicates whether service was referred from an OOP Provider</Desc>
 <TxChoice>
  <TxChoiceItem><Value>N</Value><Label>No</Label></TxChoiceItem>
  <TxChoiceItem><Value>Y</Value><Label>Yes</Label></TxChoiceItem>
 </TxChoice>
 </TxField>
<TxField Name="RecoveryCode" Id="RecoveryCode" Type="String" Size="17" Editable="No" Required="No" ForceUppercase="No"
LookupId="oop_province_code">
 <Label>Recovery Code</Label>
 <Desc>Organization responsible for payment if not Alberta Health.</Desc>
 <TxChoice>
  <TxChoiceItem><Value>AB</Value><Label>Alberta Health</Label></TxChoiceItem>
  <TxChoiceItem><Value>BC</Value><Label>British Columbia</Label></TxChoiceItem>
  <TxChoiceItem><Value>MB</Value><Label>Manitoba</Label></TxChoiceItem>
  <TxChoiceItem><Value>NF</Value><Label>Newfoundland</Label></TxChoiceItem>
  <TxChoiceItem><Value>NB</Value><Label>New Brunswick</Label></TxChoiceItem>
  <TxChoiceItem><Value>NS</Value><Label>Nova Scotia</Label></TxChoiceItem>
  <TxChoiceItem><Value>NT</Value><Label>Northwest Territories</Label></TxChoiceItem>
  <TxChoiceItem><Value>NU</Value><Label>Nunavut</Label></TxChoiceItem>
  <TxChoiceItem><Value>ON</Value><Label>Ontario</Label></TxChoiceItem>
  <TxChoiceItem><Value>PE</Value><Label>Prince Edward Island</Label></TxChoiceItem>
  <TxChoiceItem><Value>SK</Value><Label>Saskatchewan</Label></TxChoiceItem>
  <TxChoiceItem><Value>YT</Value><Label>Yukon Territories</Label></TxChoiceItem>
 </TxChoice>
</TxField>
<TxField Name="ChartNum" Id="ChartNum" Type="String" Size="14" Required="No" Action="ActionPatientLookup"
LookupId="chartnum">
 <Label>Chart</Label>
 <Desc>The chart number/name you want to look up</Desc>
 </TxField>
<TxField Name="ChartNumLabel" Id="ChartNum" Type="String" Size="14" Required="No" Editable="No">
```

```
    <Label>Chart</Label>
    <Desc>The chart number/name you want to look up</Desc>
    </TxField>
  <TxField Name="ClaimAmt" Id="ClaimAmt" Type="Dollars" Size="9" Required="No">
    <Label>Claimed Amt</Label>
    <Desc>Claimed Amount is ignored unless Claimed Amount Indicator is "Yes".
Enter dollar amount.</Desc>
    </TxField>
  <TxField Name="ClaimAmtInd" Id="ClaimAmtInd" Type="String" Size="3" Editable="No" Required="No" ForceUppercase="No">
    <Label>Claimed Amt Ind</Label>
    <Desc>Claimed Amount is ignored unless Claimed Amount Indicator is "Yes"</Desc>
    <TxChoice>
      <TxChoiceItem><Value>N</Value><Label>No</Label></TxChoiceItem>
      <TxChoiceItem><Value>Y</Value><Label>Yes</Label></TxChoiceItem>
    </TxChoice>
    </TxField>
  <TxField Name="Intercept" Id="Intercept" Type="String" Size="3" Editable="No" Required="No" ForceUppercase="No">
    <Label>Intercept Payment</Label>
    <Desc>Reason for Alberta Health to intercept payment</Desc>
    <TxChoice>
      <TxChoiceItem><Value></Value><Label>No</Label></TxChoiceItem>
      <TxChoiceItem><Value>PKUP</Value><Label>Yes</Label></TxChoiceItem>
    </TxChoice>
    </TxField>
  <TxField Name="ConfInd" Id="ConfInd" Type="String" Size="3" Editable="No" Required="No" ForceUppercase="No">
    <Label>Confidential</Label>
    <Desc>Indicates whether service is to be treated as confidential</Desc>
    <TxChoice>
      <TxChoiceItem><Value>N</Value><Label>No</Label></TxChoiceItem>
      <TxChoiceItem><Value>Y</Value><Label>Yes</Label></TxChoiceItem>
    </TxChoice>
    </TxField>
  <TxField Name="GoodFaithInd" Id="GoodFaithInd" Type="String" Size="3" Editable="No" Required="No" ForceUppercase="No">
    <Label>Good Faith</Label>
    <Desc>Indicates a Good Faith claim. Requires Person Data Segment for Service Recipient.</Desc>
    <TxChoice>
      <TxChoiceItem><Value>N</Value><Label>No</Label></TxChoiceItem>
      <TxChoiceItem><Value>Y</Value><Label>Yes</Label></TxChoiceItem>
    </TxChoice>
    </TxField>
  <TxField Name="NewbornCode" Id="NewbornCode" Type="String" Size="14" Editable="No" Required="No"
ForceUppercase="No">
    <Label>Newborn</Label>
    <Desc>Indicates Service Recipient is newborn without an Alberta Health ULI. Requires Person Data Segment for Service
Recipient.</Desc>
    <TxChoice>
      <TxChoiceItem><Value></Value><Label>No</Label></TxChoiceItem>
      <TxChoiceItem><Value>ADOP</Value><Label>Adoption</Label></TxChoiceItem>
      <TxChoiceItem><Value>LVBR</Value><Label>Live birth</Label></TxChoiceItem>
      <TxChoiceItem><Value>STBN</Value><Label>Still born</Label></TxChoiceItem>
      <TxChoiceItem><Value>MULT</Value><Label>Multiple birth</Label></TxChoiceItem>
    </TxChoice>
    </TxField>
  <TxField Name="EMSAFInd" Id="EMSAFInd" Type="String" Size="3" Editable="No" Required="No" ForceUppercase="No">
    <Label>EMSAF</Label>
    <Desc>Indicates a EMSAF claim. Requires supporting text.</Desc>
    <TxChoice>
      <TxChoiceItem><Value>N</Value><Label>No</Label></TxChoiceItem>
      <TxChoiceItem><Value>Y</Value><Label>Yes</Label></TxChoiceItem>
    </TxChoice>
    </TxField>
  <TxField Name="PaperDocInd" Id="PaperDocInd" Type="String" Size="3" Editable="No" Required="No" ForceUppercase="No">
    <Label>Paper Doc</Label>
    <Desc>Indicates whether supporting documentation is being sent on paper.</Desc>
    <TxChoice>
      <TxChoiceItem><Value>N</Value><Label>No</Label></TxChoiceItem>
      <TxChoiceItem><Value>Y</Value><Label>Yes</Label></TxChoiceItem>
    </TxChoice>
    </TxField>
```

```
<TxField Name="HospOrigDate" Id="HospOrigDate" Type="Date" Size="8" Required="No"
   Format="yyyy-MM-dd" TxnType="DateTime">
  <Label>Hosp Adm/Orig Enc Date</Label>
  <Desc>Hospital admission date if service is a hospital visit or originating encounter date if Originating Facility is entered,
YYYYMMDD</Desc>
  </TxField>
<TxField Name="ToothCode" Id="ToothCode" Type="String" Size="2" Required="No">
  <Label>Tooth Code</Label>
  <Desc>As per Dental Procedures List</Desc>
  </TxField>
<TxField Name="ToothSurf1" Id="ToothSurf1" Type="String" Size="2" Required="No">
  <Label>Tooth Surface 1</Label>
  <Desc>As per Dental Procedures List</Desc>
  </TxField>
<TxField Name="ToothSurf2" Id="ToothSurf2" Type="String" Size="2" Required="No">
  <Label>Tooth Surface 2</Label>
  <Desc>As per Dental Procedures List</Desc>
  </TxField>
<TxField Name="ToothSurf3" Id="ToothSurf3" Type="String" Size="2" Required="No">
  <Label>Tooth Surface 3</Label>
  <Desc>As per Dental Procedures List</Desc>
  </TxField>
<TxField Name="ToothSurf4" Id="ToothSurf4" Type="String" Size="2" Required="No">
  <Label>Tooth Surface 4</Label>
  <Desc>As per Dental Procedures List</Desc>
  </TxField>
<TxField Name="ToothSurf5" Id="ToothSurf5" Type="String" Size="2" Required="No">
  <Label>Tooth Surface 5</Label>
  <Desc>As per Dental Procedures List</Desc>
  </TxField>
<TxField Name="Filler9" Id="Filler" Type="String" Editable="No" Size="9">
  <Desc>Unused - leave blank</Desc>
  </TxField>
<!-- End of cib1 segment fields -->

<!-- Start of cpd1 segment fields -->
<TxField Name="SegSeq" Id="SegSeq" Type="Integer" Size="1" Default="">
  <Desc>Segment sequence of CPD1</Desc>
  </TxField>
<TxField Name="PersonType" Id="PersonType" Type="String" Size="22" Editable="No" Default="RECP" ForceUppercase="No">
  <Label>Person Type</Label>
  <Desc>Indicates segment is for Service Recipient, Payee or OOP Referring Provider</Desc>
  <TxChoice>
   <TxChoiceItem><Value>RECP</Value><Label>Service Recipient</Label></TxChoiceItem>
   <TxChoiceItem><Value>PYST</Value><Label>Payee</Label></TxChoiceItem>
   <TxChoiceItem><Value>RFRC</Value><Label>OOP Referring Provider</Label></TxChoiceItem>
  </TxChoice>
  </TxField>
<TxField Name="Surname" Id="Surname" Type="String" Size="30">
  <Label>Last Name</Label>
  <Desc>Person's last name</Desc>
  </TxField>
<TxField Name="MiddleName" Id="MiddleName" Type="String" Size="12" Required="No">
  <Label>Middle Name</Label>
  <Desc>Person's middle name</Desc>
  </TxField>
<TxField Name="FirstName" Id="FirstName" Type="String" Size="12">
  <Label>First Name</Label>
  <Desc>Person's first name</Desc>
  </TxField>
<TxField Name="BirthDate" Id="BirthDate" Type="Date" Size="8" Required="No"
   Format="yyyy-MM-dd" TxnType="DateTime">
  <Label>Birth Date</Label>
  <Desc>Person's birth date as YYYYMMDD</Desc>
  </TxField>
<TxField Name="Gender" Id="Gender" Type="String" Size="6" Editable="No" ForceUppercase="No">
  <Label>Gender</Label>
  <Desc>Gender</Desc>
  <TxChoice>
```

```
     <TxChoiceItem><Value></Value><Label></Label></TxChoiceItem>
     <TxChoiceItem><Value>F</Value><Label>Female</Label></TxChoiceItem>
     <TxChoiceItem><Value>M</Value><Label>Male</Label></TxChoiceItem>
   </TxChoice>
   </TxField>
  <TxField Name="GenderCode" Id="GenderCode" Type="String">
   <Desc>Gender field in Outlook</Desc>
   </TxField>
  <TxField Name="Address1" Id="Address1" Type="String" Size="25">
   <Label>Address</Label>
   <Desc>Person's address</Desc>
   </TxField>
  <TxField Name="Address2" Id="Address2" Type="String" Size="25" Required="No">
   <Label>Address</Label>
   <Desc>Person's address</Desc>
   </TxField>
  <TxField Name="Address3" Id="Address3" Type="String" Size="25" Required="No">
   <Label>Address</Label>
   <Desc>Person's address</Desc>
   </TxField>
  <TxField Name="City" Id="City" Type="String" Size="30">
   <Label>City</Label>
   <Desc>City</Desc>
   </TxField>
  <TxField Name="CityName" Id="CityName" Type="String" Size="30">
   <Desc>City field in Outlook</Desc>
   </TxField>
  <TxField Name="PostalCode" Id="PostalCode" Type="String" Size="6" Required="No">
   <Label>Postal/Zip</Label>
   <Desc>Postal/Zip Code</Desc>
   </TxField>
  <TxField Name="ProvState" Id="ProvState" Type="String" Size="2">
   <Label>Prov/State</Label>
   <Desc>Province or State code</Desc>
   </TxField>
  <TxField Name="Country" Id="Country" Type="String" Size="4" Default="CAN" Required="No">
   <Label>Country Code</Label>
   <Desc>Country Code</Desc>
   </TxField>
  <TxField Name="ParentULI" Id="ParentULI" Type="Integer" Size="9" Required="No">
   <Label>Parent's ULI</Label>
   <Desc>Parent's ULI</Desc>
   </TxField>
  <TxField Name="ParentRegNum" Id="ParentRegNum" Type="String" Size="12" Required="No">
   <Label>Parent's RegNum</Label>
   <Desc>Parent's Registration Number</Desc>
   </TxField>
  <TxField Name="Filler14" Id="Filler" Type="String" Editable="No" Size="14">
   <Desc>Unused - leave blank</Desc>
   </TxField>
  <!-- End of cpd1 segment fields -->

  <!-- Start of cst1 segment fields -->
  <TxField Name="Text" Id="Text" Type="Text" Size="10240" ForceUppercase="No">
   <Label>Text</Label>
   <Desc>Supporting text</Desc>
   </TxField>
  <!-- End of cst1 segment fields -->
 <!-- End of ACH fields -->
  <TxField Name="HelpExternal" Id="Help" Type="Text" ForceUppercase="No" Editable="No">
   <Label>Help</Label>
   <Desc>Help</Desc>
   <Value>Use this form to submit a Change, Delete or Reassess claim
for claims originally submitted by a external submitter (not ebill).

Use the Find formset to locate the assessment in order to modify a claim
originally submitted through ebill.
   </Value>
   </TxField>
```

```
<TxField Name="CashClaimId" Id="cash_claim_id" Type="Integer" >
  <Desc>Ebill internal cash claim identifier</Desc>
</TxField>
<TxField Name="CashAmount" Id="CashAmount" Type="Text" Size="20" Required="No">
  <Label>Amount</Label>
</TxField>
<TxField Name="CashTax" Id="CashTax" Type="Text" Size="20" Required="No">
  <Label>Tax</Label>
</TxField>
<TxField Name="CashTaxCode" Id="CashTaxCode" Type="Text" Size="4" Required="No">
  <Label>Tax Code</Label>
</TxField>
<TxField Name="CashTotal" Id="CashTotal" Type="Text" Size="20" Required="No">
  <Label>Total</Label>
</TxField>
<TxField Name="CashPaid" Id="CashPaid" Type="Text" Size="20" Required="No">
  <Label>Paid</Label>
</TxField>
<TxField Name="CashMethod" Id="CashMethod" Type="Text" Size="20" Required="No">
  <Label>Payment Method</Label>
</TxField>
<TxField Name="CashCode" Id="CashCode" Type="Text" Size="20" Required="No">
  <Label>Code</Label>
</TxField>
<TxField Name="CashDesc" Id="CashDesc" Type="Text" Size="20" Required="No">
  <Label>Desc</Label>
</TxField>
<TxField Name="cash.recipientuli" Id="RecipientULI" Type="Text" Size="20" Required="No" FieldType="Other">
  <Label>uli</Label>
</TxField>
<TxField Name="cash.recipientregnum" Id="RecipientRegNum" Type="Text" Size="20" Required="No" FieldType="Other">
  <Label>uli</Label>
</TxField>
<TxField Name="cash.recoverycode" Id="RecoveryCode" Type="Text" Size="20" Required="No" FieldType="Other">
  <Label>uli</Label>
</TxField>

<TxField Name="ClaimMessage" Id="PatientText" Type="Text" Size="200" Required="No" Editable="No" FieldType="Other"
ForceUppercase="No">
  <Label>Claim Message</Label>
</TxField>

<TxField Name="effective_date" Id="effective_date" Type="Date" Format="yyyy/MM/dd" Size="10" Required="Yes"
Default="#NOW#">
        <Label>Effective Date</Label>
                <Desc>Effective Date</Desc>
        </TxField>


<!-- ***** Start Appointment Fields ***** -->
  <TxField Name="appointment.appointment_id" SegmentId="appointment" Id="appointment_id" Type="String" Size="9"
Required="No" Editable="No" Returned="Yes" FieldType="DB" ForceUppercase="Default">
  </TxField>
  <TxField Name="appointment.patient_id" SegmentId="appointment" Id="patient_id" Type="Integer" Size="9" Editable="No"
Returned="Yes" Required="Yes" FieldType="DB" ForceUppercase="Default">
  </TxField>
  <TxField Name="appointment.patient_first_name" Id="patient_first_name" Type="String" Size="30" Required="No" Editable="Yes"
Returned="Yes" FieldType="DB" ForceUppercase="Default">
  </TxField>
  <TxField Name="appointment.patient_last_name" Id="patient_last_name" Type="String" Size="30" Required="No" Editable="Yes"
Returned="Yes" FieldType="DB" ForceUppercase="Default">
  </TxField>
  <TxField Name="appointment.patient_id_num" Id="patient_uli" Type="String" Size="9" Required="No" Editable="Yes"
Returned="Yes" FieldType="DB" ForceUppercase="Default">
  </TxField>
  <TxField Name="appointment.provider_id_num" Id="provider_uli" Type="String" Size="9" Required="No" Editable="Yes"
Returned="Yes" FieldType="DB" ForceUppercase="Default">
  </TxField>
```

```
  <TxField Name="appointment.oop_patient_num" Id="recipientregnum" Type="String" Size="12" Required="No" Editable="Yes"
Returned="Yes" FieldType="DB" ForceUppercase="Default">
  </TxField>
  <TxField Name="appointment.appointment_date" Id="start" Type="String" Size="30" Required="No" Editable="Yes"
Returned="Yes" FieldType="DB" ForceUppercase="Default">
  </TxField>
<!--
  <TxField Name="appointment.appointment_subject" Id="appointment_subject" Type="String" Size="100" Required="No"
Editable="Yes" Returned="Yes" FieldType="DB" ForceUppercase="Default">
  </TxField>
-->
  <TxField Name="appointment.synchronize_id" Id="synchronize_id" Type="String" Size="30" Required="No" Editable="Yes"
Returned="Yes" FieldType="DB" ForceUppercase="Default">
  </TxField>
  <TxField Name="appointment.status" Id="status" Type="String" Size="10" Required="No" Editable="Yes" Returned="Yes"
FieldType="DB" ForceUppercase="Default">
  </TxField>
  <TxField Name="appointment.location" Id="location" Type="String" Size="255" Required="No" Editable="Yes" Returned="Yes"
FieldType="DB" ForceUppercase="Default">
  </TxField>
<!-- ***** End Appointment Fields ***** -->

<!-- ***** Start Patient Fields ***** -->
  <TxField Name="patient.patient_id" SegmentId="patient" Id="patient_id" Type="Integer" Size="9" Editable="No" Returned="Yes"
Required="Yes" FieldType="DB" ForceUppercase="Default">
  </TxField>
  <TxField Name="patient.sex" Id="sex" Type="String" Size="6" Editable="No" Required="No" Returned="Yes" FieldType="Other"
ForceUppercase="Default">
  </TxField>
  <TxField Name="patient.birthday" Id="birthday" Type="Date" Format="yyyy-MM-dd" Size="10" Required="No" Returned="Yes"
Editable="Yes" FieldType="Other" ForceUppercase="Default">
  </TxField>
  <TxField Name="patient.dod" Id="dod" Type="Date" Format="yyyy-MM-dd" Size="10" Required="No" Returned="Yes"
Editable="Yes" FieldType="Other" ForceUppercase="Default">
  </TxField>
  <TxField Name="patient.last_name" Id="last_name" Type="String" Size="20" Returned="Yes" Editable="Yes" Required="Yes"
FieldType="Other" ForceUppercase="Default">
  </TxField>
  <TxField Name="patient.first_name" Id="first_name" Type="String" Size="20" Returned="Yes" Editable="Yes" Required="Yes"
FieldType="Other" ForceUppercase="Default">
  </TxField>
  <TxField Name="patient.common_first_name" Id="common_first_name" Type="String" Size="20" Required="No" Returned="Yes"
Editable="Yes" FieldType="Other" ForceUppercase="Default">
  </TxField>
  <TxField Name="patient.maiden_name" Id="maiden_name" Type="String" Size="20" Required="No" Returned="Yes"
Editable="Yes" FieldType="Other" ForceUppercase="Default">
  </TxField>
  <TxField Name="patient.previous_name" Id="previous_name" Type="String" Size="20" Required="No" Returned="Yes"
Editable="Yes" FieldType="Other" ForceUppercase="Default">
  </TxField>
  <TxField Name="patient.middle_name" Id="middle_name" Type="String" Size="20" Required="No" Returned="Yes"
Editable="Yes" FieldType="Other" ForceUppercase="Default">
  </TxField>
  <TxField Name="patient.address_line_1" Id="address_line_1" Type="String" Size="40" Required="No" Returned="Yes"
Editable="Yes" FieldType="Other" ForceUppercase="Default">
  </TxField>
  <TxField Name="patient.address_line_2" Id="address_line_2" Type="String" Size="40" Required="No" Returned="Yes"
Editable="Yes" FieldType="Other" ForceUppercase="Default">
  </TxField>
  <TxField Name="patient.city" Id="city" Type="String" Size="20" Required="No" Returned="Yes" Editable="Yes" FieldType="Other"
ForceUppercase="Default">
  </TxField>
  <TxField Name="patient.prov_state" Id="prov_state" Type="String" Size="2" Required="No" Default="AB" Returned="Yes"
Editable="Yes" FieldType="Other" ForceUppercase="Default">
  </TxField>
  <TxField Name="patient.country" Id="country" Type="String" Size="20" Required="No" Returned="Yes" Editable="Yes"
FieldType="Other" ForceUppercase="Default">
  </TxField>
  <TxField Name="patient.postal_zip" Id="postal_zip" Type="String" Size="9" Required="No" Returned="Yes" Editable="Yes"
```

FieldType="Other" ForceUppercase="Default">
</TxField>
<TxField Name="patient.phone_number" Id="phone_number" Type="String" Size="20" Required="No" Returned="Yes" Editable="Yes" FieldType="Other" ForceUppercase="Default">
</TxField>
<TxField Name="patient.phone_number2" Id="phone_number2" Type="String" Size="20" Required="No" Returned="Yes" Editable="Yes" FieldType="Other" ForceUppercase="Default">
</TxField>
<TxField Name="patient.mobile_phone" Id="mobile_phone" Type="String" Size="20" Required="No" Returned="Yes" Editable="Yes" FieldType="Other" ForceUppercase="Default">
</TxField>
<TxField Name="patient.other_phone" Id="other_phone" Type="String" Size="20" Required="No" Returned="Yes" Editable="Yes" FieldType="Other" ForceUppercase="Default">
</TxField>
<TxField Name="patient.fax_phone" Id="fax_phone" Type="String" Size="20" Required="No" Returned="Yes" Editable="Yes" FieldType="Other" ForceUppercase="Default">
</TxField>
<TxField Name="patient.chartnum" Id="chartnum" Type="String" Size="14" Required="No" Returned="Yes" Editable="Yes" FieldType="Other" ForceUppercase="Default">
</TxField>
<TxField Name="patient.documentpath" Id="documentpath" Type="Link" Size="70" Required="No" Returned="Yes" Editable="Yes" FieldType="Other" ForceUppercase="Default">
</TxField>
<TxField Name="patient.recipientuli" Id="recipientuli" Type="String" Size="9" Required="No" Returned="Yes" Editable="Yes" FieldType="Other" ForceUppercase="Default">
</TxField>
<TxField Name="patient.servcode" Id="generic1" Type="String" Size="10" Required="No" Returned="Yes" Editable="Yes" FieldType="Other" ForceUppercase="Default">
</TxField>
<TxField Name="patient.diagcode1" Id="generic2" Type="String" Size="10" Required="No" Returned="Yes" Editable="Yes" FieldType="Other" ForceUppercase="Default">
</TxField>
<TxField Name="patient.diagcode2" Id="generic3" Type="String" Size="10" Required="No" Returned="Yes" Editable="Yes" FieldType="Other" ForceUppercase="Default">
</TxField>
<TxField Name="patient.diagcode3" Id="generic4" Type="String" Size="10" Required="No" Returned="Yes" Editable="Yes" FieldType="Other" ForceUppercase="Default">
</TxField>
<TxField Name="patient.referraluli" Id="generic5" Type="String" Size="9" Required="No" Returned="Yes" Editable="Yes" FieldType="Other" ForceUppercase="Default">
</TxField>
<TxField Name="patient.recoverycode" Id="recoverycode" Type="String" Size="10" Editable="No" Required="No" ForceUppercase="No" Returned="Yes" FieldType="Other">
</TxField>
<TxField Name="patient.recipientregnum" Id="recipientregnum" Type="String" Size="12" Required="No" Returned="Yes" Editable="Yes" FieldType="Other" ForceUppercase="Default">
</TxField>
<TxField Name="patient.email" Id="email" Type="Link" Size="25" Required="No" Returned="Yes" Editable="Yes" FieldType="Other" ForceUppercase="Default">
</TxField>
<TxField Name="patient.alert_code_1" Id="alert_code_1" Type="String" Size="5" Required="No" Returned="Yes" Editable="Yes" FieldType="Other" ForceUppercase="Default">
</TxField>
<TxField Name="patient.alert_code_2" Id="alert_code_2" Type="String" Size="5" Required="No" Returned="Yes" Editable="Yes" FieldType="Other" ForceUppercase="Default">
</TxField>
<TxField Name="patient.alert_code_3" Id="alert_code_3" Type="String" Size="5" Required="No" Returned="Yes" Editable="Yes" FieldType="Other" ForceUppercase="Default">
</TxField>
<TxField Name="patient.salutation" Id="salutation" Type="String" Size="5" Required="No" Returned="Yes" Editable="Yes" FieldType="Other" ForceUppercase="Default">
</TxField>
<TxField Name="patient.emergency_contact" Id="emergency_contact" Type="String" Size="30" Required="No" Returned="Yes" Editable="Yes" FieldType="Other" ForceUppercase="Default">
</TxField>
<TxField Name="patient.emergency_phone" Id="emergency_phone" Type="String" Size="20" Required="No" Returned="Yes" Editable="Yes" FieldType="Other" ForceUppercase="Default">
</TxField>
<TxField Name="patient.marital_status" Id="marital_status" Type="String" Size="10" Required="No" Editable="No"

Returned="Yes" FieldType="Other" ForceUppercase="Default">
</TxField>
<TxField Name="patient.sin" Id="sin" Type="String" Size="15" Required="No" Returned="Yes" Editable="Yes" FieldType="Other" ForceUppercase="Default">
</TxField>
<TxField Name="patient.other_insurance_num" Id="other_insurance_num" Type="String" Size="15" Required="No" Returned="Yes" Editable="Yes" FieldType="Other" ForceUppercase="Default">
</TxField>
<TxField Name="patient.wcb_num" Id="wcb_num" Type="String" Size="15" Required="No" Returned="Yes" Editable="Yes" FieldType="Other" ForceUppercase="Default">
</TxField>
<TxField Name="patient.spouseguardian_first_name" Id="spouseguardian_first_name" Type="String" Size="30" Required="No" Returned="Yes" Editable="Yes" FieldType="Other" ForceUppercase="Default">
</TxField>
<TxField Name="patient.spouseguardian_last_name" Id="spouseguardian_last_name" Type="String" Size="30" Required="No" Returned="Yes" Editable="Yes" FieldType="Other" ForceUppercase="Default">
</TxField>
<TxField Name="patient.spouseguardian_address_line_1" Id="spouseguardian_address_line_1" Type="String" Size="50" Required="No" Returned="Yes" Editable="Yes" FieldType="Other" ForceUppercase="Default">
</TxField>
<TxField Name="patient.spouseguardian_address_line_2" Id="spouseguardian_address_line_2" Type="String" Size="50" Required="No" Returned="Yes" Editable="Yes" FieldType="Other" ForceUppercase="Default">
</TxField>
<TxField Name="patient.spouseguardian_city" Id="spouseguardian_city" Type="String" Size="20" Required="No" Returned="Yes" Editable="Yes" FieldType="Other" ForceUppercase="Default">
</TxField>
<TxField Name="patient.spouseguardian_prov_state" Id="spouseguardian_prov_state" Type="String" Size="2" Required="No" Returned="Yes" Editable="Yes" FieldType="Other" ForceUppercase="Default">
</TxField>
<TxField Name="patient.spouseguardian_country" Id="spouseguardian_country" Type="String" Size="20" Required="No" Returned="Yes" Editable="Yes" FieldType="Other" ForceUppercase="Default">
</TxField>
<TxField Name="patient.spouseguardian_postal_zip" Id="spouseguardian_postal_zip" Type="String" Size="9" Required="No" Returned="Yes" Editable="Yes" FieldType="Other" ForceUppercase="Default">
</TxField>
<TxField Name="patient.spouseguardian_phone" Id="spouseguardian_phone" Type="String" Size="20" Required="No" Returned="Yes" Editable="Yes" FieldType="Other" ForceUppercase="Default">
</TxField>
<TxField Name="patient.spouseguardian_relationship" Id="spouseguardian_relationship" Type="String" Size="20" Required="No" Editable="Yes" Returned="Yes" FieldType="Other" ForceUppercase="Default">
</TxField>
<TxField Name="patient.consent" Id="consent" Type="String" Size="10" Required="No" Editable="No" Returned="Yes" FieldType="Other" ForceUppercase="Default">
</TxField>
<TxField Name="patient.consentgranted.date" Id="consent_date" Type="RelativeDate" Format="yyyy-MM-dd" Size="10" Required="No" Editable="Yes" Returned="Yes" FieldType="Other" ForceUppercase="Default">
</TxField>
<TxField Name="patient.consentgranted.expiry" Id="consent_expiry" Type="RelativeDate" Format="yyyy-MM-dd" Size="10" Required="No" Editable="Yes" Returned="Yes" FieldType="Other" ForceUppercase="Default">
</TxField>
<TxField Name="patient.consentgranted.on_file" Id="consent_on_file" Type="String" Size="1" Required="No" Editable="No" Returned="Yes" FieldType="Other" ForceUppercase="Default">
</TxField>
<TxField Name="patient.consentgranted.verbal" Id="consent_verbal" Type="String" Size="1" Required="No" Editable="No" Returned="Yes" FieldType="Other" ForceUppercase="Default">
</TxField>
<!--
<TxField Name="patient.consentdenied.reason" Id="consent_reason" Type="Text" Size="1000" Rows="3" Required="No" Editable="Yes" Returned="Yes" FieldType="Other" ForceUppercase="Default">
</TxField>
<TxField Name="patient.consentgranted.notes" Id="consent_notes" Type="Text" Size="1000" Rows="3" Required="No" Editable="Yes" Returned="Yes" FieldType="Other" ForceUppercase="Default">
</TxField>
<TxField Name="patient.consentdenied.date" Id="denied_date" Type="RelativeDate" Format="yyyy-MM-dd" Size="10" Required="No" Editable="Yes" Returned="Yes" FieldType="Other" ForceUppercase="Default">
</TxField>
-->
<!-- *** End Patient Fields *** -->
</TxList>

```
<TxList Type="TxGroup">
<!-- Start of Group Definitions -->
 <TxGroup Name="GrpOutlookBillingOptions" Cols="3" FieldDirection="Cols" ReadOnly="No">
  <Label>Billing Options</Label>
  <TxRefs Type="TxField" Refs="OverrideRules OverridePricing TrayEligible"></TxRefs>
 </TxGroup>
 <TxGroup Name="GrpOutlookHelp" Cols="1" FieldDirection="Rows" ReadOnly="No">
  <Label></Label>
  <TxRefs Type="TxField" Refs="OutlookHelp"></TxRefs>
 </TxGroup>
 <TxGroup Name="GrpHeaderChange" Cols="2">
  <Label>Claim</Label>
  <Desc>Common segment header fields</Desc>
  <TxRefs Type="TxField"
      Refs="ClaimTagLabel ActionChangeLabel"/>
  </TxGroup>
 <TxGroup Name="GrpHeaderDelete" Cols="2">
  <Label>Claim</Label>
  <Desc>Common segment header fields</Desc>
  <TxRefs Type="TxField"
      Refs="ClaimTagLabel ActionDeleteLabel"/>
  </TxGroup>
 <TxGroup Name="GrpHeaderReassess" Cols="2">
  <Label>Claim</Label>
  <Desc>Common segment header fields</Desc>
  <TxRefs Type="TxField"
      Refs="ClaimTagLabel ActionReassessLabel"/>
  </TxGroup>
 <TxGroup Name="GrpHeaderExternal" Cols="1">
  <Label>Claim</Label>
  <TxRefs Type="TxField"
      Refs="ClaimTag RecipientULI ProviderULI BusArrNum"/>
  </TxGroup>
 <TxGroup Name="GrpHelpExternal" Cols="1">
  <Label>Help</Label>
  <TxRefs Type="TxField"
      Refs="HelpExternal"/>
  </TxGroup>
 <TxGroup Name="GrpClaimSummary" Cols="2">
  <Label>Summary</Label>
  <TxRefs Type="TxField"
      Refs="ChartNumLabel RecipientULILabel RecipientRegNumLabel
         ServStartDateLabel ServCodeLabel ProviderULILabel"/>
  </TxGroup>
 <TxGroup Name="GrpTest" Cols="3">
  <Label>TEST</Label>
  <TxRefs Type="TxField"
      Refs="EbAccountId EbOrgId EbUserId"/>
  </TxGroup>
 <TxGroup Name="GrpPatient1" Cols="4">
  <Label>RECIPIENT</Label>
  <TxRefs Type="TxField"
      Refs="ChartNum RecipientULI RecipientRegNum RecoveryCode PricedAmount"/>
  </TxGroup>
 <!-- RBT Nov 26, 2002 add PricedAmount field to this group -->
 <TxGroup Name="GrpPatient1Change" Cols="2">
  <Label>RECIPIENT</Label>
  <TxRefs Type="TxField"
      Refs="ChartNum RecipientULILabel RecipientRegNum RecoveryCode PricedAmount"/>
  </TxGroup>
 <TxGroup Name="GrpService1" Cols="5">
  <Label>SERVICE</Label>
  <TxRefs Type="TxField"
      Refs="ServStartDate ServCode ReferralULI
                  DiagCode1 DiagCode2 DiagCode3
         Modifier1 Modifier2 Modifier3
         ClaimAmt ClaimAmtInd TrayEligible
         OverridePricing OverrideRules
```

```
        "/>
  </TxGroup>
 <TxGroup Name="GrpEncounter" Cols="5">
  <Label>ENCOUNTER</Label>
  <TxRefs Type="TxField"
      Refs="Calls EncNum StartTime StopTime TotalTime HospOrigDate OrigFacility OrigLoc LocCode"/>
  </TxGroup>
 <TxGroup Name="GrpProvider1" Cols="3">
  <Label>PROVIDER</Label>
  <TxRefs Type="TxField"
      Refs="ProviderULI SkillCode FacilityNum FuncCtr BusArrNum PayToCode PayToULI
                LocumBAN OOPRefInd Intercept"/>
  </TxGroup>
 <!-- RBT 2003-07-28 change to use editable versions of field on change, backend enforces that these
    fields cannot be modified, also add the other fields from re-arranging grouping as well which
    changes the number of columns from 2 to 3
 <TxGroup Name="GrpProvider1Change" Cols="2">
      Refs="ProviderULILabel SkillCode FacilityNum BusArrNumLabel PayToCodeLabel PayToULI"/>
 -->
 <TxGroup Name="GrpProvider1Change" Cols="3">
  <Label>Provider</Label>
  <TxRefs Type="TxField"
      Refs="ProviderULI SkillCode FacilityNum FuncCtr BusArrNum PayToCode PayToULI
                LocumBAN OOPRefInd Intercept"/>
  </TxGroup>
 <TxGroup Name="GrpPatient2" Cols="5">
  <Label>MISCELLANEOUS</Label>
  <TxRefs Type="TxField"
   Refs="ConfInd GoodFaithInd NewbornCode PaperDocInd EMSAFInd"/>
  </TxGroup>
 <TxGroup Name="GrpService2" Cols="3">
  <Label>Service</Label>
  <TxRefs Type="TxField"
   Refs="HospOrigDate OrigFacility OrigLoc FuncCtr LocCode EMSAFInd PaperDocInd"/>
  </TxGroup>
 <TxGroup Name="GrpProvider2" Cols="3">
  <Label>Provider</Label>
  <TxRefs Type="TxField"
   Refs="LocumBAN ReferralULI OOPRefInd Intercept"/>
  </TxGroup>
 <TxGroup Name="GrpProvider2Change" Cols="3">
  <Label>Provider</Label>
  <TxRefs Type="TxField"
   Refs="LocumBAN ReferralULI OOPRefInd Intercept"/>
  </TxGroup>
 <TxGroup Name="GrpPersonData1" Cols="2">
  <Label>Name</Label>
  <TxRefs Type="TxField"
   Refs="Surname MiddleName FirstName PersonType BirthDate Gender ParentULI ParentRegNum"/>
  </TxGroup>
 <TxGroup Name="GrpPersonData2" Cols="2">
  <Label>Address</Label>
  <TxRefs Type="TxField"
   Refs="Address1 Address2 Address3 City ProvState PostalCode Country"/>
  </TxGroup>
 <TxGroup Name="GrpSupportingText" Cols="1">
  <Label>Supporting Text</Label>
  <Desc>cpd1 fields</Desc>
  <TxRefs Type="TxField"
   Refs="Text"/>
  </TxGroup>
</TxList>

<TxList Type="TxPage">
<!-- Start of Page Definitions -->
  <TxPage Name="PageOutlookBillingOptions" ReadOnly="No">
   <Label>Billing Options</Label>
   <TxRefs Type="TxGroup" Refs="GrpOutlookBillingOptions GrpOutlookHelp"></TxRefs>
  </TxPage>
```

```xml
<!-- RBT 2003-07-21 add claim state field
  <TxRefs Type="TxField" Refs="ClaimStateSave"/>
-->
<TxPage Name="PageCIB1a" >
  <Label>Base Claim</Label>
  <TxRefs Type="TxGroup" Refs="GrpPatient1 GrpService1 GrpEncounter GrpPatient2 GrpProvider1"/>
</TxPage>
<TxPage Name="PageCIB1aChange" >
  <Label>Base Claim</Label>
  <TxRefs Type="TxGroup" Refs="GrpHeaderChange GrpPatient1 GrpService1 GrpEncounter GrpPatient2 GrpProvider1"/>
</TxPage>
<TxPage Name="PageCIB1aDelete" >
  <Label>Base Claim</Label>
  <TxRefs Type="TxGroup" Refs="GrpHeaderDelete GrpClaimSummary"/>
</TxPage>
<TxPage Name="PageCIB1aReassess" >
  <Label>Base Claim</Label>
  <TxRefs Type="TxGroup" Refs="GrpHeaderReassess GrpClaimSummary"/>
</TxPage>
<TxPage Name="PageExternal" >
  <Label>Base Claim</Label>
  <TxRefs Type="TxGroup" Refs="GrpHeaderExternal GrpHelpExternal"/>
</TxPage>
<TxPage Name="PageCIB1b" >
  <Label>Misc. Claim</Label>
  <TxRefs Type="TxGroup" Refs="GrpPatient2 GrpService2 GrpProvider2"/>
</TxPage>
<TxPage Name="PageCIB1bChange" >
  <Label>Misc. Claim</Label>
  <TxRefs Type="TxGroup" Refs="GrpPatient2 GrpService2 GrpProvider2Change"/>
</TxPage>
<TxPage Name="PageCPD1" >
  <Label>Person Data</Label>
  <TxRefs Type="TxGroup" Refs="GrpPersonData1 GrpPersonData2"/>
</TxPage>
<TxPage Name="PageCPD1a" >
  <Label>Person Data 1</Label>
  <TxRefs Type="TxGroup" Refs="GrpPersonData1 GrpPersonData2"/>
</TxPage>
<TxPage Name="PageCPD1b" >
  <Label>Person Data 2</Label>
  <Desc>cpd1 Segment</Desc>
  <TxRefs Type="TxGroup" Refs="GrpPersonData1 GrpPersonData2"/>
</TxPage>
<TxPage Name="PageCPD1c" >
  <Label>Person Data 3</Label>
  <Desc>cpd1 Segment</Desc>
  <TxRefs Type="TxGroup" Refs="GrpPersonData1 GrpPersonData2"/>
</TxPage>
<TxPage Name="PageCST1" >
  <Label>Supporting Text</Label>
  <Desc>cst1 Segment</Desc>
  <TxRefs Type="TxGroup" Refs="GrpSupportingText"/>
</TxPage>
<!-- End of Page Definitions -->
</TxList>

<TxList Type="TxSegment">
<!-- Start of Segment Definitions -->
  <TxSegment Name="SegFindPatient" Id="find_patient">
    <Desc></Desc>
    <TxRefs Type="TxField"
       Refs="
    ChartNum
       "/>
  </TxSegment>
  <TxSegment Name="SegOutlookBilling" Id="ab_ebill" Required="No" Delete="No" Count="100">
    <TxRefs Type="TxField" Refs="EbillClaimId ClaimStatusNew SubPrefix Owner SourceCode ClaimTagOpt ActionAdd WarningCount EbillLogonId OverrideRules OverridePricing ClaimMessage ClaimSourceOutlook"></TxRefs>
```

```
  <TxRefs Type="TxSegment" Refs="SegCIB1Outlook SegCPD1Outlook SegCST1Opt"></TxRefs>
 </TxSegment>
 <TxSegment Name="SegOutlookAppointment" Id="appointment" Required="No" Delete="No" Count="100">
  <TxRefs Type="TxField" Refs="appointment.appointment_id appointment.patient_first_name appointment.patient_last_name
appointment.patient_id appointment.patient_id_num appointment.synchronize_id appointment.appointment_date
appointment.oop_patient_num appointment.provider_id_num appointment.status appointment.location"></TxRefs>
 </TxSegment>
 <TxSegment Name="SegOutlookPatient" Id="patient" Required="Yes" Delete="No" Count="100">
  <TxRefs Type="TxField" Refs="patient.patient_id patient.sex patient.birthday patient.dod patient.last_name patient.first_name
patient.common_first_name patient.previous_name patient.maiden_name patient.middle_name patient.address_line_1
patient.address_line_2 patient.city patient.prov_state patient.postal_zip patient.country patient.phone_number
patient.phone_number2 patient.mobile_phone patient.other_phone patient.fax_phone patient.chartnum patient.documentpath
patient.recipientuli patient.servcode patient.recipientregnum patient.diagcode1 patient.diagcode2 patient.diagcode3 patient.referraluli
patient.recoverycode patient.email patient.alert_code_1 patient.alert_code_2 patient.alert_code_3 patient.salutation
patient.emergency_contact patient.emergency_phone patient.other_insurance_num patient.wcb_num patient.sin
patient.marital_status patient.spouseguardian_first_name patient.spouseguardian_last_name
patient.spouseguardian_address_line_1 patient.spouseguardian_address_line_2 patient.spouseguardian_city
patient.spouseguardian_prov_state patient.spouseguardian_country patient.spouseguardian_postal_zip
patient.spouseguardian_phone patient.spouseguardian_relationship patient.consent patient.consentgranted.date
patient.consentgranted.expiry patient.consentgranted.on_file patient.consentgranted.verbal"></TxRefs>
 </TxSegment>
 <!-- RBT added OverrideRules, OverridePricing, PricedAmount fields to the SegEbillShortAdd and SegEbillFullAdd TxSegments
    RBT 20030616 change to save status and warning count
       Refs="EbillClaimId ClaimStatusPending Owner SubPrefix SourceCode ClaimTagOpt ActionAdd WarningCount EbillLogonId
OverrideRules OverridePricing PricedAmount hidden.appointment.appointment_id ClaimSourceWeb"/>
  -->
 <TxSegment Name="SegEbillShortAdd" Id="ab_ebill">
  <Desc>Ebill system segment</Desc>
  <TxRefs Type="TxField"
       Refs="EbillClaimId ClaimStateSave Owner SubPrefix SourceCode ClaimTagOpt ActionAdd WarningCountSave EbillLogonId
OverrideRules OverridePricing PricedAmount hidden.appointment.appointment_id ClaimSourceWeb"/>
  <TxRefs Type="TxSegment" Refs="SegCIB1 SegCPD1"/>
 </TxSegment>
 <!--
    RBT 20030616 change to save status and warning count
       Refs="EbillClaimId ClaimStatusPending Owner SubPrefix SourceCode ClaimTagOpt ActionAdd WarningCount EbillLogonId
OverrideRules OverridePricing PricedAmount hidden.appointment.appointment_id ClaimSourceWeb"/>
  -->
 <TxSegment Name="SegEbillFullAdd" Id="ab_ebill">
  <Desc>Ebill system segment</Desc>
  <TxRefs Type="TxField"
       Refs="EbillClaimId ClaimStateSave Owner SubPrefix SourceCode ClaimTagOpt ActionAdd WarningCountSave EbillLogonId
OverrideRules OverridePricing PricedAmount hidden.appointment.appointment_id ClaimSourceWeb"/>
  <TxRefs Type="TxSegment" Refs="SegCIB1 SegCPD1 SegCST1Opt"/>
 </TxSegment>
 <!-- RBT 20030625 save out of province reg num and recovery code setting as well when cloning -->
 <TxSegment Name="SegClone" Id="ab_ebill">
  <Desc>Information to keep for the next claim</Desc>
  <TxRefs Type="TxField"
   Refs="ChartNum RecipientULI ServCode HospOrigDate ReferralULI FuncCtr DiagCode1 DiagCode2 DiagCode3
RecipientRegNum RecoveryCode"
  />
  <TxRefs Type="TxSegment" Refs="SegClone2"/>
 </TxSegment>
 <TxSegment Name="SegClone2" Id="ab_ebill" Required="No">
  <Desc>Information to keep for the next claim</Desc>
  <TxRefs Type="TxField"
   Refs="Surname MiddleName FirstName BirthDate Gender
       Address1 Address2 Address3 City PostalCode ProvState
       Country ParentULI ParentRegNum"
  />
 </TxSegment>
 <!-- RBT 2003-07-30 change to send SegCIB1 same as add rather than SegCIB1Change
  <TxRefs Type="TxSegment" Refs="SegCIB1Change SegCPD1 SegCST1Opt"/>
  -->
 <TxSegment Name="SegEbillChange" Id="ab_ebill">
  <Desc>Ebill system segment</Desc>
  <TxRefs Type="TxField"
       Refs="EbillClaimId ClaimStatusPending Owner SubPrefix SourceCode ClaimTagLabel ActionChange WarningCount
```

```
EbillLogonId"/>
  <TxRefs Type="TxSegment" Refs="SegCIB1 SegCPD1 SegCST1Opt"/>
 </TxSegment>
 <TxSegment Name="SegEbillDelete" Id="ab_ebill">
  <Desc>Ebill system segment</Desc>
  <TxRefs Type="TxField"
      Refs="EbillClaimId ClaimStatusPending Owner SubPrefix SourceCode ClaimTagLabel ActionDelete WarningCount
EbillLogonId"/>
 </TxSegment>
 <TxSegment Name="SegEbillReassess" Id="ab_ebill">
  <Desc>Ebill system segment</Desc>
  <TxRefs Type="TxField"
      Refs="EbillClaimId ClaimStatusPending Owner SubPrefix SourceCode ClaimTagLabel ActionReassess WarningCount
EbillLogonId"/>
  <TxRefs Type="TxSegment" Refs="SegCST1"/>
 </TxSegment>
 <TxSegment Name="SegExternal" Id="ab_ebill">
  <Desc>Ebill system segment</Desc>
  <TxRefs Type="TxField"
      Refs="ClaimTag RecipientULI ProviderULI BusArrNum"/>
 </TxSegment>
 <!-- RBT added TrayEligible fields to the SegCIB1 TxSegment -->
 <TxSegment Name="SegCIB1" Id="ab_cib1">
  <Desc>In-Province Service Provider Base Claim segment</Desc>
  <TxRefs Type="TxField"
   Refs="EbillClaimIdJoin
      TrayEligible ProviderULI SkillCode RecipientULI RecipientRegNum
      ServCode ServStartDate EncNum DiagCode1 DiagCode2 DiagCode3 Calls
      Modifier1 Modifier2 Modifier3 FacilityNum FuncCtr LocCode OrigFacility
      OrigLoc BusArrNum PayToCode PayToULI LocumBAN ReferralULI OOPRefInd
      RecoveryCode ChartNum ClaimAmt ClaimAmtInd Intercept ConfInd
      GoodFaithInd NewbornCode EMSAFInd PaperDocInd HospOrigDate
      ToothCode ToothSurf1 ToothSurf2 ToothSurf3 ToothSurf4 ToothSurf5
      StartTime StopTime TotalTime"
  />
 </TxSegment>
 <TxSegment Name="SegCIB1Change" Id="ab_cib1">
  <Desc>In-Province Service Provider Base Claim segment</Desc>
  <TxRefs Type="TxField"
   Refs="EbillClaimIdJoin
      TrayEligible SkillCode RecipientRegNum
      ServCode ServStartDate EncNum DiagCode1 DiagCode2 DiagCode3 Calls
      Modifier1 Modifier2 Modifier3 FacilityNum FuncCtr LocCode OrigFacility
      OrigLoc PayToULI LocumBAN ReferralULI OOPRefInd
      RecoveryCode ChartNum ClaimAmt ClaimAmtInd Intercept ConfInd
      GoodFaithInd NewbornCode EMSAFInd PaperDocInd HospOrigDate
      ToothCode ToothSurf1 ToothSurf2 ToothSurf3 ToothSurf4 ToothSurf5
      PayToCodeLabel BusArrNumLabel RecipientULILabel ProviderULILabel"
  />
 </TxSegment>
 <TxSegment Name="SegCIB1Outlook" Id="ab_cib1" Required="No">
  <Desc>In-Province Service Provider Base Claim segment</Desc>
  <TxRefs Type="TxField"
   Refs="EbillClaimIdJoin
      TrayEligible ProviderULILabel SkillCode RecipientULI RecipientRegNum
      ServCodeLabel ServStartDate EncNum DiagCode1 DiagCode2 DiagCode3 Calls
      Modifier1 Modifier2 Modifier3 FacilityNum FuncCtr LocCode OrigFacility
      OrigLoc BusArrNum PayToCode PayToULI LocumBAN ReferralULI OOPRefInd
      RecoveryCode ChartNum ClaimAmt ClaimAmtInd Intercept ConfInd
      GoodFaithInd NewbornCode EMSAFInd PaperDocInd HospOrigDate
      ToothCode ToothSurf1 ToothSurf2 ToothSurf3 ToothSurf4 ToothSurf5"
  />
 </TxSegment>
 <TxSegment Name="SegCPD1" Id="ab_cpd1" Required="No">
  <Desc>Claim Person Data segments</Desc>
  <TxRefs Type="TxField"
   Refs="EbillClaimIdJoin_cpd1 SegSeq PersonType Surname MiddleName FirstName BirthDate Gender
      Address1 Address2 Address3 City PostalCode ProvState
      Country ParentULI ParentRegNum"
```

```
/>

</TxSegment>
<TxSegment Name="SegCPD1Outlook" Id="ab_cpd1" Required="No">
 <Desc>Claim Person Data segments</Desc>
 <TxRefs Type="TxField"
  Refs="EbillClaimIdJoin_cpd1 SegSeq PersonType Surname MiddleName FirstName BirthDate GenderCode
      Address1 Address2 Address3 CityName PostalCode ProvState
      Country ParentULI ParentRegNum"
  />
</TxSegment>
<TxSegment Name="SegCST1" Id="ab_cst1">
 <Desc>Claim Supporting Text segments</Desc>
 <TxRefs Type="TxField"
  Refs="EbillClaimIdJoin Text"/>
</TxSegment>
<TxSegment Name="SegCST1Opt" Id="ab_cst1" Required="No">
 <Desc>Claim Supporting Text segments</Desc>
 <TxRefs Type="TxField"
  Refs="EbillClaimIdJoin_cst1 Text"/>
</TxSegment>
<!-- RBT 2003-08-25 add the Owner, CashClaimId, BusArrNum, and FacilityNum fields
   RBT 2003-09-02 change Owner to EbillLogonId (which is the real user, rather than the patient chart number)
 -->
<TxSegment Name="SegCash" Id="cash_claim" Required="No">
 <Desc>Cash transaction segment</Desc>
 <TxRefs Type="TxField"
  Refs="CashClaimId EbillLogonId BusArrNum FacilityNum ProviderULI
      cash.recipientuli cash.recipientregnum cash.recoverycode ServStartDate ChartNum
      CashAmount CashTax CashTaxCode CashTotal CashPaid CashMethod
      CashCode CashDesc"/>
</TxSegment>
<TxSegment Name="SegGetClaim" Id="ab_ebill">
 <Desc>Get Claim segment</Desc>
 <TxRefs Type="TxStatusField" Refs="SF_EbillClaimId"/>
</TxSegment>
<TxSegment Name="SegSubmitClaim" Id="ab_ebill">
 <Desc>Submit Claim segment</Desc>
 <TxRefs Type="TxStatusField" Refs="SF_EbillClaimId SF_Status SF_Errors SF_Action SF_ClaimNum SF_Priced_Amount"/>
 <TxRefs Type="TxField" Refs="EbillLogonId"/>
 <TxRefs Type="TxSegment" Refs="SegSubmitClaim2"/>
</TxSegment>
<TxSegment Name="SegSubmitClaim2" Id="ab_cib1">
 <Desc></Desc>
 <TxRefs Type="TxStatusField" Refs="SF_ServDate SF_Provider SF_ChartNum SF_Recipient SF_ServCode SF_DiagCode1
SF_DiagCode2 SF_DiagCode3"/>
</TxSegment>
<TxSegment Name="SegDeleteClaim2" Id="ab_cib1">
 <Desc></Desc>
 <TxRefs Type="TxStatusField" Refs="SF_ServDate SF_Provider SF_ChartNum SF_Recipient SF_ServCode SF_DiagCode1
SF_DiagCode2 SF_DiagCode3"/>
</TxSegment>
<TxSegment Name="SegSubmitAllClaims" Id="ab_ebill">
 <Desc>Submit All Claims segment</Desc>
 <TxRefs Type="TxField" Refs="ClaimStatusSubmitted"/>
</TxSegment>
<TxSegment Name="SegSubmitNew" Id="ab_ebill">
 <Desc></Desc>
 <TxRefs Type="TxField" Refs="ClaimStateNew"/>
</TxSegment>
<TxSegment Name="SegDeleteClaim" Id="ab_ebill">
 <Desc>Delete Claim segment</Desc>
 <TxRefs Type="TxStatusField" Refs="SF_EbillClaimId SF_Status SF_Errors SF_Action SF_ClaimNum"/>
 <TxRefs Type="TxField" Refs="ClaimStatusDeleted EbillLogonId"/>
 <TxRefs Type="TxSegment" Refs="SegDeleteClaim2"/>
</TxSegment>
<TxSegment Name="SegFindPending" Id="ab_ebill">
 <Desc>Find Pending Claims segment</Desc>
```

```
  <TxRefs Type="TxField" Refs="ClaimStatePending"/>
 </TxSegment>
 <TxSegment Name="SegFindError" Id="ab_ebill">
  <Desc>Find Pending Claims segment</Desc>
  <TxRefs Type="TxField" Refs="ClaimStateError"/>
 </TxSegment>
 <TxSegment Name="SegFindNew" Id="ab_ebill">
  <Desc>Find Pending Claims segment</Desc>
  <TxRefs Type="TxField" Refs="ClaimStateNew"/>
 </TxSegment>
 <TxSegment Name="SegFindSubmitted" Id="ab_ebill">
  <Desc>Find Pending Claims segment</Desc>
  <TxRefs Type="TxField" Refs="ClaimStateSubmitted"/>
 </TxSegment>
 <TxSegment Name="SegFindDeleted" Id="ab_ebill">
  <Desc>Find Pending Claims segment</Desc>
  <TxRefs Type="TxField" Refs="ClaimStateDeleted"/>
 </TxSegment>
 <TxSegment Name="SegFindAll" Id="ab_ebill">
  <Desc>Find Pending Claims segment</Desc>
  <TxRefs Type="TxField" Refs="ClaimStateAll"/>
 </TxSegment>
 <TxSegment Name="SegFindNonSubmittable" Id="ab_ebill">
  <Desc>Find Pending Claims segment</Desc>
  <TxRefs Type="TxField" Refs="ClaimStateNonSubmittable"/>
 </TxSegment>

 <TxSegment Name="SegServiceCodeLookup" Id="FindServcode" Required="No">
  <TxRefs Type="TxField" Refs="ServCode"/>
 </TxSegment>
 <TxSegment Name="SegDiagCodeLookup1" Id="ab_diagnostic" Required="No">
  <TxRefs Type="TxField" Refs="DiagCode1"/>
 </TxSegment>
 <TxSegment Name="SegDiagCodeLookup2" Id="ab_diagnostic" Required="No">
  <TxRefs Type="TxField" Refs="DiagCode2"/>
 </TxSegment>
 <TxSegment Name="SegDiagCodeLookup3" Id="ab_diagnostic" Required="No">
  <TxRefs Type="TxField" Refs="DiagCode3"/>
 </TxSegment>

 <TxSegment Name="SegFeeModLookup1" Id="ab_feemodifier" Required="No">
  <TxRefs Type="TxField" Refs="Modifier1"/>
 </TxSegment>
 <TxSegment Name="SegFeeModLookup2" Id="ab_feemodifier" Required="No">
  <TxRefs Type="TxField" Refs="Modifier2"/>
 </TxSegment>
 <TxSegment Name="SegFeeModLookup3" Id="ab_feemodifier" Required="No">
  <TxRefs Type="TxField" Refs="Modifier3"/>
 </TxSegment>

 <TxSegment Name="SegReferralUliLookup" Id="find_provider" Required="No">
  <TxRefs Type="TxField" Refs="ReferralULI"/>
 </TxSegment>
<!--
 <TxSegment Name="SegPatientLookup2" Id="patient" Required="No">
  <TxRefs Type="TxField" Refs="ServCode DiagCode1 DiagCode2 DiagCode3 RecipientULI RecoveryCode ReferralULI
RecipientRegNum Surname FirstName MiddleName Address1 Address2 Address3 BirthDate City ProvState Gender PostalCode"/>
 </TxSegment>
-->
 <TxSegment Name="SegPatientLookup" Id="patient" Required="No">
  <TxRefs Type="TxField" Refs="ChartNum"/>
 </TxSegment>
 <TxSegment Name="SegPatientLookup2" Id="patient" Required="No">
  <TxRefs Type="TxField" Refs="getpatientinfoflag"/>
 </TxSegment>
 <TxSegment Name="SegPatientLookup2_1" Id="patient_hidden" Required="No" DisableLookupId="Yes">
  <TxRefs Type="TxField" Refs="ServCode"/>
 </TxSegment>
 <TxSegment Name="SegPatientLookup2_2" Id="patient_hidden" Required="No" DisableLookupId="Yes">
```

```
    <TxRefs Type="TxField" Refs="DiagCode1"/>
  </TxSegment>
  <TxSegment Name="SegPatientLookup2_3" Id="patient_hidden" Required="No" DisableLookupId="Yes">
    <TxRefs Type="TxField" Refs="DiagCode2"/>
  </TxSegment>
  <TxSegment Name="SegPatientLookup2_4" Id="patient_hidden" Required="No" DisableLookupId="Yes">
    <TxRefs Type="TxField" Refs="DiagCode3"/>
  </TxSegment>
  <TxSegment Name="SegPatientLookup2_5" Id="patient_hidden" Required="No">
    <TxRefs Type="TxField" Refs="RecoveryCode"/>
  </TxSegment>
  <TxSegment Name="SegPatientLookup2_6" Id="patient_hidden" Required="No" DisableLookupId="Yes">
    <TxRefs Type="TxField" Refs="ReferralULI"/>
  </TxSegment>
  <TxSegment Name="SegPatientLookup2_7" Id="patient_hidden" Required="No">
    <TxRefs Type="TxField" Refs="RecipientRegNum"/>
  </TxSegment>
  <TxSegment Name="SegPatientLookup2_8" Id="patient_hidden" Required="No">
    <TxRefs Type="TxField" Refs="Surname"/>
  </TxSegment>
  <TxSegment Name="SegPatientLookup2_9" Id="patient_hidden" Required="No">
    <TxRefs Type="TxField" Refs="FirstName"/>
  </TxSegment>
  <TxSegment Name="SegPatientLookup2_10" Id="patient_hidden" Required="No">
    <TxRefs Type="TxField" Refs="MiddleName"/>
  </TxSegment>
  <TxSegment Name="SegPatientLookup2_11" Id="patient_hidden" Required="No">
    <TxRefs Type="TxField" Refs="Address1"/>
  </TxSegment>
  <TxSegment Name="SegPatientLookup2_12" Id="patient_hidden" Required="No">
    <TxRefs Type="TxField" Refs="Address2"/>
  </TxSegment>
  <TxSegment Name="SegPatientLookup2_13" Id="patient_hidden" Required="No">
    <TxRefs Type="TxField" Refs="Address3"/>
  </TxSegment>
  <TxSegment Name="SegPatientLookup2_14" Id="patient_hidden" Required="No">
    <TxRefs Type="TxField" Refs="BirthDate"/>
  </TxSegment>
  <TxSegment Name="SegPatientLookup2_15" Id="patient_hidden" Required="No">
    <TxRefs Type="TxField" Refs="City"/>
  </TxSegment>
  <TxSegment Name="SegPatientLookup2_16" Id="patient_hidden" Required="No">
    <TxRefs Type="TxField" Refs="ProvState"/>
  </TxSegment>
  <TxSegment Name="SegPatientLookup2_17" Id="patient_hidden" Required="No">
    <TxRefs Type="TxField" Refs="Gender"/>
  </TxSegment>
  <TxSegment Name="SegPatientLookup2_18" Id="patient_hidden" Required="No">
    <TxRefs Type="TxField" Refs="PostalCode"/>
  </TxSegment>
  <TxSegment Name="SegPatientLookup2_19" Id="patient_hidden" Required="No">
    <TxRefs Type="TxField" Refs="RecipientULI"/>
  </TxSegment>
<!-- End of Segment Definitions -->
</TxList>

<TxList Type="TxActionData">
<!-- Start of Claim Definitions -->
  <TxActionData Name="DataFindPatient" Status="Pending" Type="Find" TxnClass="patient">
    <TxRefs Type="TxSegment" Refs="SegFindPatient"/>
  </TxActionData>
  <TxActionData Name="DataOutlookBilling" Status="Pending" Type="Change" TxnClass="outlook_ab_ebill"
ExcludeOptSegments="No" ExcludeOptFields="No">
    <TxRefs Type="TxSegment" Refs="SegOutlookBilling SegCash"></TxRefs>
  </TxActionData>
  <TxActionData Name="DataOutlookAppointment" Status="Pending" Type="Change" TxnClass="outlook_appointment"
ExcludeOptSegments="No" ExcludeOptFields="No">
    <TxRefs Type="TxSegment" Refs="SegOutlookAppointment"></TxRefs>
  </TxActionData>
```

```
<TxActionData Name="DataOutlookPatient" Status="Pending" Type="Change" TxnClass="outlook_patient" ExcludeOptFields="No"
ExcludeOptSegments="Yes">
  <TxRefs Type="TxSegment" Refs="SegOutlookPatient"></TxRefs>
</TxActionData>
<TxActionData Name="DataOutlookDaysheet" Status="Pending" Type="Change" TxnClass="outlook_daysheet"
ExcludeOptSegments="No" ExcludeOptFields="No">
  <TxRefs Type="TxSegment" Refs="SegOutlookPatient SegOutlookAppointment SegOutlookBilling SegCash"></TxRefs>
</TxActionData>
<TxActionData Name="DataFullAdd" Status="Pending" Type="Change"
   TxnClass="ab_ebill">
  <TxRefs Type="TxSegment" Refs="SegEbillFullAdd"/>
</TxActionData>
<TxActionData Name="DataCloneFullAdd" Status="Pending" Type="Change"
   TxnClass="ab_ebill_clone_fa">
  <TxRefs Type="TxSegment" Refs="SegClone"/>
</TxActionData>
<TxActionData Name="DataCloneShortAdd" Status="Pending" Type="Change"
   TxnClass="ab_ebill_clone_sa">
  <TxRefs Type="TxSegment" Refs="SegClone"/>
</TxActionData>
<TxActionData Name="DataShortAdd" Status="Pending" Type="Change"
   TxnClass="ab_ebill">
  <TxRefs Type="TxSegment" Refs="SegEbillShortAdd"/>
</TxActionData>
<TxActionData Name="DataChange" Status="Pending" Type="Change"
   TxnClass="ab_ebill">
  <TxRefs Type="TxSegment" Refs="SegEbillChange"/>
</TxActionData>
<TxActionData Name="DataDelete" Status="Pending" Type="Change"
   TxnClass="ab_ebill">
  <TxRefs Type="TxSegment" Refs="SegEbillDelete"/>
</TxActionData>
<TxActionData Name="DataReassess" Status="Pending" Type="Change"
   TxnClass="ab_ebill">
  <TxRefs Type="TxSegment" Refs="SegEbillReassess"/>
</TxActionData>
<TxActionData Name="DataExternalChange" Status="Pending" Type="Change"
   TxnClass="ab_ebill_c_new">
  <TxRefs Type="TxSegment" Refs="SegExternal"/>
</TxActionData>
<TxActionData Name="DataExternalDelete" Status="Pending" Type="Change"
   TxnClass="ab_ebill_d_new">
  <TxRefs Type="TxSegment" Refs="SegExternal"/>
</TxActionData>
<TxActionData Name="DataExternalReassess" Status="Pending" Type="Change"
   TxnClass="ab_ebill_r_new">
  <TxRefs Type="TxSegment" Refs="SegExternal"/>
</TxActionData>
<TxActionData Name="DataGetClaim" Status="Pending" Type="Read"
   TxnClass="ab_ebill">
  <TxRefs Type="TxSegment" Refs="SegGetClaim"/>
</TxActionData>
<TxActionData Name="DataSubmitClaim" Status="Pending" Type="Change"
   TxnClass="AbEbillSubmit">
  <TxRefs Type="TxSegment" Refs="SegSubmitClaim"/>
</TxActionData>
<TxActionData Name="DataSubmitAllClaims" Status="Pending" Type="Change"
   TxnClass="AbEbillSubmit">
  <TxRefs Type="TxSegment" Refs="SegSubmitAllClaims"/>
</TxActionData>
<TxActionData Name="DataSubmitNew" Status="Pending" Type="Change"
   TxnClass="AbEbillSubmit">
  <TxRefs Type="TxSegment" Refs="SegSubmitNew"/>
</TxActionData>
<TxActionData Name="DataDeleteClaim" Status="Pending" Type="Change"
   TxnClass="AbEbillDelete">
  <TxRefs Type="TxSegment" Refs="SegDeleteClaim"/>
</TxActionData>
<TxActionData Name="DataRefreshAll" Type="Find"
```

```
    TxnClass="ListUserPendingAbClaims">
   <TxRefs Type="TxSegment" Refs="SegFindAll"/>
  </TxActionData>
  <TxActionData Name="DataRefreshNonSubmittable" Type="Find"
    TxnClass="ListUserPendingAbClaims">
   <TxRefs Type="TxSegment" Refs="SegFindNonSubmittable"/>
  </TxActionData>
  <TxActionData Name="DataRefreshPending" Type="Find"
    TxnClass="ListUserPendingAbClaims">
   <TxRefs Type="TxSegment" Refs="SegFindPending"/>
  </TxActionData>
  <TxActionData Name="DataRefreshError" Type="Find"
    TxnClass="ListUserPendingAbClaims">
   <TxRefs Type="TxSegment" Refs="SegFindError"/>
  </TxActionData>
  <TxActionData Name="DataRefreshNew" Type="Find"
    TxnClass="ListUserPendingAbClaims">
   <TxRefs Type="TxSegment" Refs="SegFindNew"/>
  </TxActionData>
  <TxActionData Name="DataRefreshSubmitted" Type="Find"
    TxnClass="ListUserPendingAbClaims">
   <TxRefs Type="TxSegment" Refs="SegFindSubmitted"/>
  </TxActionData>
  <TxActionData Name="DataRefreshDeleted" Type="Find"
    TxnClass="ListUserPendingAbClaims">
   <TxRefs Type="TxSegment" Refs="SegFindDeleted"/>
  </TxActionData>

  <TxActionData Name="DataServiceCodeLookup" Status="Pending" Type="Change" TxnClass="FindServcode"
ExcludeOptSegments="No">
   <TxRefs Type="TxSegment" Refs="SegServiceCodeLookup"/>
  </TxActionData>
  <TxActionData Name="DataDiagCodeLookup1" Status="Pending" Type="Change" TxnClass="ab_diagnostic"
ExcludeOptSegments="No">
   <TxRefs Type="TxSegment" Refs="SegDiagCodeLookup1"/>
  </TxActionData>
  <TxActionData Name="DataDiagCodeLookup2" Status="Pending" Type="Change" TxnClass="ab_diagnostic"
ExcludeOptSegments="No">
   <TxRefs Type="TxSegment" Refs="SegDiagCodeLookup2"/>
  </TxActionData>
  <TxActionData Name="DataDiagCodeLookup3" Status="Pending" Type="Change" TxnClass="ab_diagnostic"
ExcludeOptSegments="No">
   <TxRefs Type="TxSegment" Refs="SegDiagCodeLookup3"/>
  </TxActionData>

  <TxActionData Name="DataFeeModLookup1" Status="Pending" Type="Change" TxnClass="ab_feemodifier"
ExcludeOptSegments="No">
   <TxRefs Type="TxSegment" Refs="SegFeeModLookup1"/>
  </TxActionData>
  <TxActionData Name="DataFeeModLookup2" Status="Pending" Type="Change" TxnClass="ab_feemodifier"
ExcludeOptSegments="No">
   <TxRefs Type="TxSegment" Refs="SegFeeModLookup2"/>
  </TxActionData>
  <TxActionData Name="DataFeeModLookup3" Status="Pending" Type="Change" TxnClass="ab_feemodifier"
ExcludeOptSegments="No">
   <TxRefs Type="TxSegment" Refs="SegFeeModLookup3"/>
  </TxActionData>

  <TxActionData Name="DataReferralUliLookup" Status="Pending" Type="Change" TxnClass="find_provider"
ExcludeOptSegments="No">
   <TxRefs Type="TxSegment" Refs="SegReferralUliLookup"/>
  </TxActionData>
  <TxActionData Name="DataPatientLookup" Status="Pending" Type="Find" TxnClass="find_patient" ExcludeOptSegments="No"
ExcludeOptFields="No">
   <TxRefs Type="TxSegment" Refs="SegPatientLookup SegPatientLookup2 SegPatientLookup2_1 SegPatientLookup2_2
SegPatientLookup2_3 SegPatientLookup2_4 SegPatientLookup2_6 SegPatientLookup2_7 SegPatientLookup2_8
SegPatientLookup2_9 SegPatientLookup2_10 SegPatientLookup2_11 SegPatientLookup2_12 SegPatientLookup2_13
SegPatientLookup2_14 SegPatientLookup2_15 SegPatientLookup2_16 SegPatientLookup2_17 SegPatientLookup2_18
SegPatientLookup2_19"/>
```

```
<!--
SegPatientLookup2_5
-->
 </TxActionData>

<!-- End of TxActionData Definitions -->
</TxList>

<TxList Type="TxAction">
 <TxAction Name="ActionOutlookBilling" Type="Class" TransactionHandler="CA.ebill.mso.Outlook" URL="xml"
ClassInstallURL="dashboard/ebilloljerr.html" ActionData="DataOutlookBilling" Style="Button" Align="Left">
  <Label>Generate Claims</Label>
  <Desc>Generate Claims marked as Ready in Outlook</Desc>
  <TxFormResult SuccessMode="None" WarningMode="None" ErrorMode="None"></TxFormResult>
  <TxStatusResult SuccessMode="Update" WarningMode="Update" ErrorMode="Update"></TxStatusResult>
 </TxAction>
 <TxAction Name="ActionOutlookAppointment" Type="Class" TransactionHandler="CA.ebill.mso.Outlook" URL="xml"
ClassInstallURL="dashboard/ebilloljerr.html" ActionData="DataOutlookAppointment" Style="Button" Align="Left">
  <Label>Synchronize Appointments</Label>
  <Desc>Synchronize appointments from Outlook</Desc>
  <TxFormResult SuccessMode="None" WarningMode="None" ErrorMode="None"></TxFormResult>
  <TxStatusResult SuccessMode="Update" WarningMode="Update" ErrorMode="Update"></TxStatusResult>
 </TxAction>
 <TxAction Name="ActionOutlookPatient" Type="Class" TransactionHandler="CA.ebill.mso.Outlook" URL="xml"
ClassInstallURL="dashboard/ebilloljerr.html" ActionData="DataOutlookPatient" Style="Button" Align="Left">
  <Label>Synchronize Patients</Label>
  <Desc>Synchronize patient from Outlook</Desc>
  <TxFormResult SuccessMode="None" WarningMode="None" ErrorMode="None"></TxFormResult>
  <TxStatusResult SuccessMode="Update" WarningMode="Update" ErrorMode="Update"></TxStatusResult>
 </TxAction>
 <TxAction Name="ActionOutlookDaysheet" Type="Class" TransactionHandler="CA.ebill.mso.Outlook" URL="xml"
ClassInstallURL="dashboard/ebilloljerr.html" ActionData="DataOutlookDaysheet" Style="Button" Align="Right">
  <Label>Synchronize All</Label>
  <Desc>Synchronize patients, appointments and generate Claims
marked as Ready from Outlook Calendars</Desc>
  <TxFormResult SuccessMode="None" WarningMode="None" ErrorMode="None"></TxFormResult>
  <TxStatusResult SuccessMode="Update" WarningMode="Update" ErrorMode="Update"></TxStatusResult>
 </TxAction>
 <TxAction Name="ActionSaveShortAdd" Type="Post" CtrlKey="S"
   URL="xml" ActionData="DataShortAdd">
  <Label>Save</Label>
  <Desc>Save claim  (Ctrl-S)</Desc>
  <TxFormResult SuccessMode="Replace" WarningMode="Replace" ErrorMode="Replace"/>
  <TxStatusResult SuccessMode="Update" WarningMode="Update" ErrorMode="None"/>
  <TxActionResult SuccessAction="ActionClearNow"/>
 </TxAction>
 <TxAction Name="ActionSaveAndCloneShortAdd" Type="Post" CtrlKey="A"
   URL="xml" ActionData="DataShortAdd">
  <Label>Save/bill again</Label>
  <Desc>Save and keep the patient info here to bill this patient again (Ctrl-A)</Desc>
  <TxFormResult SuccessMode="Replace" WarningMode="Replace" ErrorMode="Replace"/>
  <TxStatusResult SuccessMode="Update" WarningMode="Update" ErrorMode="None"/>
  <TxActionResult SuccessAction="ActionCloneShortAdd"/>
 </TxAction>
 <TxAction Name="ActionSaveFullAdd" Type="Post" CtrlKey="S"
   URL="xml"
   ActionData="DataFullAdd">
  <Label>Save</Label>
  <Desc>Save claim (Ctrl-S)</Desc>
  <TxFormResult SuccessMode="Replace" WarningMode="Replace" ErrorMode="Replace"/>
  <TxStatusResult SuccessMode="Update" WarningMode="Update" ErrorMode="None"/>
  <TxActionResult SuccessAction="ActionClearNow"/>
 </TxAction>
 <TxAction Name="ActionSaveAndCloneFullAdd" Type="Post" CtrlKey="A"
   URL="xml"
   ActionData="DataFullAdd">
  <Label>Save/bill again</Label>
  <Desc>Save and keep the patient info here to bill this patient again (Ctrl-A)</Desc>
  <TxFormResult SuccessMode="Replace" WarningMode="Replace" ErrorMode="Replace"/>
```

```
  <TxStatusResult SuccessMode="Update" WarningMode="Update" ErrorMode="None"/>
  <TxActionResult SuccessAction="ActionCloneFullAdd"/>
</TxAction>
<TxAction Name="ActionCloneShortAdd" Type="Form" Style="Hidden"
   TargetFormSet="Claim"
   TargetFormSetURL="open_form?action=applet&category=Claim"
   ActionData="DataCloneShortAdd">
  <Label>Save/bill again</Label>
  <Desc>Save and keep the patient info here to bill this patient again</Desc>
  <TxFormResult SuccessMode="Replace" WarningMode="Replace" ErrorMode="None"/>
  <TxStatusResult SuccessMode="None" WarningMode="None" ErrorMode="None"/>
</TxAction>
<TxAction Name="ActionCloneFullAdd" Type="Form" Style="Hidden"
   TargetFormSet="Claim"
   TargetFormSetURL="open_form?action=applet&category=Claim"
   ActionData="DataCloneFullAdd">
  <Label>Save/bill again</Label>
  <Desc>Save and keep the patient info here to bill this patient again</Desc>
  <TxFormResult SuccessMode="Replace" WarningMode="Replace" ErrorMode="None"/>
  <TxStatusResult SuccessMode="None" WarningMode="None" ErrorMode="None"/>
</TxAction>
<TxAction Name="ActionSaveChange" Type="Post" CtrlKey="S"
   URL="xml"
   ActionData="DataChange">
  <Label>Save</Label>
  <Desc>Save claim (Ctrl-S)</Desc>
  <TxFormResult SuccessMode="Clear" WarningMode="Replace" ErrorMode="Replace"/>
  <TxStatusResult SuccessMode="Update" WarningMode="Update" ErrorMode="None"/>
</TxAction>
<TxAction Name="ActionSaveDelete" Type="Post" CtrlKey="S"
   URL="xml"
   ActionData="DataDelete">
  <Label>Save</Label>
  <Desc>Save claim (Ctrl-S)</Desc>
  <TxFormResult SuccessMode="Clear" WarningMode="Replace" ErrorMode="Replace"/>
  <TxStatusResult SuccessMode="Update" WarningMode="Update" ErrorMode="None"/>
</TxAction>
<TxAction Name="ActionSaveReassess" Type="Post" CtrlKey="S"
   URL="xml"
   ActionData="DataReassess">
  <Label>Save</Label>
  <Desc>Save claim (Ctrl-S)</Desc>
  <TxFormResult SuccessMode="Clear" WarningMode="Replace" ErrorMode="Replace"/>
  <TxStatusResult SuccessMode="Update" WarningMode="Update" ErrorMode="None"/>
</TxAction>
<TxAction Name="ActionExternalChange" Type="Form"
   TargetFormSet="Claim"
   TargetFormSetURL="open_form?action=applet&category=Claim"
   ActionData="DataExternalChange">
  <Label>Create Change</Label>
  <Desc>Create a Change claim</Desc>
  <TxFormResult SuccessMode="Replace" WarningMode="Replace" ErrorMode="None"/>
  <TxStatusResult SuccessMode="None" WarningMode="None" ErrorMode="None"/>
</TxAction>
<TxAction Name="ActionExternalDelete" Type="Form"
   TargetFormSet="Claim"
   TargetFormSetURL="open_form?action=applet&category=Claim"
   ActionData="DataExternalDelete">
  <Label>Create Delete</Label>
  <Desc>Create a Change claim</Desc>
  <TxFormResult SuccessMode="Replace" WarningMode="Replace" ErrorMode="Replace"/>
  <TxStatusResult SuccessMode="None" WarningMode="None" ErrorMode="None"/>
</TxAction>
<TxAction Name="ActionExternalReassess" Type="Form"
   TargetFormSet="Claim"
   TargetFormSetURL="open_form?action=applet&category=Claim"
   ActionData="DataExternalReassess">
  <Label>Create Reassess</Label>
  <Desc>Create a Change claim</Desc>
```

```
  <TxFormResult SuccessMode="Replace" WarningMode="Replace" ErrorMode="Replace"/>
  <TxStatusResult SuccessMode="None" WarningMode="None" ErrorMode="None"/>
</TxAction>
<TxAction Name="ActionRefreshAll" Type="Post"
   ActionData="DataRefreshAll"
   URL="xml" Align="Left" CtrlKey="A">
  <Label>Show All</Label>
  <Desc>Retrieve status for all claims</Desc>
  <TxFormResult SuccessMode="None" WarningMode="None" ErrorMode="None"/>
  <TxStatusResult SuccessMode="Replace" WarningMode="Replace" ErrorMode="Clear"/>
</TxAction>
<TxAction Name="ActionRefreshNonSubmittable" Type="Post"
   ActionData="DataRefreshNonSubmittable"
   URL="xml" Align="Left" CtrlKey="U">
  <Label>Unsubmittable Claims</Label>
  <Desc>Retrieve status for all External, deleted and error claims</Desc>
  <TxFormResult SuccessMode="None" WarningMode="None" ErrorMode="None"/>
  <TxStatusResult SuccessMode="Replace" WarningMode="Replace" ErrorMode="Clear"/>
</TxAction>
<TxAction Name="ActionRefreshPending" Type="Post"
   ActionData="DataRefreshPending"
   URL="xml" Align="Left" CtrlKey="N">
  <Label>Pending Only</Label>
  <Desc>Retrieve status for pending claims</Desc>
  <TxFormResult SuccessMode="None" WarningMode="None" ErrorMode="None"/>
  <TxStatusResult SuccessMode="Replace" WarningMode="Replace" ErrorMode="Clear"/>
</TxAction>
<TxAction Name="ActionRefreshNew" Type="Post"
   ActionData="DataRefreshNew"
   URL="xml" Align="Left">
  <Label>External Only</Label>
  <Desc>Retrieve status for external claims</Desc>
  <TxFormResult SuccessMode="None" WarningMode="None" ErrorMode="None"/>
  <TxStatusResult SuccessMode="Replace" WarningMode="Replace" ErrorMode="Clear"/>
</TxAction>
<TxAction Name="ActionRefreshSubmitted" Type="Post"
   ActionData="DataRefreshSubmitted"
   URL="xml" Align="Left" CtrlKey="B">
  <Label>Submitted Only</Label>
  <Desc>Retrieve status for submitted claims</Desc>
  <TxFormResult SuccessMode="None" WarningMode="None" ErrorMode="None"/>
  <TxStatusResult SuccessMode="Replace" WarningMode="Replace" ErrorMode="Clear"/>
</TxAction>
<TxAction Name="ActionRefreshDeleted" Type="Post"
   ActionData="DataRefreshDeleted"
   URL="xml" Align="Left">
  <Label>Deleted Only</Label>
  <Desc>Retrieve status for deleted claims</Desc>
  <TxFormResult SuccessMode="None" WarningMode="None" ErrorMode="None"/>
  <TxStatusResult SuccessMode="Replace" WarningMode="Replace" ErrorMode="Clear"/>
</TxAction>
<TxAction Name="ActionRefreshError" Type="Post"
   ActionData="DataRefreshError"
   URL="xml" Align="Left">
  <Label>Errors Only</Label>
  <Desc>Retrieve status for error claims</Desc>
  <TxFormResult SuccessMode="None" WarningMode="None" ErrorMode="None"/>
  <TxStatusResult SuccessMode="Replace" WarningMode="Replace" ErrorMode="Clear"/>
</TxAction>

<TxAction Name="GetClaim" Type="Post"
   URL="xml" Align="Right"
   ActionData="DataGetClaim"
   TargetFormSet="Claim"
   TargetFormSetURL="open_form?category=Claim&action=applet"
   CtrlKey="E"
   >
  <Label>Edit</Label>
  <Desc>Get selected claim for editing</Desc>
```

```
  <TxActionCondition Name="SF_UserID" Type="EQ" Mode="Warn" FailMessage="Do you wish to edit another user's claim?">
    <Value>#USER#</Value>
  </TxActionCondition>
  <TxFormResult SuccessMode="Replace" WarningMode="Replace" ErrorMode="None"/>
  <TxStatusResult SuccessMode="None" WarningMode="None" ErrorMode="None"/>
</TxAction>
<TxAction Name="SubmitClaim" Type="Post"
   URL="xml" Align="Right" ActionData="DataSubmitClaim" CtrlKey="S">
  <Label>Submit</Label>
  <Desc>Mark selected claim for submission</Desc>
  <TxActionCondition Name="SF_Status" Type="NEQ" Mode="Error" FailMessage="You cannot submit a deleted (D) claim.">
    <Value>D</Value>
  </TxActionCondition>
  <TxActionCondition Name="SF_Status" Type="NEQ" Mode="Error" FailMessage="You cannot submit a claim with errors (E).">
    <Value>E</Value>
  </TxActionCondition>
  <TxActionCondition Name="SF_Status" Type="NEQ" Mode="Error" FailMessage="This claim is already submitted.">
    <Value>S</Value>
  </TxActionCondition>
  <TxFormResult SuccessMode="None" WarningMode="None" ErrorMode="Update"/>
  <TxStatusResult SuccessMode="Update" WarningMode="Update" ErrorMode="Update"/>
</TxAction>
<TxAction Name="SubmitAllClaims" Type="Post"
   URL="xml" Align="Right" ActionData="DataSubmitAllClaims" CtrlKey="P"
   ConfirmationText="You are about to change all pending (P) claims to a state of submitted (S).  Do you want to continue?"
   >
  <Label>Submit Pending</Label>
  <Desc>Mark all pending (P) claims for submission</Desc>
  <TxFormResult SuccessMode="None" WarningMode="None" ErrorMode="None"/>
  <TxStatusResult SuccessMode="Replace" WarningMode="Replace" ErrorMode="None"/>
  <TxActionResult SuccessAction="ActionRefreshAll"/>
</TxAction>
<TxAction Name="SubmitNew" Type="Post"
   URL="xml" Align="Right" ActionData="DataSubmitNew" CtrlKey="X"
   ConfirmationText="You are about to change all external (N) claims to a state of submitted (S). External claims with errors will be
marked as error (E). Do you want to continue?"
   >
  <Label>Submit External</Label>
  <Desc>Mark all pending (N) claims for submission, claims with errors will be marked as error (E)</Desc>
  <TxFormResult SuccessMode="None" WarningMode="None" ErrorMode="None"/>
  <TxStatusResult SuccessMode="Replace" WarningMode="Replace" ErrorMode="None"/>
  <TxActionResult SuccessAction="ActionRefreshAll"/>
</TxAction>
<TxAction Name="DeleteClaim" Type="Post"
   URL="xml" Align="Right" ActionData="DataDeleteClaim" CtrlKey="D"
   ConfirmationText="Selected claim will be marked for deletion. Do you wish to proceed?"
   >
  <Label>Delete</Label>
  <Desc>Mark selected claim for deletion</Desc>
  <TxActionCondition Name="SF_Status" Type="NEQ" Mode="Error" FailMessage="This claim is already deleted (D)">
    <Value>D</Value>
  </TxActionCondition>
  <TxFormResult SuccessMode="None" WarningMode="None" ErrorMode="None"/>
  <TxStatusResult SuccessMode="Update" WarningMode="Update" ErrorMode="None"/>
</TxAction>
<TxAction Name="DeleteAll" Type="Post"
   URL="deleteall.xml"
   ConfirmationText="All claims will be marked for deletion. Do you wish to proceed?"
    Align="Right">
  <Label>Delete All</Label>
  <Desc>Mark all pending claims for deletion</Desc>
  <TxFormResult SuccessMode="None" WarningMode="None" ErrorMode="None"/>
  <TxStatusResult SuccessMode="Replace" WarningMode="Replace" ErrorMode="None"/>
</TxAction>

<TxAction Name="ActionServiceCodeLookup" Type="LookupRequest" Align="Right"
   ActionData="DataServiceCodeLookup"
   TargetFormSet="Find"
   TargetFormSetURL="open_form?category=Find&action=applet"
```

```
  TargetFormSetActionList="FindABService_codeActionLookup"
 >
 <Label>...</Label>
 <Desc>Lookup Service Code (ctrl-enter)</Desc>
 <TxFormResult SuccessMode="Replace" WarningMode="Replace" ErrorMode="None"/>
 <TxStatusResult SuccessMode="None" WarningMode="None" ErrorMode="None"/>
</TxAction>

<TxAction Name="ActionDiagCodeLookup1" Type="LookupRequest" Align="Right"
  ActionData="DataDiagCodeLookup1"
  TargetFormSet="Find"
  TargetFormSetURL="open_form?category=Find&action=applet"
  TargetFormSetActionList="FindABDiagnosticActionLookup"
 >
 <Label>...</Label>
 <Desc>Lookup Diagnostic Code (ctrl-enter)</Desc>
 <TxFormResult SuccessMode="Replace" WarningMode="Replace" ErrorMode="None"/>
 <TxStatusResult SuccessMode="None" WarningMode="None" ErrorMode="None"/>
</TxAction>

<TxAction Name="ActionDiagCodeLookup2" Type="LookupRequest" Align="Right"
  ActionData="DataDiagCodeLookup2"
  TargetFormSet="Find"
  TargetFormSetURL="open_form?category=Find&action=applet"
  TargetFormSetActionList="FindABDiagnosticActionLookup"
 >
 <Label>...</Label>
 <Desc>Lookup Diagnostic Code (ctrl-enter)</Desc>
 <TxFormResult SuccessMode="Replace" WarningMode="Replace" ErrorMode="None"/>
 <TxStatusResult SuccessMode="None" WarningMode="None" ErrorMode="None"/>
</TxAction>
<TxAction Name="ActionDiagCodeLookup3" Type="LookupRequest" Align="Right"
  ActionData="DataDiagCodeLookup3"
  TargetFormSet="Find"
  TargetFormSetURL="open_form?category=Find&action=applet"
  TargetFormSetActionList="FindABDiagnosticActionLookup"
 >
 <Label>...</Label>
 <Desc>Lookup Diagnostic Code (ctrl-enter)</Desc>
 <TxFormResult SuccessMode="Replace" WarningMode="Replace" ErrorMode="None"/>
 <TxStatusResult SuccessMode="None" WarningMode="None" ErrorMode="None"/>
</TxAction>

<TxAction Name="ActionFeeModLookup1" Type="LookupRequest" Align="Right"
  ActionData="DataFeeModLookup1"
  TargetFormSet="Find"
  TargetFormSetURL="open_form?category=Find&action=applet"
  TargetFormSetActionList="FindABFeemodifierActionLookup"
 >
 <Label>...</Label>
 <Desc>Lookup Fee Modifier Code (ctrl-enter)</Desc>
 <TxFormResult SuccessMode="Replace" WarningMode="Replace" ErrorMode="None"/>
 <TxStatusResult SuccessMode="None" WarningMode="None" ErrorMode="None"/>
</TxAction>

<TxAction Name="ActionFeeModLookup2" Type="LookupRequest" Align="Right"
  ActionData="DataFeeModLookup2"
  TargetFormSet="Find"
  TargetFormSetURL="open_form?category=Find&action=applet"
  TargetFormSetActionList="FindABFeemodifierActionLookup"
 >
 <Label>...</Label>
 <Desc>Lookup Fee Modifier Code (ctrl-enter)</Desc>
 <TxFormResult SuccessMode="Replace" WarningMode="Replace" ErrorMode="None"/>
 <TxStatusResult SuccessMode="None" WarningMode="None" ErrorMode="None"/>
</TxAction>
<TxAction Name="ActionFeeModLookup3" Type="LookupRequest" Align="Right"
  ActionData="DataFeeModLookup3"
  TargetFormSet="Find"
```

```
   TargetFormSetURL="open_form?category=Find&action=applet"
   TargetFormSetActionList="FindABFeemodifierActionLookup"
  >
  <Label>...</Label>
  <Desc>Lookup Fee Modifier Code (ctrl-enter)</Desc>
  <TxFormResult SuccessMode="Replace" WarningMode="Replace" ErrorMode="None"/>
  <TxStatusResult SuccessMode="None" WarningMode="None" ErrorMode="None"/>
 </TxAction>

 <TxAction Name="ActionReferralUliLookup" Type="LookupRequest" Align="Right"
   ActionData="DataReferralUliLookup"
   TargetFormSet="Find"
   TargetFormSetURL="open_form?category=Find&action=applet"
  >
  <Label>...</Label>
  <Desc>Lookup Referral Prac-Num (ctrl-enter)</Desc>
  <TxFormResult SuccessMode="Replace" WarningMode="Replace" ErrorMode="None"/>
  <TxStatusResult SuccessMode="None" WarningMode="None" ErrorMode="None"/>
 </TxAction>

 <TxAction Name="ActionPatientLookup" Type="LookupRequest" Align="Right"
   ActionData="DataPatientLookup"
   URL="xml"
   TargetFormSet="Find"
   TargetFormSetURL="open_form?category=Find&action=applet"
   TargetFormSetActionList="ActionFindPatientLookup"
  >
  <Label>...</Label>
  <Desc>Lookup Patient (ctrl-enter)</Desc>
  <TxFormResult SuccessMode="Replace" WarningMode="Replace" ErrorMode="None"/>
  <TxStatusResult SuccessMode="None" WarningMode="None" ErrorMode="None"/>
 </TxAction>

 <TxAction Name="ActionClear" Type="Reset"
   Align="Right"
   ConfirmationText="Clear the contents of this form?"
   >
  <Label>Clear</Label>
  <TxFormResult SuccessMode="Clear" WarningMode="None" ErrorMode="None"/>
  <TxStatusResult SuccessMode="None" WarningMode="None" ErrorMode="None"/>
 </TxAction>
 <TxAction Name="ActionClearNow" Type="Reset" Style="Hidden"
   Align="Right"
   >
  <Label>Clear</Label>
  <TxFormResult SuccessMode="Clear" WarningMode="None" ErrorMode="None"/>
  <TxStatusResult SuccessMode="None" WarningMode="None" ErrorMode="None"/>
 </TxAction>
</TxList>

<TxList Type="TxStatusField">
 <TxStatusField Name="SF_OutlookMessage" Type="Value">
  <Label>Sync Activity Log</Label>
  <TxDataFieldRef DataSegment="outlook" DataField="Message"/>
 </TxStatusField>
 <TxStatusField Name="SF_EbillClaimId" Type="Value" KeyField="Yes" Display="No">
  <Label>EbillClaimId</Label>
  <TxDataFieldRef DataSegment="ab_ebill" DataField="eb_claim_id"/>
 </TxStatusField>
 <TxStatusField Name="SF_Priced_Amount" Type="Value">
  <Label>Priced Amount</Label>
  <TxDataFieldRef DataSegment="ab_ebill" DataField="priced_amount"/>
 </TxStatusField>
 <TxStatusField Name="SF_Status" Type="Value">
  <Label>Status</Label>
  <TxDataFieldRef DataSegment="ab_ebill" DataField="claim_state"/>
 </TxStatusField>
 <TxStatusField Name="SF_UserID" Type="Value">
  <Label>UserId</Label>
```

<TxDataFieldRef DataSegment="ab_ebill" DataField="logon_userid"/>
</TxStatusField>
<TxStatusField Name="SF_Errors" Type="Value">
<Label>Errors</Label>
<TxDataFieldRef DataSegment="ab_ebill" DataField="warning_count"/>
</TxStatusField>
<TxStatusField Name="SF_ChartNum" Type="Value">
<Label>Chart Num</Label>
<TxDataFieldRef DataSegment="ab_ebill" AltDataSegment="ab_cib1" DataField="ChartNum"/>
</TxStatusField>
<TxStatusField Name="SF_ClaimNum" Type="Value">
<Label>ClaimNum</Label>
<TxDataFieldRef DataSegment="ab_ebill" DataField="claim_number"/>
</TxStatusField>
<TxStatusField Name="SF_Action" Type="Value">
<Label>Action</Label>
<TxDataFieldRef DataSegment="ab_ebill" DataField="Action"/>
</TxStatusField>
<TxStatusField Name="SF_ServDate" Type="Value">
<Label>ServDate</Label>
<TxDataFieldRef DataSegment="ab_ebill" AltDataSegment="ab_cib1" DataField="ServStartDate" Format="yyyy-MM-dd"/>
</TxStatusField>
<TxStatusField Name="SF_Provider" Type="Value">
<Label>Provider</Label>
<TxDataFieldRef DataSegment="ab_ebill" AltDataSegment="ab_cib1" DataField="ProviderULI"/>
</TxStatusField>
<TxStatusField Name="SF_Recipient" Type="Value">
<Label>Recipient</Label>
<TxDataFieldRef DataSegment="ab_ebill" AltDataSegment="ab_cib1" DataField="RecipientULI"/>
</TxStatusField>
<TxStatusField Name="SF_ServCode" Type="Value">
<Label>ServCode</Label>
<TxDataFieldRef DataSegment="ab_ebill" AltDataSegment="ab_cib1" DataField="ServCode"/>
</TxStatusField>
<TxStatusField Name="SF_DiagCode1" Type="Value">
<Label>DiagCode1</Label>
<TxDataFieldRef DataSegment="ab_ebill" AltDataSegment="ab_cib1" DataField="DiagCode1"/>
</TxStatusField>
<TxStatusField Name="SF_DiagCode2" Type="Value">
<Label>DiagCode2</Label>
<TxDataFieldRef DataSegment="ab_ebill" AltDataSegment="ab_cib1" DataField="DiagCode2"/>
</TxStatusField>
<TxStatusField Name="SF_DiagCode3" Type="Value">
<Label>DiagCode3</Label>
<TxDataFieldRef DataSegment="ab_ebill" AltDataSegment="ab_cib1" DataField="DiagCode3"/>
</TxStatusField>
<TxStatusField Name="SF_ReferralPracNum" Type="Value">
<Label>Ref Prac</Label>
<TxDataFieldRef DataSegment="ab_ebill" AltDataSegment="ab_cib1" DataField="ReferralULI"/>
</TxStatusField>
<TxStatusField Name="SF_TextInd" Type="Value">
<Label>Text</Label>
<Desc>First 10 characters of text</Desc>
<TxDataFieldRef DataSegment="ab_ebill" AltDataSegment="ab_cst1" DataField="text"/>
</TxStatusField>
</TxList>

<!-- RBT 20030625 add columns showing referral and text segment -->
<TxList Type="TxStatusPage">
<TxStatusPage Name="OutlookStatus" StatusClass="outlook" TxnClasses="outlook_ab_ebill outlook_appointment outlook_patient outlook_daysheet" AutoAction="ActionOutlookDaysheet" AutoInterval="-1">
<Label>Outlook Sync</Label>
<Desc>Outlook Digital Dashboard Activity</Desc>
<TxRefs Type="TxAction" Refs="ActionOutlookBilling ActionOutlookPatient ActionOutlookAppointment ActionOutlookDaysheet"/>
<TxRefs Type="TxStatusField"
Refs="SF_OutlookMessage"/>
</TxStatusPage>
<TxStatusPage Name="PendingStatus" StatusClass="ab_ebill" TxnClasses="ab_ebill ab_ebill_c ab_ebill_r ab_ebill_d AbEbillSubmit AbEbillDelete" DefaultAction="GetClaim">

```
   <Label>Claim Status</Label>
   <Desc>Displays the status of all unprocessed claims</Desc>
   <TxRefs Type="TxAction" Refs="ActionRefreshAll ActionRefreshNonSubmittable ActionRefreshPending ActionRefreshSubmitted
 GetClaim SubmitClaim SubmitAllClaims SubmitNew DeleteClaim"/>
   <TxRefs Type="TxStatusField"
        Refs="SF_EbillClaimId
            SF_Status
            SF_Errors
            SF_Action
            SF_ServDate
            SF_Provider
            SF_ChartNum
            SF_Recipient
            SF_ServCode
            SF_Priced_Amount
            SF_DiagCode1
            SF_DiagCode2
            SF_DiagCode3
            SF_UserID
            SF_ClaimNum
            SF_ReferralPracNum
            SF_TextInd
            "/>
  </TxStatusPage>
</TxList>

<TxList Type="TxForm">
<!-- Start of Form Definitions -->
<!-- The transaction classes for this outlook form must match the ActionData transaction classes for the synchronization actions -->
  <TxForm Name="Outlook" FormClass="Outlook" TxnClasses="outlook_patient outlook_appointment outlook_ab_ebill
outlook_daysheet" Version="1.0" ForceUppercase="Yes" ReadOnly="No" UserSelectable="Yes"
TopPage="PageOutlookBillingOptions">
   <Label>Outlook Transactions</Label>
   <TxRefs Type="TxStatusPage" Refs="OutlookStatus PendingStatus"></TxRefs>
  </TxForm>
  <TxForm Name="ShortAdd" FormClass="ab_ebill" TxnClasses="ab_ebill_clone_sa ab_ebill_a_new find_patient find_provider
service asst_code FindServcode abFindUp_modifier abFindUp_skillcode abFindUp_funcctr abFindUp_diag abFindUp_fac"
Version="1.0">
   <Label>Add Claim</Label>
   <Desc>General form for adding a claim</Desc>
   <TxRefs Type="TxAction" Refs="ActionSaveShortAdd ActionSaveAndCloneShortAdd ActionClear ActionClearNow
ActionCloneShortAdd"/>
   <TxRefs Type="TxPage" Refs="PageCIB1a PageCPD1"/>
   <TxRefs Type="TxStatusPage" Refs="PendingStatus"/>
  </TxForm>
  <TxForm Name="FullAdd" FormClass="ab_ebill" TxnClasses="ab_ebill_clone_fa ab_ebill_a_newpatient find_provider find_patient
service asst_code FindServcode abFindUp_modifier abFindUp_skillcode abFindUp_funcctr abFindUp_diag abFindUp_fac"
Version="1.0">
   <Label>Add Claim (all segments)</Label>
   <Desc>General form for adding a claim</Desc>
   <TxRefs Type="TxAction" Refs="ActionSaveAndCloneFullAdd ActionSaveFullAdd ActionClear ActionClearNow
ActionCloneFullAdd"/>
   <TxRefs Type="TxPage" Refs="PageCIB1a PageCPD1a PageCPD1b PageCPD1c PageCST1"/>
   <TxRefs Type="TxStatusPage" Refs="PendingStatus"/>
  </TxForm>
  <TxForm Name="External" FormClass="external" TxnClasses="none" Version="1.0">
   <Label>Modify External Claim</Label>
   <Desc>Form for submitting a Change/Delete/Reassess for an external (non-ebill) claim</Desc>
   <TxRefs Type="TxAction" Refs="ActionExternalChange ActionExternalDelete ActionExternalReassess ActionClear"/>
   <TxRefs Type="TxPage" Refs="PageExternal"/>
  </TxForm>
  <TxForm Name="Change" FormClass="ab_ebill_c" TxnClasses="ab_ebill_c_new"
      UserSelectable="No" Version="1.0">
   <Label>Change Accepted Claim</Label>
   <Desc>Form for creating a Change claim</Desc>
   <TxRefs Type="TxAction" Refs="ActionSaveChange ActionClear"/>
<!-- RBT Nov 26, 2002 remove the second cib1 page since all fields on first now
   <TxRefs Type="TxPage" Refs="PageCIB1aChange PageCIB1bChange PageCPD1a PageCPD1b PageCPD1c PageCST1"/>
-->
```

```
<!-- RBT 2003-07-14 change from PageCIB1aChange to PageCIB1a as used in ShortAdd/SaveAdd
    TODO: change this to properly use R/O fields by using different txnClasses and fieldnames for the same field ids
   <TxRefs Type="TxPage" Refs="PageCIB1aChange PageCPD1a PageCPD1b PageCPD1c PageCST1"/>
 -->
<!-- RBT 2003-08-20 change back to PageCIB1aChange so sets action as C for change
   <TxRefs Type="TxPage" Refs="PageCIB1a PageCPD1a PageCPD1b PageCPD1c PageCST1"/>
 -->
   <TxRefs Type="TxPage" Refs="PageCIB1aChange PageCPD1a PageCPD1b PageCPD1c PageCST1"/>
   <TxRefs Type="TxStatusPage" Refs="PendingStatus"/>
  </TxForm>
  <TxForm Name="Delete" FormClass="ab_ebill_d" TxnClasses="ab_ebill_d_new"
        UserSelectable="No" Version="1.0">
   <Label>Delete Accepted Claim</Label>
   <Desc>Form for creating a Delete claim</Desc>
   <TxRefs Type="TxAction" Refs="ActionSaveDelete ActionClear"/>
   <TxRefs Type="TxPage" Refs="PageCIB1aDelete"/>
   <TxRefs Type="TxStatusPage" Refs="PendingStatus"/>
  </TxForm>
  <TxForm Name="Reassess" FormClass="ab_ebill_r" TxnClasses="ab_ebill_r_new"
        UserSelectable="No" Version="1.0">
   <Label>Reassess Accepted Claim</Label>
   <Desc>Form for creating a Change claim</Desc>
   <TxRefs Type="TxAction" Refs="ActionSaveReassess ActionClear"/>
   <TxRefs Type="TxPage" Refs="PageCIB1aReassess PageCST1"/>
   <TxRefs Type="TxStatusPage" Refs="PendingStatus"/>
  </TxForm>
  <TxForm Name="ReadOnly" FormClass="ab_ebill_read_only" TxnClasses="ab_ebill_read_only"
        UserSelectable="No" ReadOnly="Yes" Version="1.0">
   <Label>Read Only (all segments)</Label>
   <Desc>General form for viewing a claim</Desc>
   <TxRefs Type="TxPage" Refs="PageCIB1a PageCPD1a PageCPD1b PageCPD1c PageCST1"/>
  </TxForm>
<!-- End of Form Definitions -->
</TxList>

</TxFormSet>
```

Appendix C: Example Java/SQL to create dynamic overlay 402 xml

Code Sample from RxQ, the 'station' part is customized for this application

```
  private void returnStationFormsetOverlay(PrintWriter writer, TotalpharmUserInfo uinfo,
DbConnection dbconn, String category)
  {
    StringBuffer out = new StringBuffer();
    SqlResultSet rs = null;
    try
    {

      // first get a list of forms you get access too.
      SqlSelectStatement sql = new SqlSelectStatement(dbconn);
      sql.addSelect( TRANZFORM_OVERLAY_OVERRIDE_OBJECT.TABLE,
TRANZFORM_OVERLAY_OVERRIDE_OBJECT.OBJ_ID );
      sql.addFrom( TRANZFORM_OVERLAY_OVERRIDE_OBJECT.TABLE );
      Formatter formatter = EntityFactory.GenerateFormatter(dbconn);
      SqlWhereBlock where = null;
      // role
      {
        SqlWhereBlockTail whotype = SqlWhereBlockTail.Or(formatter,
TRANZFORM_OVERLAY_OVERRIDE_OBJECT.TABLE, TRANZFORM_OVERLAY_OVERRIDE_OBJECT.WHO_TYPE,
SqlWhereAction.equal, "ROLE", SqlFieldType.STRING);
        whotype.add( SqlWhereBlockTail.And(formatter, TRANZFORM_OVERLAY_OVERRIDE_OBJECT.TABLE,
TRANZFORM_OVERLAY_OVERRIDE_OBJECT.WHO, SqlWhereAction.equal, uinfo.role(), SqlFieldType.STRING)
);
        where = new SqlWhereBlock(whotype);
        sql.where(where);
      }

      // logon ID
      {
        SqlWhereBlockTail whotype = SqlWhereBlockTail.Or(formatter,
TRANZFORM_OVERLAY_OVERRIDE_OBJECT.TABLE, TRANZFORM_OVERLAY_OVERRIDE_OBJECT.WHO_TYPE,
SqlWhereAction.equal, "USER", SqlFieldType.STRING);
        whotype.add( SqlWhereBlockTail.And(formatter, TRANZFORM_OVERLAY_OVERRIDE_OBJECT.TABLE,
TRANZFORM_OVERLAY_OVERRIDE_OBJECT.WHO, SqlWhereAction.equal, uinfo.logonID(),
SqlFieldType.STRING) );
        where.add(whotype);
      }

      // station
      String [] stationList = uinfo.getStations();
      if( stationList.length > 0 )
      {
        SqlWhereBlockTail whotype = SqlWhereBlockTail.Or(formatter,
TRANZFORM_OVERLAY_OVERRIDE_OBJECT.TABLE, TRANZFORM_OVERLAY_OVERRIDE_OBJECT.WHO_TYPE,
SqlWhereAction.equal, "STATION", SqlFieldType.STRING);
        whotype.add( SqlWhereBlockTail.AndIn(formatter, TRANZFORM_OVERLAY_OVERRIDE_OBJECT.TABLE,
TRANZFORM_OVERLAY_OVERRIDE_OBJECT.WHO, stationList, SqlFieldType.STRING) );
        where.add(whotype);
      }
      sql.addGroupBy( TRANZFORM_OVERLAY_OVERRIDE_OBJECT.TABLE,
TRANZFORM_OVERLAY_OVERRIDE_OBJECT.OBJ_ID );
      rs = sql.execute();
      List accessObj = new ArrayList();
      while( rs.next() )
        accessObj.add(rs.getString(1));
      rs.close();

      // second, get a list of all forms minus the ones you have access to.
      sql = new SqlSelectStatement(dbconn);
      sql.addSelect( TRANZFORM_OVERLAY_DISABLE_OBJECT.TABLE,
TRANZFORM_OVERLAY_DISABLE_OBJECT.OVERLAY_FORM );
      sql.addSelect( TRANZFORM_OVERLAY_DISABLE_OBJECT.TABLE,
TRANZFORM_OVERLAY_DISABLE_OBJECT.OVERLAY_OBJ_TYPE );
      sql.addSelect( TRANZFORM_OVERLAY_DISABLE_OBJECT.TABLE,
TRANZFORM_OVERLAY_DISABLE_OBJECT.OVERLAY_OBJ_NAME );
      sql.addSelect( TRANZFORM_OVERLAY_DISABLE_OBJECT.TABLE,
TRANZFORM_OVERLAY_DISABLE_OBJECT.OVERLAY_OBJ_ATTR );
      sql.addFrom( TRANZFORM_OVERLAY_DISABLE_OBJECT.TABLE );
      where = new SqlWhereBlock(formatter, TRANZFORM_OVERLAY_DISABLE_OBJECT.TABLE,
TRANZFORM_OVERLAY_DISABLE_OBJECT.CATEGORY, SqlWhereAction.equal, category, SqlFieldType.STRING);
```

```
      if( accessObj.size() > 0 )
        where.add(SqlWhereBlockTail.AndNotIn(formatter, TRANZFORM_OVERLAY_DISABLE_OBJECT.TABLE,
TRANZFORM_OVERLAY_DISABLE_OBJECT.OBJ_ID, (String[]) accessObj.toArray(new
String[accessObj.size()]), SqlFieldType.STRING));
      sql.where(where);
      sql.addOrderByAsc( TRANZFORM_OVERLAY_DISABLE_OBJECT.TABLE,
TRANZFORM_OVERLAY_DISABLE_OBJECT.OVERLAY_FORM );


      rs = sql.execute();
      //String form, type, name, attr;
      String lastForm = "", lastName = "";
      foContainer fc = new foContainer();
      while( rs.next() )
      {
        fc.add(new overlayObj(rs.getString(1), rs.getString(2), rs.getString(3), rs.getString(4),
"Station"));
      }
      if( fc.size() > 0 )
      {
        out.append("<TxFormSetOverlay>");
        overlayObj [] arr = fc.toArray();
        for( int i = 0; i < arr.length; i++ )
        {
          out.append(arr[i].toString());
        }

        out.append("</TxFormSetOverlay>");
      }
      else
        out.append("<TxFormSetOverlay/>");


    }
    catch(Throwable t)
    {
      JLog.Error(t);
      out.setLength(0);
      // default is no overlay
      out.append("<TxFormSetOverlay/>");
    }
    finally
    {
      if( rs != null )
        rs.close();
      XmlDoc doc = new XmlDoc("TxFormSetOverlay",tranzformWebRoot()+"txforms.dtd", out);
      writer.write(doc.xml().toString());
    }
  }
```

The embodiment of the invention in which an exclusive property or privilege is claimed are defined as the follows:

1. A method for configuring a customized formset as a version of a role based formset for display on a user interface of a client computer, the client computer coupled by a network to a formset server, the customized formset described in a structured definition language, the method comprising the steps of:

selecting the role based formset having generic definitions of form components for a plurality of different roles;

selecting a customize overlay by the formset server for application to the role based formset, the customize overlay including role associated component definitions particular to a user functioning in at least one of the roles of the plurality of different roles, the role associated component definitions including at least one of addition or removal of said generic definitions of form components of the role based formset; and applying the role associated component definitions of the customize overlay to said generic definitions of form components of the role based formset for generating the customized formset, such that at least some of said generic definitions of form components are changed based on the role of the user associated with the customize overlay;

wherein the customized formset is subsequently rendered on the user interface of the client computer.

2. The method of claim 1 further comprising the step of applying the customize overlay to the role based formset by an application selected from the group comprising: a client application of the client computer and a server application of the server computer.

3. The method of claim 2, wherein the components of the customize overlay modify the displayable components of the role based formset selected from the group comprising: data content, component presentation, and component functionality.

4. The method of claim 2 further comprising the step of assembling at least one of the customize overlay components from objects stored in a table according to a control file, the control file coordinating the generation of the customize overlay using the objects.

5. The method of claim 4, wherein the overlay components define objects stored in a database having restricted access by the formset.

6. The method of claim 4, wherein the components of the customize overlay is configurable based on changes to the table objects.

7. The method of claim 4, wherein the components of the customize overlay is configurable based on changes to the control file.

8. The method of claim 4 further comprising the step of selecting the table from a plurality of tables for use by the control file in generating the customize overlay.

9. The method of claim 2 further comprising the step of applying a profile for default data for prepopulating data in fields of the formset.

10. The method of claim 9, wherein the propopulated data is selected from the group comprising: user identification data, previously saved data settings by the user of the formset, and a pending transaction status of a process of the server.

11. The method of claim 2, wherein the customize overlay affects the degree of access to database records coupled to the server.

12. The method of claim 11, wherein the degree of access affects features of the formset selected from the group comprising:

workflow, presentation format, and formset components.

13. The method of claim 12, wherein the formset components are selected from the group comprising: form field, field action, field status page, and status page field.

14. The method of claim 11 further comprising the step of generating the customize overlay based on settings selected from the group comprising:

individual user and user group.

15. The method of claim 11 further comprising the step of selecting the customize overlay based on user identification criteria supplied to the formset server.

16. The method of claim 2, wherein the components of the customize overlay restrict a property of the role based formset content selected from the group comprising: hiding form fields from display on the user interface, protecting access to a field of the role based formset, and masking the display on the user interface of data of a respective field of the role based formset.

17. The method of claim 1 further comprising the step of embedding in a transaction using metadata the manipulation of the workflow of the formset, the transaction associated with the formset and exchanged between the client application and the server application.

18. The method of claim 17, wherein the metadata defines the workflow manipulation as a transaction class identifier.

19. The method of claim 17, wherein the workflow manipulation is used to direct the formset to display appropriate components in response to receiving the metadata.

20. The method of claim 17, wherein the transaction is a document expressed in a structured definition language.

21. The method of claim 20 further comprising the step of implementing an action contained in the document selected from the group comprising: read a matching record of a database connected to the formset server; find a record based on search criteria from a database connected to the formset server, update an existing record of a database connected to the formset server, and insert a new record in a database connected to the formset server.

22. A system for configuring a customized formset as a version of a role based formset for display on a user interface of a client computer, the system comprising:

a formset server coupled to the client computer by a network, the formset server having a server application for receiving the role based formset having generic definitions of form components for a plurality of different roles and for selecting a customize overlay for application to a role based formset, the customize overlay including role associated component definitions particular to a user functioning in at least one of the roles of the plurality of different roles, the role associated component definitions including at least one of addition or removal of said generic definitions of form components of the role based formset; and a utility for applying role associated components definitions of the customize overlay to said generic definitions of form components of the role based formset for generating the customized formset, such that at least some of said generic definitions of form components are changed based on the role of the user associated with the customize overlay;

wherein the customized formset is subsequently rendered on the user interface of the client computer.

23. The system of claim 22, wherein application of the customize overlay to the role based formset by the utility is selected from the group comprising: operation of the utility by a client application of the client computer, and operation of the utility by the server application of the server computer.

24. The system of claim 23, wherein the components of the customize overlay modify the displayable components of the role based formset selected from the group comprising: data content, component presentation, and component functionality.

25. The system of claim 24, wherein the overlay components define objects stored in a database having restricted access by the formset.

26. The system of claim 23 further comprising a table for storing objects representing at least one of the customize overlay components, the table coupled to the formset server.

27. The system of claim 26 further comprising a control file configured for coordinating the generation of the customize overlay using the objects from the table.

28. The system of claim 27, wherein the components of the customize overlay is configurable based on changes to the control file.

29. The system of claim 26, wherein the components of the customize overlay is configurable based on changes to the table objects.

30. The system of claim 26 further comprising a plurality of the tables for use by a control file in generating the customize overlay.

31. The system of claim 23 further comprising a profile for default data for prepopulating data in the fields of the formset.

32. The system of claim 31, wherein the propopulated data is selected from the group comprising: user identification data, previously saved data settings by the user of the formset, and a pending transaction status of a process of the server.

33. The system of claim 23, wherein the customize overlay affects the degree of access to database records coupled to the server.

34. The system of claim 33, wherein the degree of access affects features of the formset selected from the group comprising:

workflow, field presentation format, and formset components.

35. The system of claim 33, wherein generation of the customize overlay is based on settings selected from the group comprising: individual user and user group.

36. The system of claim 22 further comprising a workflow manipulator for embedding in a transaction using metadata the manipulation of the workflow of the formset, the transaction associated with the formset and exchanged between the client application and the server application.

37. The system of claim 36, wherein the metadata defines the workflow manipulation as a transaction class identifier.

38. The system of claim 36, wherein the workflow manipulation is used to direct the formset to display appropriate components in response to receiving the metadata.

39. The method of claim 36, wherein the transaction is a document expressed In a structured definition language.

40. The system of claim 36, wherein the workflow manipulator coordinates the implemention of an action contained in the document selected from the group comprising: read a matching record of a database connected to the formset server; find a record based on search criteria from a database connected to the formset server; update an existing record of a database connected to the formset server; and insert a new record in a database connected to the formset server.

* * * * *